United States Patent
de Castro Alves et al.

(10) Patent No.: US 9,305,057 B2
(45) Date of Patent: Apr. 5, 2016

(54) EXTENSIBLE INDEXING FRAMEWORK USING DATA CARTRIDGES

(75) Inventors: Alexandre de Castro Alves, Santa Clara, CA (US); Unmesh Deshmukh, Nagpur (IN); Hoyong Park, San Jose, CA (US); Shailendra Mishra, Fremont, CA (US); Anand Srinivasan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 12/913,636

(22) Filed: Oct. 27, 2010

(65) Prior Publication Data

US 2011/0161352 A1 Jun. 30, 2011

Related U.S. Application Data

(60) Provisional application No. 61/327,903, filed on Apr. 26, 2010, provisional application No. 61/311,175, filed on Mar. 5, 2010, provisional application No. 61/290,460, filed on Dec. 28, 2009.

(51) Int. Cl.
*G06F 7/00* (2006.01)
*G06F 17/30* (2006.01)

(52) U.S. Cl.
CPC .... *G06F 17/30516* (2013.01); *G06F 17/30557* (2013.01)

(58) Field of Classification Search
None
See application file for complete search history.

(56) References Cited

U.S. PATENT DOCUMENTS

| | | |
|---|---|---|
| 4,996,687 A | 2/1991 | Hess et al. |
| 5,051,947 A | 9/1991 | Messenger et al. |
| 5,339,392 A | 8/1994 | Risberg et al. |
| 5,495,600 A | 2/1996 | Terry et al. |
| 5,706,494 A | 1/1998 | Cochrane et al. |
| 5,802,262 A | 9/1998 | Van De Vanter |
| 5,802,523 A | 9/1998 | Jasuja et al. |
| 5,822,750 A | 10/1998 | Jou et al. |
| 5,826,077 A | 10/1998 | Blakeley et al. |
| 5,850,544 A | 12/1998 | Parvathaneny et al. |

(Continued)

FOREIGN PATENT DOCUMENTS

| | | |
|---|---|---|
| EP | 1241589 A2 | 9/2002 |
| EP | 2474922 | 7/2012 |

(Continued)

OTHER PUBLICATIONS

Komazec et al, Towards Efficient Schema Enhanced Pattern Matching over RDF Data Streams, Proceedings of the 1st International Workshop on Ordering and Reasoning (Ordring 2011), Bonn, Germany, Oct. 2011.*

(Continued)

*Primary Examiner* — Syed Hasan
*Assistant Examiner* — Thu Nga Nguyen
(74) *Attorney, Agent, or Firm* — Kilpatrick Townsend and Stockton LLP

(57) ABSTRACT

A framework or infrastructure (extensibility framework/infrastructure) for extending the indexing capabilities of an event processing system. The capabilities of an event processing system may be extended to support indexing schemes, including related data types and operations, which are not natively supported by the event processing system. The extensibility is enabled by one or more plug-in extension components called data cartridges.

18 Claims, 9 Drawing Sheets

(56) References Cited

U.S. PATENT DOCUMENTS

| | | |
|---|---|---|
| 5,857,182 A | 1/1999 | DeMichiel et al. |
| 5,918,225 A | 6/1999 | White et al. |
| 5,920,716 A | 7/1999 | Johnson et al. |
| 5,937,195 A | 8/1999 | Ju et al. |
| 5,937,401 A | 8/1999 | Hillegas |
| 6,006,235 A | 12/1999 | Macdonald et al. |
| 6,011,916 A | 1/2000 | Moore et al. |
| 6,041,344 A | 3/2000 | Bodamer et al. |
| 6,081,801 A | 6/2000 | Cochrane et al. |
| 6,092,065 A | 7/2000 | Floratos et al. |
| 6,108,666 A | 8/2000 | Floratos et al. |
| 6,112,198 A | 8/2000 | Lohman et al. |
| 6,128,610 A | 10/2000 | Srinivasan et al. |
| 6,158,045 A | 12/2000 | You |
| 6,219,660 B1 | 4/2001 | Haderle et al. |
| 6,263,332 B1 | 7/2001 | Nasr et al. |
| 6,278,994 B1 | 8/2001 | Fuh et al. |
| 6,282,537 B1 | 8/2001 | Madnick et al. |
| 6,341,281 B1 | 1/2002 | MacNicol et al. |
| 6,353,821 B1 | 3/2002 | Gray |
| 6,367,034 B1 | 4/2002 | Novik et al. |
| 6,370,537 B1 | 4/2002 | Gilbert et al. |
| 6,389,436 B1 | 5/2002 | Chakrabarti et al. |
| 6,397,262 B1 | 5/2002 | Hayden et al. |
| 6,418,448 B1 | 7/2002 | Sarkar |
| 6,438,540 B2 | 8/2002 | Nasr et al. |
| 6,438,559 B1 | 8/2002 | White et al. |
| 6,439,783 B1 | 8/2002 | Antoshenkov |
| 6,449,620 B1 | 9/2002 | Draper et al. |
| 6,453,314 B1 | 9/2002 | Chan et al. |
| 6,507,834 B1 | 1/2003 | Kabra et al. |
| 6,523,102 B1 | 2/2003 | Dye et al. |
| 6,546,381 B1 | 4/2003 | Subramanian et al. |
| 6,615,203 B1 | 9/2003 | Lin et al. |
| 6,681,343 B1 | 1/2004 | Nakabo |
| 6,708,186 B1 | 3/2004 | Claborn et al. |
| 6,718,278 B1 | 4/2004 | Steggles |
| 6,748,386 B1 | 6/2004 | Li |
| 6,751,619 B1 | 6/2004 | Rowstron et al. |
| 6,766,330 B1 | 7/2004 | Chen et al. |
| 6,785,677 B1 | 8/2004 | Fritchman |
| 6,826,566 B2 | 11/2004 | Lewak et al. |
| 6,836,778 B2 | 12/2004 | Manikutty et al. |
| 6,850,925 B2 | 2/2005 | Chaudhuri et al. |
| 6,856,981 B2 | 2/2005 | Wyschogrod et al. |
| 6,985,904 B1 | 1/2006 | Kaluskar et al. |
| 6,996,557 B1 | 2/2006 | Leung et al. |
| 7,020,696 B1 | 3/2006 | Perry et al. |
| 7,047,249 B1 | 5/2006 | Vincent |
| 7,051,034 B1 | 5/2006 | Ghosh et al. |
| 7,062,749 B2 | 6/2006 | Cyr et al. |
| 7,080,062 B1 | 7/2006 | Leung et al. |
| 7,093,023 B2 | 8/2006 | Lockwood et al. |
| 7,145,938 B2 | 12/2006 | Takeuchi et al. |
| 7,146,352 B2 | 12/2006 | Brundage et al. |
| 7,167,848 B2 | 1/2007 | Boukouvalas et al. |
| 7,203,927 B2 | 4/2007 | Al-Azzawe et al. |
| 7,224,185 B2 | 5/2007 | Campbell et al. |
| 7,225,188 B1 | 5/2007 | Gai et al. |
| 7,236,972 B2 | 6/2007 | Lewak et al. |
| 7,305,391 B2 | 12/2007 | Wyschogrod et al. |
| 7,308,561 B2 | 12/2007 | Cornet et al. |
| 7,310,638 B1 | 12/2007 | Blair |
| 7,376,656 B2 | 5/2008 | Blakeley et al. |
| 7,383,253 B1 | 6/2008 | Tsimelzon et al. |
| 7,403,959 B2 | 7/2008 | Nishizawa et al. |
| 7,430,549 B2 | 9/2008 | Zane et al. |
| 7,451,143 B2 | 11/2008 | Sharangpani et al. |
| 7,475,058 B2 | 1/2009 | Kakivaya et al. |
| 7,483,976 B2 | 1/2009 | Ross |
| 7,516,121 B2 | 4/2009 | Liu et al. |
| 7,519,577 B2 | 4/2009 | Brundage et al. |
| 7,519,962 B2 | 4/2009 | Aman |
| 7,533,087 B2 | 5/2009 | Liu et al. |
| 7,546,284 B1 | 6/2009 | Martinez et al. |
| 7,552,365 B1 | 6/2009 | March et al. |
| 7,567,953 B2 | 7/2009 | Kadayam et al. |
| 7,580,946 B2 | 8/2009 | Mansour et al. |
| 7,587,383 B2 | 9/2009 | Koo et al. |
| 7,603,674 B2 | 10/2009 | Cyr et al. |
| 7,613,848 B2 | 11/2009 | Amini et al. |
| 7,620,851 B1 | 11/2009 | Leavy et al. |
| 7,630,982 B2 | 12/2009 | Boyce |
| 7,634,501 B2 | 12/2009 | Yabloko |
| 7,636,703 B2 | 12/2009 | Taylor |
| 7,644,066 B2 | 1/2010 | Krishnaprasad et al. |
| 7,653,645 B1 | 1/2010 | Stokes |
| 7,672,964 B1 | 3/2010 | Yan et al. |
| 7,673,065 B2 | 3/2010 | Srinivasan et al. |
| 7,676,461 B2 | 3/2010 | Chikodrov et al. |
| 7,689,622 B2 | 3/2010 | Liu et al. |
| 7,693,891 B2 | 4/2010 | Stokes et al. |
| 7,702,629 B2 | 4/2010 | Cytron et al. |
| 7,702,639 B2 | 4/2010 | Stanley et al. |
| 7,711,782 B2 | 5/2010 | Kim et al. |
| 7,716,210 B2 | 5/2010 | Ozcan et al. |
| 7,739,265 B2 | 6/2010 | Jain et al. |
| 7,805,445 B2 | 9/2010 | Boyer et al. |
| 7,814,111 B2 | 10/2010 | Levin |
| 7,818,313 B1 | 10/2010 | Tsimelzon |
| 7,823,066 B1 | 10/2010 | Kuramura |
| 7,827,146 B1 | 11/2010 | De Landstheer et al. |
| 7,827,190 B2 | 11/2010 | Pandya |
| 7,844,829 B2 | 11/2010 | Meenakshisundaram |
| 7,870,124 B2 | 1/2011 | Liu et al. |
| 7,877,381 B2 | 1/2011 | Ewen et al. |
| 7,895,187 B2 | 2/2011 | Bowman |
| 7,912,853 B2 | 3/2011 | Agrawal |
| 7,917,299 B2 | 3/2011 | Buhler et al. |
| 7,930,322 B2 | 4/2011 | MacLennan |
| 7,945,540 B2 | 5/2011 | Park et al. |
| 7,953,728 B2 | 5/2011 | Hu et al. |
| 7,954,109 B1 | 5/2011 | Durham et al. |
| 7,979,420 B2 | 7/2011 | Jain et al. |
| 7,987,204 B2 | 7/2011 | Stokes |
| 7,988,817 B2 | 8/2011 | Son |
| 7,991,766 B2 | 8/2011 | Srinivasan et al. |
| 7,996,388 B2 | 8/2011 | Jain et al. |
| 8,019,747 B2 | 9/2011 | Srinivasan et al. |
| 8,032,544 B2 | 10/2011 | Jing et al. |
| 8,046,747 B2 | 10/2011 | Cyr et al. |
| 8,073,826 B2 | 12/2011 | Srinivasan et al. |
| 8,099,400 B2 | 1/2012 | Haub et al. |
| 8,103,655 B2 | 1/2012 | Srinivasan et al. |
| 8,134,184 B2 | 3/2012 | Becker et al. |
| 8,155,880 B2 | 4/2012 | Patel et al. |
| 8,195,648 B2 | 6/2012 | Zabback et al. |
| 8,204,873 B2 | 6/2012 | Chavan |
| 8,204,875 B2 | 6/2012 | Srinivasan et al. |
| 8,260,803 B2 | 9/2012 | Hsu et al. |
| 8,290,776 B2 | 10/2012 | Moriwaki et al. |
| 8,296,316 B2 | 10/2012 | Jain et al. |
| 8,315,990 B2 | 11/2012 | Barga et al. |
| 8,316,012 B2 | 11/2012 | Abouzied et al. |
| 8,346,511 B2 | 1/2013 | Schoning et al. |
| 8,370,812 B2 | 2/2013 | Feblowitz et al. |
| 8,392,402 B2 | 3/2013 | Mihaila et al. |
| 8,396,886 B1 | 3/2013 | Tsimelzon et al. |
| 8,447,744 B2 | 5/2013 | Alves et al. |
| 8,458,175 B2 | 6/2013 | Stokes |
| 8,498,956 B2 | 7/2013 | Srinivasan et al. |
| 8,521,867 B2 | 8/2013 | Srinivasan et al. |
| 8,527,458 B2 | 9/2013 | Park et al. |
| 8,543,558 B2 | 9/2013 | Srinivasan et al. |
| 8,572,589 B2 | 10/2013 | Cataldo et al. |
| 8,589,436 B2 | 11/2013 | Srinivasan et al. |
| 8,676,841 B2 | 3/2014 | Srinivasan et al. |
| 8,713,049 B2 | 4/2014 | Jain et al. |
| 8,745,070 B2 | 6/2014 | Krisnamurthy |
| 8,762,369 B2 | 6/2014 | Macho et al. |
| 8,775,412 B2 | 7/2014 | Day et al. |
| 9,047,249 B2 | 6/2015 | de Castro Alves et al. |
| 9,058,360 B2 | 6/2015 | De Castro Alves et al. |
| 9,098,587 B2 | 8/2015 | Deshmukh et al. |

(56) References Cited

U.S. PATENT DOCUMENTS

| | | |
|---|---|---|
| 9,110,945 B2 | 8/2015 | Jain |
| 2002/0023211 A1 | 2/2002 | Roth et al. |
| 2002/0032804 A1 | 3/2002 | Hunt |
| 2002/0038313 A1 | 3/2002 | Klein et al. |
| 2002/0049788 A1 | 4/2002 | Lipkin et al. |
| 2002/0056004 A1 | 5/2002 | Smith et al. |
| 2002/0073399 A1 | 6/2002 | Golden |
| 2002/0116362 A1 | 8/2002 | Li et al. |
| 2002/0116371 A1 | 8/2002 | Dodds et al. |
| 2002/0133484 A1 | 9/2002 | Chau et al. |
| 2002/0169788 A1 | 11/2002 | Lee et al. |
| 2003/0014408 A1 | 1/2003 | Robertson |
| 2003/0037048 A1 | 2/2003 | Kabra et al. |
| 2003/0046673 A1 | 3/2003 | Copeland et al. |
| 2003/0065655 A1 | 4/2003 | Syeda-Mahmood |
| 2003/0065659 A1 | 4/2003 | Agarwal et al. |
| 2003/0120682 A1 | 6/2003 | Bestgen et al. |
| 2003/0135304 A1 | 7/2003 | Sroub et al. |
| 2003/0200198 A1 | 10/2003 | Chandrasekar et al. |
| 2003/0229652 A1 | 12/2003 | Bakalash et al. |
| 2003/0236766 A1 | 12/2003 | Fortuna et al. |
| 2004/0010496 A1 | 1/2004 | Behrendt et al. |
| 2004/0019592 A1 | 1/2004 | Crabtree |
| 2004/0024773 A1 | 2/2004 | Stoffel et al. |
| 2004/0064466 A1 | 4/2004 | Manikutty et al. |
| 2004/0073534 A1 | 4/2004 | Robson |
| 2004/0088404 A1 | 5/2004 | Aggarwal |
| 2004/0117359 A1 | 6/2004 | Snodgrass et al. |
| 2004/0136598 A1 | 7/2004 | Le Leannec et al. |
| 2004/0151382 A1 | 8/2004 | Stellenberg et al. |
| 2004/0153329 A1 | 8/2004 | Casati et al. |
| 2004/0167864 A1 | 8/2004 | Wang et al. |
| 2004/0168107 A1 | 8/2004 | Sharp et al. |
| 2004/0177053 A1 | 9/2004 | Donoho et al. |
| 2004/0201612 A1 | 10/2004 | Hild et al. |
| 2004/0205082 A1 | 10/2004 | Fontoura et al. |
| 2004/0220896 A1 | 11/2004 | Finlay et al. |
| 2004/0220912 A1 | 11/2004 | Manikutty et al. |
| 2004/0220927 A1 | 11/2004 | Murthy et al. |
| 2004/0243590 A1 | 12/2004 | Gu et al. |
| 2004/0267760 A1 | 12/2004 | Brundage et al. |
| 2004/0268314 A1 | 12/2004 | Kollman et al. |
| 2005/0010896 A1 | 1/2005 | Meliksetian et al. |
| 2005/0055338 A1 | 3/2005 | Warner et al. |
| 2005/0065949 A1 | 3/2005 | Warner et al. |
| 2005/0096124 A1 | 5/2005 | Stronach |
| 2005/0097128 A1 | 5/2005 | Ryan et al. |
| 2005/0120016 A1 | 6/2005 | Midgley |
| 2005/0154740 A1 | 7/2005 | Day et al. |
| 2005/0174940 A1 | 8/2005 | Iny |
| 2005/0177579 A1 | 8/2005 | Blakeley et al. |
| 2005/0192921 A1 | 9/2005 | Chaudhuri et al. |
| 2005/0204340 A1* | 9/2005 | Ruminer et al. ............ 717/123 |
| 2005/0229158 A1 | 10/2005 | Thusoo et al. |
| 2005/0273352 A1 | 12/2005 | Moffat et al. |
| 2005/0273450 A1 | 12/2005 | McMillen et al. |
| 2006/0007308 A1 | 1/2006 | Ide et al. |
| 2006/0015482 A1 | 1/2006 | Beyer et al. |
| 2006/0031204 A1 | 2/2006 | Liu et al. |
| 2006/0047696 A1 | 3/2006 | Larson et al. |
| 2006/0064487 A1 | 3/2006 | Ross |
| 2006/0080646 A1 | 4/2006 | Aman |
| 2006/0085592 A1 | 4/2006 | Ganguly et al. |
| 2006/0089939 A1 | 4/2006 | Broda et al. |
| 2006/0100957 A1 | 5/2006 | Buttler et al. |
| 2006/0100969 A1 | 5/2006 | Wang et al. |
| 2006/0106786 A1 | 5/2006 | Day et al. |
| 2006/0106797 A1 | 5/2006 | Srinivasa et al. |
| 2006/0129554 A1 | 6/2006 | Suyama et al. |
| 2006/0155719 A1 | 7/2006 | Mihaeli et al. |
| 2006/0167704 A1 | 7/2006 | Nicholls et al. |
| 2006/0167856 A1 | 7/2006 | Angele et al. |
| 2006/0212441 A1 | 9/2006 | Tang et al. |
| 2006/0224576 A1 | 10/2006 | Liu et al. |
| 2006/0230029 A1 | 10/2006 | Yan |
| 2006/0235840 A1 | 10/2006 | Manikutty et al. |
| 2006/0242180 A1 | 10/2006 | Graf et al. |
| 2006/0282429 A1 | 12/2006 | Hernandez-Sherrington et al. |
| 2006/0294095 A1 | 12/2006 | Berk et al. |
| 2007/0016467 A1 | 1/2007 | John et al. |
| 2007/0022092 A1 | 1/2007 | Nishizawa et al. |
| 2007/0039049 A1 | 2/2007 | Kupferman et al. |
| 2007/0050340 A1 | 3/2007 | von Kaenel et al. |
| 2007/0076314 A1 | 4/2007 | Rigney |
| 2007/0118600 A1 | 5/2007 | Arora |
| 2007/0136239 A1 | 6/2007 | Lee et al. |
| 2007/0136254 A1 | 6/2007 | Choi et al. |
| 2007/0156787 A1 | 7/2007 | MacGregor |
| 2007/0156964 A1 | 7/2007 | Sistla |
| 2007/0192301 A1 | 8/2007 | Posner |
| 2007/0198479 A1 | 8/2007 | Cai et al. |
| 2007/0214171 A1 | 9/2007 | Behnen |
| 2007/0226188 A1 | 9/2007 | Johnson et al. |
| 2007/0226239 A1 | 9/2007 | Johnson et al. |
| 2007/0271280 A1 | 11/2007 | Chandasekaran |
| 2007/0294217 A1 | 12/2007 | Chen et al. |
| 2008/0005093 A1* | 1/2008 | Liu et al. ............ 707/4 |
| 2008/0010093 A1 | 1/2008 | LaPlante et al. |
| 2008/0010241 A1 | 1/2008 | McGoveran |
| 2008/0016095 A1 | 1/2008 | Bhatnagar et al. |
| 2008/0028095 A1 | 1/2008 | Lang et al. |
| 2008/0033914 A1 | 2/2008 | Cherniack et al. |
| 2008/0034427 A1 | 2/2008 | Cadambi et al. |
| 2008/0046401 A1 | 2/2008 | Lee et al. |
| 2008/0071904 A1 | 3/2008 | Schuba et al. |
| 2008/0077570 A1 | 3/2008 | Tang et al. |
| 2008/0077587 A1 | 3/2008 | Wyschogrod et al. |
| 2008/0077780 A1 | 3/2008 | Zingher |
| 2008/0082484 A1 | 4/2008 | Averbuch et al. |
| 2008/0082514 A1 | 4/2008 | Khorlin et al. |
| 2008/0086321 A1 | 4/2008 | Walton |
| 2008/0098359 A1 | 4/2008 | Ivanov et al. |
| 2008/0110397 A1 | 5/2008 | Son |
| 2008/0114787 A1 | 5/2008 | Kashiyama et al. |
| 2008/0120283 A1* | 5/2008 | Liu et al. ............ 707/4 |
| 2008/0120321 A1 | 5/2008 | Liu et al. |
| 2008/0162583 A1 | 7/2008 | Brown et al. |
| 2008/0195577 A1 | 8/2008 | Fan et al. |
| 2008/0235298 A1 | 9/2008 | Lin et al. |
| 2008/0243451 A1 | 10/2008 | Feblowitz et al. |
| 2008/0243675 A1 | 10/2008 | Parsons et al. |
| 2008/0250073 A1 | 10/2008 | Nori et al. |
| 2008/0255847 A1 | 10/2008 | Moriwaki et al. |
| 2008/0263039 A1 | 10/2008 | Van Lunteren |
| 2008/0270764 A1 | 10/2008 | McMillen et al. |
| 2008/0281782 A1 | 11/2008 | Agrawal |
| 2008/0301124 A1 | 12/2008 | Alves et al. |
| 2008/0301125 A1 | 12/2008 | Alves et al. |
| 2008/0301135 A1 | 12/2008 | Alves et al. |
| 2008/0301256 A1 | 12/2008 | McWilliams et al. |
| 2008/0313131 A1 | 12/2008 | Friedman et al. |
| 2009/0006320 A1 | 1/2009 | Ding et al. |
| 2009/0006346 A1 | 1/2009 | C N et al. |
| 2009/0007098 A1 | 1/2009 | Chevrette et al. |
| 2009/0019045 A1 | 1/2009 | Amir et al. |
| 2009/0024622 A1 | 1/2009 | Chkodrov et al. |
| 2009/0043729 A1 | 2/2009 | Liu et al. |
| 2009/0070355 A1 | 3/2009 | Cadarette et al. |
| 2009/0070785 A1 | 3/2009 | Alvez et al. |
| 2009/0070786 A1 | 3/2009 | Alves et al. |
| 2009/0076899 A1 | 3/2009 | Gbodimowo |
| 2009/0088962 A1 | 4/2009 | Jones |
| 2009/0100029 A1 | 4/2009 | Jain et al. |
| 2009/0106189 A1 | 4/2009 | Jain et al. |
| 2009/0106190 A1* | 4/2009 | Srinivasan et al. ............ 707/2 |
| 2009/0106198 A1 | 4/2009 | Srinivasan et al. |
| 2009/0106214 A1 | 4/2009 | Jain et al. |
| 2009/0106215 A1 | 4/2009 | Jain et al. |
| 2009/0106218 A1 | 4/2009 | Srinivasan et al. |
| 2009/0106321 A1 | 4/2009 | Das et al. |
| 2009/0106440 A1 | 4/2009 | Srinivasan et al. |
| 2009/0112802 A1 | 4/2009 | Srinivasan et al. |
| 2009/0112803 A1 | 4/2009 | Srinivasan et al. |
| 2009/0112853 A1 | 4/2009 | Nishizawa et al. |

(56) References Cited

U.S. PATENT DOCUMENTS

| | | |
|---|---|---|
| 2009/0125550 A1 | 5/2009 | Barga et al. |
| 2009/0125916 A1 | 5/2009 | Lu et al. |
| 2009/0132503 A1 | 5/2009 | Sun |
| 2009/0133041 A1 | 5/2009 | Rahman et al. |
| 2009/0144696 A1 | 6/2009 | Andersen |
| 2009/0172014 A1 | 7/2009 | Huetter |
| 2009/0182779 A1 | 7/2009 | Johnson |
| 2009/0187584 A1 | 7/2009 | Johnson et al. |
| 2009/0216747 A1 | 8/2009 | Li et al. |
| 2009/0216860 A1 | 8/2009 | Li et al. |
| 2009/0222730 A1 | 9/2009 | Wixson et al. |
| 2009/0228431 A1 | 9/2009 | Dunagan et al. |
| 2009/0228434 A1 | 9/2009 | Krishnamurthy et al. |
| 2009/0245236 A1 | 10/2009 | Scott et al. |
| 2009/0248749 A1 | 10/2009 | Gu et al. |
| 2009/0254522 A1* | 10/2009 | Chaudhuri et al. ............... 707/3 |
| 2009/0257314 A1 | 10/2009 | Davis et al. |
| 2009/0265324 A1 | 10/2009 | Mordvinov et al. |
| 2009/0271529 A1 | 10/2009 | Kashiyama et al. |
| 2009/0282021 A1 | 11/2009 | Bennet et al. |
| 2009/0293046 A1 | 11/2009 | Cheriton |
| 2009/0300093 A1 | 12/2009 | Griffiths et al. |
| 2009/0300181 A1 | 12/2009 | Marques |
| 2009/0300580 A1 | 12/2009 | Heyhoe et al. |
| 2009/0300615 A1 | 12/2009 | Andrade et al. |
| 2009/0313198 A1 | 12/2009 | Kudo et al. |
| 2009/0319501 A1 | 12/2009 | Goldstein et al. |
| 2009/0327102 A1 | 12/2009 | Maniar et al. |
| 2010/0017379 A1 | 1/2010 | Naibo et al. |
| 2010/0017380 A1 | 1/2010 | Naibo et al. |
| 2010/0023498 A1* | 1/2010 | Dettinger et al. ................ 707/4 |
| 2010/0036803 A1 | 2/2010 | Vemuri et al. |
| 2010/0036831 A1 | 2/2010 | Vemuri |
| 2010/0049710 A1 | 2/2010 | Young, Jr. et al. |
| 2010/0057663 A1 | 3/2010 | Srinivasan et al. |
| 2010/0057727 A1 | 3/2010 | Srinivasan et al. |
| 2010/0057735 A1 | 3/2010 | Srinivasan et al. |
| 2010/0057736 A1 | 3/2010 | Srinivasan et al. |
| 2010/0057737 A1 | 3/2010 | Srinivasan et al. |
| 2010/0094838 A1 | 4/2010 | Kozak |
| 2010/0106946 A1 | 4/2010 | Imaki et al. |
| 2010/0125574 A1 | 5/2010 | Navas |
| 2010/0125584 A1 | 5/2010 | Navas |
| 2010/0138405 A1 | 6/2010 | Mihaila |
| 2010/0161589 A1 | 6/2010 | Nica et al. |
| 2010/0223305 A1 | 9/2010 | Park et al. |
| 2010/0223437 A1 | 9/2010 | Park et al. |
| 2010/0223606 A1 | 9/2010 | Park et al. |
| 2010/0293135 A1 | 11/2010 | Candea et al. |
| 2010/0312756 A1 | 12/2010 | Zhang et al. |
| 2010/0318652 A1 | 12/2010 | Samba |
| 2010/0332401 A1 | 12/2010 | Prahlad et al. |
| 2011/0004621 A1 | 1/2011 | Kelley et al. |
| 2011/0016160 A1 | 1/2011 | Zhang et al. |
| 2011/0022618 A1 | 1/2011 | Thatte et al. |
| 2011/0023055 A1 | 1/2011 | Thatte et al. |
| 2011/0029484 A1 | 2/2011 | Park et al. |
| 2011/0029485 A1 | 2/2011 | Park et al. |
| 2011/0040746 A1 | 2/2011 | Handa et al. |
| 2011/0055192 A1 | 3/2011 | Tang et al. |
| 2011/0055197 A1 | 3/2011 | Chavan |
| 2011/0093162 A1 | 4/2011 | Nielsen et al. |
| 2011/0105857 A1 | 5/2011 | Zhang et al. |
| 2011/0161321 A1 | 6/2011 | de Castro Alves et al. |
| 2011/0161328 A1 | 6/2011 | Park et al. |
| 2011/0161356 A1 | 6/2011 | de Castro Alves et al. |
| 2011/0161397 A1 | 6/2011 | Bekiares et al. |
| 2011/0173231 A1 | 7/2011 | Drissi et al. |
| 2011/0173235 A1 | 7/2011 | Aman et al. |
| 2011/0196839 A1 | 8/2011 | Smith et al. |
| 2011/0196891 A1 | 8/2011 | de Castro Alves et al. |
| 2011/0246445 A1 | 10/2011 | Mishra |
| 2011/0270879 A1 | 11/2011 | Srinivasan et al. |
| 2011/0282812 A1 | 11/2011 | Chandramouli et al. |
| 2011/0302164 A1 | 12/2011 | Krishnamurthy et al. |
| 2011/0313844 A1 | 12/2011 | Chandramouli et al. |
| 2011/0314019 A1 | 12/2011 | Jimenez Peris et al. |
| 2011/0321057 A1 | 12/2011 | Mejdrich et al. |
| 2012/0016866 A1 | 1/2012 | Dunagan |
| 2012/0041934 A1 | 2/2012 | Srinivasan et al. |
| 2012/0130963 A1 | 5/2012 | Luo et al. |
| 2012/0131139 A1 | 5/2012 | Siripurapu et al. |
| 2012/0166417 A1 | 6/2012 | Chandramouli et al. |
| 2012/0166421 A1 | 6/2012 | Cammert et al. |
| 2012/0166469 A1 | 6/2012 | Cammert et al. |
| 2012/0191697 A1 | 7/2012 | Sherman et al. |
| 2012/0233107 A1 | 9/2012 | Roesch et al. |
| 2012/0259910 A1 | 10/2012 | Andrade et al. |
| 2012/0278473 A1 | 11/2012 | Griffiths |
| 2012/0290715 A1 | 11/2012 | Dinger et al. |
| 2012/0324453 A1 | 12/2012 | Chandramouli et al. |
| 2013/0031567 A1 | 1/2013 | Nano et al. |
| 2013/0046725 A1 | 2/2013 | Cammert et al. |
| 2013/0117317 A1 | 5/2013 | Wolf |
| 2013/0144866 A1 | 6/2013 | Jerzak et al. |
| 2013/0191370 A1 | 7/2013 | Chen et al. |
| 2013/0332240 A1 | 12/2013 | Patri et al. |
| 2014/0095444 A1 | 4/2014 | Deshmukh et al. |
| 2014/0095445 A1 | 4/2014 | Deshmukh et al. |
| 2014/0095446 A1 | 4/2014 | Deshmukh et al. |
| 2014/0095447 A1 | 4/2014 | Deshmukh et al. |
| 2014/0095462 A1 | 4/2014 | Park et al. |
| 2014/0095471 A1* | 4/2014 | Deshmukh et al. ........... 707/714 |
| 2014/0095473 A1 | 4/2014 | Srinivasan et al. |
| 2014/0095483 A1 | 4/2014 | Toillion et al. |
| 2014/0095525 A1 | 4/2014 | Hsiao et al. |
| 2014/0095529 A1 | 4/2014 | Deshmukh et al. |
| 2014/0095533 A1 | 4/2014 | Shukla et al. |
| 2014/0095535 A1 | 4/2014 | Deshmukh et al. |
| 2014/0095537 A1 | 4/2014 | Park et al. |
| 2014/0095540 A1 | 4/2014 | Hsiao et al. |
| 2014/0095541 A1 | 4/2014 | Herwadkar et al. |
| 2014/0095543 A1 | 4/2014 | Hsiao et al. |
| 2014/0136514 A1 | 5/2014 | Jain et al. |
| 2014/0156683 A1 | 6/2014 | de Castro Alves |
| 2014/0172506 A1 | 6/2014 | Parsell et al. |
| 2014/0172914 A1 | 6/2014 | Elnikety et al. |
| 2014/0201225 A1 | 7/2014 | Bishnoi et al. |
| 2014/0201355 A1 | 7/2014 | Fu et al. |
| 2014/0236983 A1 | 8/2014 | Alves et al. |
| 2014/0237289 A1 | 8/2014 | de Castro Alves et al. |
| 2014/0358959 A1 | 12/2014 | Bishnoi et al. |
| 2014/0379712 A1 | 12/2014 | Lafuente Alvarez |
| 2015/0156241 A1 | 6/2015 | Shukla et al. |
| 2015/0161214 A1 | 6/2015 | Kali et al. |
| 2015/0227415 A1 | 8/2015 | Alves et al. |

FOREIGN PATENT DOCUMENTS

| | | |
|---|---|---|
| WO | WO 00/49533 A2 | 8/2000 |
| WO | 0118712 | 3/2001 |
| WO | WO 01/059602 A2 | 8/2001 |
| WO | WO 01/65418 A2 | 9/2001 |
| WO | WO 03/030031 A2 | 4/2003 |
| WO | 2007122347 | 11/2007 |
| WO | 2012050582 | 4/2012 |

OTHER PUBLICATIONS

Hao et al. "Achieving high performance web applications by service and database replications at edge servers," proceedings of IPCCC 2009, IEEE 28th International Performance Computing and Communications Conference, pp. 153-160 (Dec. 2009).
International Search Report dated for PCT/US2011/052019 (Nov. 17, 2011).
Office Action for U.S. Appl. No. 12/396,008 (Nov. 16, 2011).
Office Action for U.S. Appl. No. 12/506,891 (Dec. 14, 2011).
Office Action for U.S. Appl. No. 12/534,398 (Nov. 11, 2011).
Office Action for U.S. Appl. No. 11/601,415 (Dec. 9, 2011).
Abadi, et al., "Aurora: A Data Stream Management System," International Conference on Management of Data, Proceedings of the 2003 ACM SIGMOD International Conference on Management of Data, ACM Press, 2003, 4 pages.

(56) References Cited

OTHER PUBLICATIONS

Aho, et al., "Efficient String Matching: An Aid to Bibliographic Search," Communications of the ACM, Jun. 1975, vol. 18, No. 6, pp. 333-340, Copyright 1975, Association for Computing Machinery, Inc.
Arasu, "CQL: A language for Continuous Queries over Streams and Relations," Lecture Notes in Computer Science, 2004, vol. 2921/2004, pp. 1-19.
Arasu, et al., "The CQL Continuous Query Language: Semantic Foundations and Query Execution," Stanford University, The VLDB Journal—The International Journal on Very Large Data Bases, Jun. 2006, vol. 15, issue 2, pp. 1-32, Springer-Verlag New York, Inc.
Arasu, et al., "An Abstract Semantics and Concrete Language for Continuous Queries over Streams and Relations," 9th International Workshop on Database programming languages, Sep. 2003, 11 pages.
Arasu, et al., "Stream: The Stanford Data Stream Management System," Department of Computer Science, Stanford University, 2004, p. 21.
Avnur, et al., "Eddies: Continuously Adaptive Query Processing," In Proceedings of the 2000 ACM SIGMOD International Conference on Data, Dallas TX, May 2000, 12 pages.
Avnur, et al., "Eddies: Continuously Adaptive Query Processing," slide show, believed to be prior to Oct. 17, 2007, 4 pages.
Babu, et al., "Continuous Queries over Data Streams," SIGMOD Record, Sep. 2001, vol. 30, No. 3, pp. 109-120.
Bai, et al., "A Data Stream Language and System Designed for Power and Extensibility," Conference on Information and Knowledge Management, Proceedings of the 15th ACM International Conference on Information and Knowledge Management, Arlington, Virginia, Nov. 5-11, 2006, 10 pages, Copyright 2006, ACM Press.
Bose, et al., "A Query Algebra for Fragmented XML Stream Data", 9th International Conference on Data Base Programming Languages (DBPL), Sep. 6-8, 2003, Potsdam, Germany, at URL: http://lambda,uta.edu/dbp103.pdf, 11 pages.
Buza, "Extension of CQL over Dynamic Databases," Journal of Universal Computer Science, 2006, vol. 12, No. 9, pp. 1165-1176.
Carpenter, "User Defined Functions," Oct. 12, 2000, at URL: http://www.sqlteam.com/itemprint.asp?ItemID=979, 4 pages.
Chan, et al., "Efficient Filtering of XML documents with Xpath expressions," VLDB Journal, 2002, pp. 354-379.
Chandrasekaran, et al., "TelegraphCQ: Continuous Dataflow Processing for an Uncertain World," Proceedings of CIDR 2003, 12 pages.
Chen, et al., "NiagaraCQ: A Scalable Continuous Query System for Internet Databases," Proceedings of the 2000 SIGMOD International Conference on Management of Data, May 2000, pp. 379-390.
Colyer, et al., "Spring Dynamic Modules Reference Guide," Copyright 2006-2008, ver. 1.0.3, 73 pages.
Colyer, et al., "Spring Dynamic Modules Reference Guide," Copyright 2006-2008, ver. 1.1.3, 96 pages.
"Complex Event Processing in the Real World," an Oracle White Paper, Sep. 2007, 13 pages.
Conway, "An Introduction to Data Stream Query Processing," Truviso, Inc., May 24, 2007, at URL: http://neilconway.org/talks/stream_intro.pdf, 71 pages.
"Coral8 Complex Event Processing Technology Overview," Coral8, Inc., Make it Continuous, pp. 1-8, Copyright 2007, Coral8, Inc.
"Creating WebLogic Domains Using the Configuration Wizard," BEA Products, Dec. 2007, ver. 10.0, 78 pages.
"Creating Weblogic Event Server Applications," BEA WebLogic Event Server, Jul. 2007, ver. 2.0, 90 pages.
Demers, et al., "Towards Expressive Publish/Subscribe Systems," Proceedings of the 10th International Conference on Extending Database Technology (EDBT 2006), Munich, Germany, Mar. 2006, pp. 1-18.
DeMichiel, et al., "JSR 220: Enterprise JavaBeans™, EJB 3.0 Simplified API," EJB 3.0 Expert Group, Sun Microsystems, May 2, 2006, ver. 3.0, 59 pages.
"Dependency Injection," Wikipedia, Dec. 30, 2008, printed on Apr. 29, 2011, at URL: http:en.wikipedia.org/w/index.php?title=Dependency_injection&oldid=260831402, pp. 1-7.
"Deploying Applications to WebLogic Server," BEA WebLogic Server, Mar. 30, 2007, ver. 10.0, 164 pages.
Deshpande, et al., "Adaptive Query Processing," slide show believed to be prior to Oct. 17, 2007, 27 pages.
"Developing Applications with Weblogic Server," BEA WebLogic Server, Mar. 30, 2007, ver. 10.0, 254 pages.
Diao, "Query Processing for Large-Scale XML Message Brokering," 2005, University of California Berkeley, 226 pages.
Diao, et al. "Query Processing for High-Volume XML Message Brokering", Proceedings of the 29th VLDB Conference, Berlin, Germany, 2003, 12 pages.
Dindar, et al., "Event Processing Support for Cross-Reality Environments," Pervasive Computing, IEEE CS, Jul.-Sep. 2009, pp. 2-9, Copyright 2009, IEEE.
"EPL Reference," BEA WebLogic Event Server, Jul. 2007, ver. 2.0, 82 pages.
Esper Reference Documentation, Copyright 2007, ver. 1.12.0, 158 pages.
Esper Reference Documentation, Copyright 2008, ver. 2.0.0, 202 pages.
"Fast Track Deployment and Administrator Guide for BEA WebLogic Server," BEA WebLogic Server 10.0 Documentation, printed on May 10, 2010, at URL: http://download.oracle.com/docs/cd/E13222_01/wls/docs100/quickstart/quick_start.html, 1 page.
Fernandez, et al., "Build your own XQuery processor", slide show, at URL: http://www.galaxquery.org/slides/edbt-summer-school2004.pdf, 2004, 2004, 116 pages.
Fernandez, et al., Implementing XQuery 1.0: The Galax Experience:, Proceedings of the 29th VLDB Conference, Berlin, Germany, 2003, 4 pages.
Florescu, et al., "The BEA/XQRL Streaming XQuery Processor," Proceedings of the 29th VLDB Conference, 2003, Berlin, Germany, 12 pages.
"Getting Started with WebLogic Event Server," BEA WebLogic Event Server, Jul. 2007, ver. 2.0, 66 pages.
Gilani, "Design and implementation of stream operators, query instantiator and stream buffer manager," Dec. 2003, 137 pages.
Golab, "Sliding Window Query Processing Over Data Streams," University of Waterloo, Waterloo, Ont. Canada, Aug. 2006, 182 pages.
Golab, et al., "Issues in Data Stream Management," ACM SIGMOD Record, vol. 32, issue 2, Jun. 2003, ACM Press, pp. 5-14.
Gosling, et al., "The Java Language Specification," Book, copyright 1996-2005, 3rd edition, 684 pages, Sun Microsystems USA. (due to size, reference will be uploaded in two parts).
Hopcroft, "Introduction to Automata Theory, Languages, and Computation," Second Edition, Addison-Wesley, Copyright 2001, 524 pages. (due to size, reference will be uploaded in two parts).
"Installing Weblogic Real Time," BEA WebLogic Real Time, Jul. 2007, ver. 2.0, 64 pages.
"Introduction to BEA WebLogic Server and BEA WebLogic Express," BEA WebLogic Server, Mar. 2007, ver. 10.0, 34 pages.
"Introduction to WebLogic Real Time," BEA WebLogic Real Time, Jul. 2007, ver. 2.0, 20 pages.
"Jboss Enterprise Application Platform 4.3 Getting Started Guide CP03, for Use with Jboss Enterprise Application Platform 4.3 Cumulative Patch 3," Jboss a division of Red Hat, Red Hat Documentation Group, Publication date Sep. 2007, Copyright 2008, 68 pages, Red Hat, Inc.
Jin, et al. "Argus: Efficient Scalable Continuous Query Optimization for Large-Volume Data Streams" 10th International Database Engineering and Applications Symposium (IDEAS'06), 2006, 7 pages.
Kawaguchi, "Java Architecture for XML Binding_(JAXB) 2.0," Sun Microsystems, Inc., Apr. 19, 2006, 384 pages.
Knuth, et al., "Fast Pattern Matching in Strings," Siam J. Comput., vol. 6, No. 2, Jun. 1977, pp. 323-350.
Lakshmanan, et al., "On efficient matching of streaming XML documents and queries," 2002, 18 pages.

(56) References Cited

OTHER PUBLICATIONS

Lindholm, et al., "Java Virtual Machine Specification, 2nd Edition", Prentice Hall, Apr. 1999, 484 pages (due to size, reference will be uploaded in two parts).
Liu, et al., "Efficient XSLT Processing in Relational Database System," Proceeding of the 32nd. International Conference on Very Large Data Bases (VLDB), Sep. 2006, 1106-1116, 11 pages.
Luckham, "What's the Difference Between ESP and CEP?" Complex Event Processing, downloaded Apr. 29, 2011, at URL: http://complexevents.com/?p=103, 5 pages.
Madden, et al., "Continuously Adaptive Continuous Queries (CACQ) over Streams," SIGMOD 2002, Jun. 4-6, 2002, 12 pages.
"Managing Server Startup and Shutdown," BEA WebLogic Server, Mar. 30, 2007, ver. 10.0, 134 pages.
"Matching Behavior," .NET Framework Developers Guide, Copyright 2008 Microsoft Corporation, downloaded Jul. 1, 2008 from URL: http://msdn.microsoft.com/en-us/library/0yzc2yb0(printer).aspx, pp. 1-2.
Motwani, et al., "Models and Issues in Data Streams," Proceedings of the 21st ACM SIGMOD-SIGACT-SIDART symposium on Principles f database systems, 2002, 30 pages.
Motwani, et al., "Query Processing Resource Management, and Approximation in a Data Stream Management System," Proceedings of CIDR 2003, Jan. 2003, 12 pages.
Munagala, et al., "Optimization of Continuous Queries with Shared Expensive Filters," Proceedings of the 26th ACM SIGMOD-SIGACT-SIGART symposium on Principles of database systems, believed to be prior to Oct. 17, 2007, p. 14.
"New Project Proposal for Row Pattern Recognition—Amendment to SQL with Application to Streaming Data Queries," H2-2008-027, H2 Teleconference Meeting, Jan. 9, 2008, pp. 1-6.
Novick, "Creating a User Defined Aggregate with SQL Server 2005," at URL: http://novicksoftware.com/Articles/sql-2005-product-user-defined-aggregate.html, 2005, 6 pages.
Oracle Database, SQL Language Reference, 11g Release 1 (11.1), B28286-02, Sep. 2007, 1496 pages, Oracle.
Oracle Application Server 10g, Release 2 and 3, New Features Overview, An Oracle White Paper, Oct. 2005, 48 pages, Oracle.
Oracle Application Server, Administrators Guide, 10g Release 3 (10.1.3.2.0), B32196-01, Jan. 2007, 376 pages, Oracle.
Oracle Application Server, Enterprise Deployment Guide, 10g Release 3 (10.1.3.2.0), B32125-02, Apr. 2007, 120 pages, Oracle.
Oracle Application Server, High Availability Guide, l0g Release 3 (10.1.3.2.0), B32201-01, Jan. 2007, 314 pages, Oracle.
"Oracle CEP Getting Started," Release 11gR1 (11.1.1) E14476-01, May 2009, 172 pages.
Oracle Database Data Cartridge Developers Guide, B28425-03, 11g Release 1 (11.1), Oracle, Mar. 2008, 372 pages, Oracle.
Oracle Database, SQL Reference, 10g Release 1 (10.1), Part No. B10759-01, Dec. 2003, pp. 7-1 to 7-17; 7-287 to 7-290; 14-61 to 14-74. (due to size, reference will be uploaded in three parts).
"OSGI Service Platform Core Specification, The OSGI Alliance," Apr. 2007, ver. 4.1, release 4, 288 pages, OSGI Alliance.
Peng, et al., "Xpath Queries on Streaming Data," 2003, pp. 1-12, ACM Press.
Peterson, "Petri Net Theory and the Modeling of Systems", Prentice Hall, 1981, 301 pages.
PostgresSQL: Documentation: Manuals: PostgresSQL 8.2: Create Aggregate, believed to be prior to Apr. 21, 2007, 4 pages.
PostgresSQL: Documentation: Manuals: PostgresSQL 8.2: User-Defined Aggregates, believed to be prior to Apr. 21, 2007, 4 pages.
"Release Notes," BEA WebLogic Event Server, Jul. 2007, ver. 2.0, 8 pages.
Sadri, et al., "Expressing and Optimizing Sequence Queries in Database Systems," ACM Transactions on Database Systems, Jun. 2004, vol. 29, No. 2, pp. 282-318, ACM Press, Copyright 2004.
Sadtler, et al., "WebSphere Application Server Installation Problem Determination," Copyright 2007, pp. 1-48, IBM Corp.
Sharaf, et al., Efficient Scheduling of Heterogeneous Continuous Queries, VLDB '06, Sep. 12-15, 2006, pp. 511-522.
Spring Dynamic Modules for OSGi Service Platforms product documentation, SpringSource, Jan. 2008, 71 pages.
"Stanford Stream Data Manager," at URL: http://infolab.stanford.edu/stream/, last modified Jan. 5, 2006, pp. 1-9.
Stolze, "User-defined Aggregate Functions in DB2 Universal Database," at URL: http://www.128.ibm.com/developerworks/db2/library/tacharticle/0309stolze/0309stolze.html, Sep. 11, 2003, 11 pages.
Stream Query Repository: Online Auctions (CQL Queries), at URL: http://www-db.stanford.edu/strem/sqr/cql/onauc.html, Dec. 2, 2002, 4 pages.
Stream Query Repository: Online Auctions, at URL: http://www-db.stanford.edu/stream/sqr/onauc.html#queryspecsend, Dec. 2, 2002, 2 pages.
"Stream: The Stanford Stream Data Manager," IEEE Data Engineering Bulletin, Mar. 2003, pp. 1-8.
Streambase 5.1 product documentation, Streambase Systems, copyright 2004-2010, 878 pages.
Terry, et al., "Continuous queries over append-only database," Proceedings of 1992 ACM SIGMOD, pp. 321-330.
"Understanding Domain Configuration," BEA WebLogic Server, Mar. 30, 2007, ver. 10.0, 38 pages.
Vajjhala, et al, "The Java™ Architecture for XML Binding (JAXB) 2.0," Sun Microsystem, Inc., Final Release Apr. 19, 2006, 384 pages.
W3C, "XML Path Language (Xpath)," W3C Recommendation, Nov. 16, 1999, ver. 1.0, at URL: http://www.w3.org/TR/xpath, 37 pages.
"WebLogic Event Server Administration and Configuration Guide," BEA WebLogic Event Server, Jul. 2007, ver. 2.0, 108 pages.
"WebLogic Event Server Reference," BEA WebLogic Event Server, Jul. 2007, ver. 2.0, 52 pages.
"Weblogic Server Performance and Tuning," BEA WebLogic Server, Mar. 30, 2007, ver. 10.0, 180 pages.
"WebSphere Application Server V6.1 Problem Determination: IBM Redpaper Collection," WebSphere Software, IBM/Redbooks, Dec. 2007, 634 pages.
White, et al., "WebLogic Event Server: A Lightweight, Modular Application Server for Event Processing," 2nd International Conference on Distributed Event-Based Systems, Jul. 2-4, 2008, Rome, Italy, 8 pages, ACM Press, Copyright 2004.
Widom, et al., "CQL: A Language for Continuous Queries over Streams and Relations," believed to be prior to Oct. 17, 2007, 62 pages.
Widom, et al., "The Stanford Data Stream Management System," PowerPoint Presentation, believed to be prior to Oct. 17, 2007, 110 pages.
Zemke, "XML Query," Mar. 14, 2004, 29 pages.
De Castro Alves; et al, "Extensible Indexing Framework Using Data Cartridges," U.S. Appl. No. 12/913,636, filed Oct. 27, 2010.
Park, et al., "Spatial Data Cartridge for Event Processing Systems," U.S. Appl. No. 12/949,081, filed Nov. 18, 2010.
De Castro Alves; et al, "Extensibility Platform Using Data Cartridges," U.S. Appl. No. 12/957,194, filed Nov. 30, 2010.
De Castro Alves; et al, "Class Loading Using Java Data Cartridges," U.S. Appl. No. 13/089,556, filed Apr. 19, 2011.
De Castro Alves; et al, "Extensible Language Framework Using Data Cartridges," U.S. Appl. No. 12/957,201, filed Nov. 30, 2010.
Non-Final Office Action for U.S. Appl. No. 12/396,008, mailed on Jun. 8, 2011, 10 pages.
A Non-Final Office Action for U.S. Appl. No. 12/395,871, mailed on May 27, 2011, 7 pages.
Non-Final Office Action for U.S. Appl. No. 11/874,202, mailed on Dec. 3, 2009, 20 pages.
Final Office Action for U.S. Appl. No. 11/874,202, mailed on Jun. 8, 2010, 200 pages.
Notice of Allowance for U.S. Appl. No. 11/874,202, mailed on Dec. 22, 2010, 29 pages.
Notice of Allowance for U.S. Appl. No. 11/874,202, mailed on Mar. 31, 2011, 12 pages.
Notice of Allowance for U.S. Appl. No. 11/874,850, mailed on Nov. 24, 2009, 17 pages.
Supplemental Notice of Allowance for U.S. Appl. No. 11/874,850, mailed on Dec. 11, 2009, 5 pages.

(56) References Cited

OTHER PUBLICATIONS

Supplemental Notice of Allowance for U.S. Appl. No. 11/874,850, mailed on Jan. 27, 2010, 11 pages.
Non-Final Office Action for U.S. Appl. No. 11/874,896, mailed on Dec. 8, 2009, 19 pages.
Final Office Action for U.S. Appl. No. 11/874,896, mailed on Jul. 23, 2010, 28 pages.
Non-Final Office Action for U.S. Appl. No. 11/874, 896,mailed on Nov. 22, 2010, 25 pages.
Non-Final Office Action for U.S. Appl. No. 11/977,439, mailed on Apr. 13, 2010, 7 pages.
Notice of Allowance for U.S. Appl. No. 11/977,439, mailed on Aug. 18, 2010, 11 pages.
Supplemental Notice of Allowance for U.S. Appl. No. 11/977,439, mailed on Sep. 28, 2010, 6 pages.
Notice of Allowance for U.S. Appl. No. 11/977,439, mailed on Nov. 24, 2010, 8 pages.
Notice of Allowance for U.S. Appl. No. 11/977,439, mailed on Mar. 16, 2011, 10 pages.
Non-Final Office Action for U.S. Appl. No. 11/977,437, mailed on Oct. 13, 2009, 9 pages.
Final Office Action for U.S. Appl. No. 11/977,437, mailed on Apr. 8, 2010, 18 pages.
Notice of Allowance for U.S. Appl. No. 11/977,440, mailed on Oct. 7, 2009, 6 pages.
Office Action for U.S. Appl. No. 11/874,197, mailed on Nov. 10, 2009, 14 pages.
Final Office Action for U.S. Appl. No. 11/874,197, mailed on Jun. 29, 2010, 17 pages.
Non-Final Office Action for U.S. Appl. No. 11/874,197, mailed on Dec. 22, 2010, 22 pages.
Non-Final Office Action for U.S. Appl. No. 11/873,407, mailed on Nov. 13, 2009, 7 pages.
Final Office Action for U.S. Appl. No. 11/873,407, mailed on Apr. 26, 2010, 11 pages.
Notice of Allowance for U.S. Appl. No. 11/873,407, mailed on Nov. 10, 2010, 14 pages.
Notice of Allowance for U.S. Appl. No. 11/873,407, mailed on Mar. 7, 2011, 8 pages.
Non-Final Office Action for U.S. Appl. No. 11/601,415, mailed on Sep. 17, 2008, 10 pages.
Final Office Action for U.S. Appl. No. 11/601,415, mailed on May 27, 2009, 26 pages.
Advisory Action for U.S. Appl. No. 11/601,415, mailed on Aug. 18, 2009, 3 pages.
Non-Final Office Action for U.S. Appl. No. 11/601,415, mailed on Nov. 30, 2009, 32 pages.
Final Office Action for U.S. Appl. No. 11/601,415, mailed on Jun. 30, 2010, 45 pages.
Non-Final Office Action for U.S. Appl. No. 11/927,681, mailed on Mar. 24, 2011, 17 pages.
Non-Final Office Action for U.S. Appl. No. 11/927,683, mailed on Mar. 24, 2011, 13 pages.
Non-Final Office Action for U.S. Appl. No. 10/948,523, mailed on Jan. 22, 2007, 31 pages.
Final Office Action for U.S. Appl. No. 10/948,523, mailed on Jul. 6, 2007, 37 pages.
Non-Final Office Action for U.S. Appl. No. 10/948, 523, mailed Dec. 11, 2007, 47 pages.
Notice of Allowance for U.S. Appl. No. 10/948,523, mailed on Jul. 8, 2008, 30 pages.
Supplemental Notice of Allowance for U.S. Appl. No. 10/948,523, mailed on Jul. 17, 2008, 4 pages.
Notice of Allowance for U.S. Appl. No. 10/948,523, mailed on Dec. 1, 2010, 17 pages.
"Oracle Complex Event Processing CQL Language Reference," 11g Release 1 (11.1.1) E12048-01, Apr. 2010, 540 pages.
Martin et al "Finding application errors and security flaws using PQL: a program query language," Proceedings of the 20th annual ACM SIGPLAN conference on Object-oriented programming, systems, languages, and applications 40:1-19 (Oct. 2005).
Office Action for U.S. Appl. No. 12/534,384 (Feb. 28, 2012).
Office Action for U.S. Appl. No. 12/506,905 (Mar. 26, 2012).
Office Action for U.S. Appl. No. 12/548,209 (Apr. 16, 2012).
Notice of Allowance for U.S. Appl. No. 13/184,528 (Mar. 1, 2012).
"StreamBase New and Noteworthy," StreamBase, dated Jan. 12, 2010, 878 pages.
Non-Final Office Action for U.S. Appl. No. 12/548,187, mailed on Sep. 27, 2011, 19 pages.
Final Office Action for U.S. Appl. No. 12/395,871, mailed on Oct. 19, 2011, 33 pages.
Non-Final Office Action for U.S. Appl. No. 12/548,222, mailed on Oct. 19, 2011, 27 pages.
Non-Final Office Action for U.S. Appl. No. 12/548,281, mailed on Oct. 3, 2011, 37 pages.
Non-Final Office Action for U.S. Appl. No. 12/548,290, mailed on Oct. 3, 2011, 34 pages.
Notice of Allowance for U.S. Appl. No. 11/874,896, mailed on Jun. 23, 2011, 30 pages.
Final Office Action for U.S. Appl. No. 11/874,197, mailed on Aug. 12, 2011, 26 pages.
Notice of Allowance for U.S. Appl. No. 11/927,681, mailed on Jul. 1, 2011, 8 pages.
Final Office Action for U.S. Appl. No. 11/927,683, mailed on Sep. 1, 2011, 18 pages.
International Search Report dated Sep. 12, 2012 for PCT/US2012/036353.
Office Action for U.S. Appl. No. 13/396,464 dated Sep. 7, 2012.
Office Action for U.S. Appl. No. 13/244,272 dated Oct. 14, 2012.
Notice of Allowance for U.S. Appl. 12/548,209 dated Oct. 24, 2012.
Nah et al. "A Cluster-Based THO-Structured Scalable Approach for Location Information Systems," The Ninth IEEE International Workshop on Object-Oriented Real-Time Dependable Systems (WORD'03), pp. 225-233 (Jan. 1, 2003).
Hulton et al. "Mining Time-Changing Data Streams," Proceedings of the Seventh ACM SIGKDD, pp. 10 (Aug. 2001).
Stump et al. (ed.) Proceedings of IJCAR '06 Workshop "PLPV '06: Programming Languages meets Program Verification," pp. 1-113 (Aug. 21, 2006).
Vijayalakshmi et al. "Processing location dependent continuous queries in distributed mobile databases using mobile agents," IET-UK International Conference on Information and Communication Technology in Electrical Sciences (ICTES 2007), pp. 1023-1030 (Dec. 22, 2007).
Wang et al. "Distributed Continuous Range Query Processing on Moving Objects," Proceedings of the 17th international Conference on Database and Expert Systems Applications (DEXA'06), Berlin, DE, pp. 655-665 (Jan. 1, 2006).
Wu et al."Dynamic Data Management for Location Based Services in Mobile Environments," IEEE Proceedings of the Seventh International Database Engineering and Applications Symposium 2003 Piscataway. NJ. USA., pp. 172-181 (Jul. 16, 2003).
Office Action for U.S. Appl. No. 12/548,187 (Jun. 20, 2012).
Notice of Allowance for U.S. Appl. No. 12/395,871 (May 4, 2012).
Office Action for U.S. Appl. No. 12/548,222 (Jun. 20, 2012).
Office Action for U.S. Appl. No. 12/534398 (Jun. 5, 2012).
Office Action for U.S. Appl. No. 12/548,281 (Jun. 20, 2012).
Notice of Allowance for U.S. Appl. No. 12/874,197 (Jun. 22 2012).
Esper Reference Documentation, Copyright 2009, ver. 3.1.0, 293 pages.
International Search Report dated Jul. 16, 2012 for PCT/US2012/034970.
Final Office Action for U.S. Appl. No. 12/548,290 dated Jul. 30, 2012.
Office Action for U.S. Appl. No. 13/193,377 dated Aug. 23, 2012.
Office Action for U.S. Appl. No. 11/977,437 dated Aug. 3, 2012.
Final Office Action for U.S. Appl. No. 11/601,415 dated Jul. 2, 2012.
Notice of Allowance for U.S. Appl. No. 12/506,891 dated Jul. 25, 2012.
Final Office Action for U.S. Appl. No. 12/506,905 dated Aug. 9, 2012.

(56) References Cited

OTHER PUBLICATIONS

U.S. Appl. No. 12/548,187, Final Office Action mailed on Jun. 10, 2013, 18 pages.
U.S. Appl. No. 12/548,222, Notice of Allowance mailed on Jul. 18, 2013, 12 pages.
U.S. Appl. No. 13/102,665, Final Office Action mailed on Jul. 9, 2013, 17 pages.
U.S. Appl. No. 13/107,742, Final Office Action mailed on Jul. 3, 2013, 19 pages.
Notice of Allowance for U.S. Appl. No. 11/977,437 dated Jul. 10, 2013, 10 pages.
SQLTutorial-In, Tizag.com, http://web.archive.org/web/20090216215219/http://www.tizag.com/sgiTutorial/sqlin.php, Feb. 16, 2009, pp. 1-3.
Sansoterra "Empower SOL with Java User-Defined Functions," IT Jungle.com (Oct. 9, 2003).
Ullman et al., "Introduction to JDBC," Stanford University (2005).
Non-Final Office Action for U.S. Appl. No. 12/957,194 dated Dec. 7, 2012.
Non-Final Office Action for U.S. Appl. No. 13/089,556 dated Nov. 6, 2012.
Notice of Allowance for U.S. Appl. No. 12/534,398 dated Nov. 27, 2012.
Notice of Allowance for U.S. Appl. No. 12/506,905 dated Dec. 14, 2012.
Non-Final Office Action for U.S. Appl. No. 12/957,201 dated Dec. 19, 2012.
Final Office Action for U.S. Appl. No. 12/396,464 dated Jan. 16, 2013, 16 pages.
Non-Final Office Action for U.S. Appl. No. 12/949,081 dated Jan. 9, 2013, 12 pages.
Final Office Action for U.S. Appl. No. 12/193,377 dated Jan. 17, 2013, 24 pages.
Final Office Action for U.S. Appl. No. 12/534,384 dated Feb. 12, 2013, 13 pages.
Final Office Action for U.S. Appl. No. 13/107,742 dated Feb. 14, 2013, 15 pages.
Non-Final Office Action for U.S. Appl. No. 13/102,665 dated Feb. 1, 2013, 11 pages.
Business Process Management (BPM), Datasheet [online]. IBM, [retrieved on Jan. 28, 2013]. Retrieved from the Internet: <URL: http://www-142.ibm.com/software/products/us/en/category/BPM-SOFTWARE>.
What is BPM?, Datasheet [online]. IBM, [retrieved on Jan. 28, 2013]. Retrieved from the Internet: <URL: http://www-01.ibm.com/software/info/bpm/whatis-bpm/>.
U.S. Appl. No. 12/534,384, Notice of Allowance mailed on May 7, 2013, 12 pages.
U.S. Appl. No. 12/548,187, Non-Final Office Action mailed on Apr. 9, 2013, 17 Pages.
U.S. Appl. No. 12/548,222, Non-Final Office Action mailed on Apr. 10, 2013, 16 pages.
U.S. Appl. No. 12/548,281, Non-Final Office Action mailed on Apr. 12, 2013, 16 pages.
U.S. Appl. No. 12/548,290, Non-Final Office Action mailed on Apr. 15, 2013, 17 pages.
U.S. Appl. No. 12/957,201, Final Office Action mailed on Apr. 25, 2013, 11 pages.
U.S. Appl. No. 13/089,556, Non-Final Office Action mailed on Apr. 10, 2013, 10 pages.
U.S. Appl. No. 12/548,281, Non-Final Office Action mailed on Feb. 13, 2014, 16 pages
U.S. Appl. No. 13/177,748, Final Office Action mailed on Mar. 20, 2014, 23 pages.
International Search Report dated Apr. 3, 2014 for PCT/US2014/010832, 9 pages.
Cadonna et al. "Efficient event pattern matching with match windows," Proceedings of the 18th ACM SIGKDD international conference on Knowledge discovery and data mining, pp. 471-479 (Aug. 2012).
Nichols et al. "A faster closure algorithm for pattern matching in partial-order event data," IEEE International Conference on Parallel and Distributed Systems, pp. 1-9 (Dec. 2007).
U.S. Appl. No. 12/548,281, Final Office Action mailed on Oct. 10, 2013, 21 pages.
U.S. Appl. No. 12/548,290, Notice of Allowance mailed on Sep. 11, 2013, 6 pages.
U.S. Appl. No. 12/949,081, Final Office Action mailed on Aug. 27, 2013, 13 pages.
U.S. Appl. No. 13/089,556, Final Office Action mailed on Aug. 29, 2013, 10 pages.
U.S. Appl. No. 13/177,748, Non-Final Office Action mailed on Aug. 30, 2013, 24 pages.
U.S. Appl. No. 13/193,377, Notice of Allowance mailed on Aug. 30, 2013, 19 pages.
Oracle™ Fusion Middleware CQL Language Reference, 11g Release 1 (11.1.1.6.3) E12048-10, Aug. 2012, pp. 6-1 to 6-12.
Oracle™ Complex Event Processing CQL Language Reference, 11g Release 1 (11.1.1.4.0) E12048-04, Jan. 2011, pp. 6.1 to 6.12.
Oracle™ Complex Event Processing CQL Language Reference, 11g Release 1 (11.1.1) E12048-03, Apr. 2010, sections 18-4 to 18.4.2.
Pattern Recognition With Match_Recognize, Oracle™ Complex Event Processing CQL Language Reference, 11g Release 1 (11.1.1) E12048-01, May 2009, pp. 15.1 to 15.20.
Supply Chain Event Management: Real-Time Supply Chain Event Management, product information Manhattan Associates, 2009-2012.
U.S. Appl. No. 11/601,415, Non-Final Office mailed on Dec. 11, 2013, 58 pages.
U.S. Appl. No. 12/396,464, Non Final Office Action mailed on Dec. 31, 2013, 16 pages.
U.S. Appl. No. 13/089,556, Non-Final Office Action mailed on Jan. 9, 2014, 14 pages.
Non-Final Office Action for U.S. Appl. 12/548,187 dated Feb. 6, 2014, 53 pages.
Agrawal et al. "Efficient pattern matching over event streams," Proceedings of the 2008 ACM SIGMOD international conference on Management of data, pp. 147-160 (Jun. 2008).
Chandramouli et al., High-Performance Dynamic Pattern Matching over Disordered Streams, Proceedings of the VLDB Endowment, vol. 3, Issue 1-2, Sep. 2010, pp. 220-231.
Chapple "Combining Query Results with the Union Command," ask.com Computing Databases, downloaded from: http://databases.about.com/od/sql/a/union.htm (no date, printed on Oct. 14, 2013).
Fantozzi, A Strategic Approach to Supply Chain Event Management, student submission for Masters Degree, Massachusetts Institute of Technology, Jun. 2003.
Komazec et al., Towards Efficient Schema-Enhanced Pattern Matching over RDF Data Streams, Proceedings of the 1st International Workshop on Ordering and Reasoning (OrdRing 2011), Bonn, Germany, Oct. 2011.
Ogrodnek, Custom UDFs and hive, Bizo development blog http://dev.bizo.com, Jun. 23, 2009, 2 pages.
Pradhan, Implementing and Configuring SAP® Event Management, Galileo Press, 2010, pp. 17-21.
Wilson et al., SAP Event Management, an Overview, Q Data USA, Inc., 2009.
Notice of Allowance for U.S. Appl. No. 11/977,437 dated Mar. 4, 2013. 9 pages.
Final Office Action for U.S. Appl. No. 13/244,272 dated Mar. 28, 2013, 29 pages.
Notice of Allowance for U.S. Appl. No. 12/957,194 dated Mar. 20, 2013. 9 pages.
Call User Defined Functions from Pig, Amazon Elastic MapReduce, Mar. 2009, 2 pages.
Strings in C, retrieved from the internet: <URL: https://web.archive.org/web/20070612231205/http:l/web.cs.swarthmore.edu/-newhall/unixhelp/C_strings.html> [retrieved on May 13, 2014], Swarthmore College, Jun. 12, 2007, 3 pages.
U.S. Appl. No. 11/874,197, Notice of Allowance mailed on Jun. 22, 2012, 20 pages.
U.S. Appl. No. 12/396,464, Final Office Action mailed on May 16, 2014, 16 page.

(56) References Cited

OTHER PUBLICATIONS

U.S. Appl. No. 12/396,464, Non-Final Office Action mailed on Sep. 7, 2012, 18 pages.
U.S. Appl. No. 12/548,187, Final Office Action mailed on Jun. 4, 2014, 64 pages.
U.S. Appl. No. 13/089,556, Final Office Action mailed on Jun. 13, 2014, 14 pages.
U.S. Appl. No. 13/107,742, Non-Final Office Action mailed on Jun. 19, 2014, 20 pages.
U.S. Appl. No. 13/244,272, Notice of Allowance mailed on Aug. 12, 2013, 12 pages.
International Application No. PCT/US2011/052019, International Preliminary Report on Patentability mailed on Mar. 28, 2013, 6 pages.
International Application No. PCT/US2012/034970, International Preliminary Report on Patentability mailed on Nov. 21, 2013, 7 pages.
International Application No. PCT/US2012/036353, International Preliminary Report on Patentability mailed on Nov. 28, 2013, 6 pages.
Bottom-up parsing, Wikipedia, downloaded from: http://en.wikipedia.org/wiki/Bottom-up_parsing, Sep. 8, 2014, pp. 1-2.
Branch Predication, Wikipedia, downloaded from: http://en.wikipedia.org/wiki/Branch_predication, Sep. 8, 2014, pp. 1-4.
Microsoft Computer Dictionary, 5th Edition, Microsoft Press, Redmond, WA, 2002, pp. 238-239 and 529.
U.S. Appl. No. 12/396,464, Notice of Allowance mailed on Sep. 3, 2014, 7 pages.
U.S. Appl. No. 12/548,187, Advisory Action mailed on Sep. 26, 2014, 6 pages.
U.S. Appl. No. 12/548,281, Final Office Action mailed on Aug. 13, 2014, 19 pages.
U.S. Appl. No. 12/957,201, Non-Final Office Action mailed on Jul. 30, 2014, 12 pages.
U.S. Appl. No. 13/764,560, Non-Final Office Action mailed on Sep. 12, 2014, 23 pages.
U.S. Appl. No. 13/770,969, Non-Final Office Action mailed on Aug. 7, 2014, 9 pages.
U.S. Appl. No. 14/302,031, Non-Final Office Action mailed on Aug. 27, 2014, 19 pages.
Abadi et al., Aurora: a new model and architecture for data stream management, The VLDB Journal The International Journal on Very Large Data Bases, vol. 12, No. 2, Aug. 1, 2003, pp. 120-139.
Balkesen et al., Scalable Data Partitioning Techniques for Parallel Sliding Window Processing over Data Streams, 8th International Workshop on Data Management for Sensor Networks, Aug. 29, 2011, pp. 1-6.
Chandrasekaran et al., PSoup: a system for streaming queries over streaming data, The VLDB Journal The International Journal on Very Large Data Bases, vol. 12, No. 2, Aug. 1, 2003, pp. 140-156.
Dewson, Beginning Sol Server 2008 for Developers: From Novice to Professional, a Press, Berkeley, CA, 2008, pp. 337-349 and 418-438.
Harish D et al., Identifying robust plans through plan diagram reduction, PVLDB '08, Auckland, New Zealand, Aug. 23-28, pp. 1124-1140.
Krämer, Continuous Queries Over Data Streams—Semantics and Implementation, Fachbereich Mathematik und Informatik der Philipps-Universitat, Marburg, Germany, Retrieved from the Internet: URL:http://archiv.ub.uni-marburg.de/dissjz007/0671/pdfjdjk.pdf, Jan. 1, 2007; 313 pages.
International Application No. PCT/US2013/062047, International Search Report and Written Opinion mailed on Jul. 16, 2014, 12 pages.
International Application No. PCT/US2013/062050, International Search Report & Written Opinion mailed on Jul. 2, 2014, 13 pages.
International Application No. PCT/US2013/062052, International Search Report & Written Opinion mailed on Jul. 3, 2014, 12 pages.
International Application No. PCT/US2013/073086, International Search Report and Written Opinion mailed on Mar. 14, 2014.
International Application No. PCT/US2014/017061, International Search Report mailed on Sep. 9, 2014, 4 pages.
Rao et al., Compiled Query Execution Engine using JVM, ICDE '06, Atlanta, GA, Apr. 3-7, 2006, 12 pages.
Ray et al., Optimizing complex sequence pattern extraction using caching, data engineering workshops (ICDEW)~ 2011 IEEE 27th international conference on IEEE, Apr. 11, 2011, pp. 243-248.
Shah et al., Flux: an adaptive partitioning operator for continuous query systems, Proceedings of the 19th International Conference on Date Engineering, Mar. 5-8, 2003, pp. 25-36.
Stillger et al., LEO—DB2's Learning Optimizer, Proc. of the VLDB, Roma, Italy, Sep. 2001, pp. 19-28.
Babu et al., "Exploiting k-Constraints to Reduce Memory Overhead in Continuous Queries Over Data Streams", ACM Transactions on Database Systems (TODS) vol. 29 Issue 3, Sep. 2004, 36 pages.
Tho et al. "Zero-latency data warehousing for heterogeneous data sources and continuous data streams," 5th International Conference on Information Integrationand Web-based Applications Services (Sep. 2003) 12 pages.
"SQL Subqueries"—Dec. 3, 2011, 2 pages.
"Caching Data with SqiDataSource Control"—Jul. 4, 2011, 3 pages.
"SCD—Slowing Changing Dimensions in a Data Warehouse"—Aug. 7, 2011, one page.
Non-Final Office Action for U.S. Appl. No. 13/838,259 dated Oct. 24, 2014, 21 pages.
Notice of Allowance for U.S. Appl. No. 13/102,665 dated Nov. 24, 2014, 9 pages.
Non-Final Office Action for U.S. Appl. No. 13/827,631 dated Nov. 13, 2014, 10 pages.
Non-Final Office Action for U.S. Appl. No. 13/827,987 dated Nov. 6, 2014, 9 pages.
Non-Final Office Action for U.S. Appl. No. 11/601,415 dated Oct. 6, 2014, 18 pages.
Non-Final Office Action for U.S. Appl. No. 14/077,230 dated Dec. 4, 2014, 30 pages.
Non-Final Office Action for U.S. Appl. No. 13/828,640 dated Dec. 2, 2014, 11 pages.
Non-Final Office Action for U.S. Appl. No. 13/830,428 dated Dec. 5, 2014, 23 pages.
Non-Final Office Action for U.S. Appl. No. 13/830,502 dated Nov. 20, 2014, 25 pages.
Non-Final Office Action for U.S. Appl. No. 13/839,288 dated Dec. 4, 2014, 30 pages.
International Application No. PCT/US2014/010832, Written Opinion mailed on Dec. 15, 2014, 5 pages.
International Application No. PCT/US2014/010920, International Search Report and Written Opinion mailed on Dec. 15, 2014, 10 pages.
International Application No. PCT/US2014/017061, Written Opinion mailed on Feb. 3, 2015, 6 pages.
U.S. Appl. No. 12/949,081, Non-Final Office Action mailed on Jan. 28, 2015, 20 pages.
U.S. Appl. No. 12/957,201, Notice of Allowance mailed on Jan. 21, 2015, 5 pages.
U.S. Appl. No. 13/089,556, Notice of Allowance mailed on Oct. 6, 2014, 7 pages.
U.S. Appl. No. 13/107,742, Final Office Action mailed on Jan. 21, 2015, 23 pages.
U.S. Appl. No. 13/177,748, Non-Final Office Action mailed on Feb. 3, 2015, 22 pages.
U.S. Appl. No. 13/770,961, Non-Final Office Action mailed on Feb. 4, 2015, 22 pages.
U.S. Appl. No. 13/770,969, Notice of Allowance mailed on Jan. 22, 2015, 5 pages.
U.S. Appl. No. 13/829,958, Non-Final Office Action mailed on Dec. 11, 2014, 15 pages.
U.S. Appl.No. 13/906,162, Non-Final Office Action mailed on Dec. 29, 2014, 10 pages.
Notice of Allowance for U.S. Appl. No. 12/548,187 dated Aug. 17, 2015, 18 pages.
Notice of Allowance for U.S. Appl. No. 13/107,742 dated Jul. 8, 2015, 9 pages.

(56) References Cited

OTHER PUBLICATIONS

Non-Final Office Action for U.S. Appl. No. 14/037,072 dated Jul. 9, 2015, 12 pages.
Non-Final Office Action for U.S. Appl. No. 13/830,781,502 dated Jun. 30, 2015, 25 pages.
Non-Final Office Action for U.S. Appl. No. 14/036,659 dated Aug. 13, 2015, 33 pages.
Non-Final Office Action for U.S. Appl. No. 13/830,759 dated Aug. 7, 2015, 23 pages.
International Preliminary Report on Patentability dated Jul. 29, 2015 for PCT/US2014/010920, 30 pages.
International Preliminary Report on Patentability dated Jul. 29, 2015 for PCT/US2014/039771, 24 pages.
Cranor et al. "Gigascope: a stream database for network applications," Proceedings of the 2003 ACM SIGMOD international conference on Management of data, pp. 647-651 (Jun. 2003).
Oracle® Complex Event Processing EPL Language Reference 11g Release 1 (11.1.1.4.0), E14304-02, Jan. 2011, 80 pages.
De Castro Alves, A General Extension System for Event Processing Languages, DEBS '11, New York, NY, USA, Jul. 11-15, 2011, pp. 1-9.
Takenaka et al., A scalable complex event processing framework for combination of SQL-based continuous queries and C/C++ functions, FPL 2012, Oslo, Norway, Aug. 29-31, 2012, pp. 237-242.
Tomàs et al., RoSeS: A Continuous Content-Based Query Engine for RSS Feeds, DEXA 2011, Toulouse, France, Sep. 2, 2011, pp. 203-218.
Non-Final Office Action for U.S. Appl. No. 13/830,378 dated Feb. 25, 2015, 23 pages.
Non-Final Office Action for U.S. Appl. No. 13/830,129 dated Feb. 27, 2015, 19 pages.
International Application No. PCT/US2014/068641, International Search Report and Written Opinion mailed on Feb. 26, 2015, 11 pages.
European Patent Application No. 12783063.6, Extended Search Report mailed Mar. 24, 2015, 6 pages.
Non-Final Office Action for U.S. Appl. No. 12/913,636 dated Apr. 1, 2015, 22 pages.
Final Office Action for U.S. Appl. No. 13/827,631 dated Apr. 3, 2015, 11 pages.
Notice of Allowance for U.S. Appl. No. 13/839,288 dated Apr. 3, 2015, 12 pages.
Notice of Allowance for U.S. Appl. No. 14/077,230 dated Apr. 16, 2015, 16 pages.
Final Office Action for U.S. Appl. No. 13/764,560 dated Apr. 15, 2015, 19 pages.
Final Office Action for U.S. Appl. No. 14/302,031 dated Apr. 22, 2015, 23 pages.
Non-Final Office Action for U.S. Appl. No. 14/692,674 dated Jun. 5, 2015, 22 pages.
Non-Final Office Action for U.S. Appl. No. 14/037,171 dated Jun. 3, 2015, 15 pages.
Non-Final Office Action for U.S. Appl. No. 14/830,735 dated May 26, 2015, 19 pages.
Final Office Action for U.S. Appl. No. 13/830,428 dated Jun. 4, 2015, 21 pages.
Non-Final Office Action for U.S. Appl. No. 14/838,259 dated Jun. 9, 2015, 37 pages.
Final Office Action for U.S. Appl. No. 14/906,162 dated Jun. 10, 2015, 10 pages.
Non-Final Office Action for U.S. Appl. No. 14/037,153 dated Jun. 19, 2015, 23 pages.
Final Office Action for U.S. Appl. No. 13/829,958 dated Jun. 19, 2015, 17 pages.
Final Office Action for U.S. Appl. No. 13/827,987 dated Jun. 19, 2015, 10 pages.
Final Office Action for U.S. Appl. No. 13/828,640 dated Jun. 17, 2015, 11 pages.
International Application No. PCT/US2014/039771, International Search Report and Written Opinion mailed on Apr. 29, 2015 6 pages.
International Application No. PCT/US2015/016346, International Search Report and Written Opinion mailed on May 4, 2015, 9 pages.
International Preliminary Report on Patentability dated Apr. 9, 2015 for PCT/US2013/062047, 10 pages.
International Preliminary Report on Patentability dated Apr. 9, 2015 for PCT/US2013/062052, 18 pages.
International Preliminary Report on Patentability dated May 28, 2015 for PCT/US2014/017061, 31 pages.
International Preliminary Report on Patentability dated Jun. 18, 2015 for PCT/US2013/073086, 7 pages.
Non-Final Office Action for U.S. Appl. No. 14/079,538 dated Oct. 22, 2015, 34 pages.
Non-Final Office Action for U.S. Appl. No. 13/906,162 dated Oct. 28, 2015, 11 pages.
Notice of Allowance for U.S. Appl. No. 14/302,031 dated Nov. 3, 2015, 18 pages.
Final Office Action for U.S. Appl. No. 12/949,081 dated Nov. 17, 2015, 19 pages.
Final Office Action for U.S. Appl. No. 13/830,378 dated Nov. 5, 2015, 28 pages.
Non-Final Office Action for U.S. Appl. No. 13/830,502 dated Dec. 11, 2015, 25 pages.
Non-Final Office Action for U.S. Appl. No. 11/601,415 dated Nov. 13, 2015, 18 pages.
Japan Patent Office office actions JPO patent application JP2013-529376 (Aug. 18, 2015).
Final Office Action for U.S. Appl. No. 13/177,748 dated Aug. 21, 2015, 24 pages.
Non-Final Office Action for U.S. Appl. No. 14/036,500 dated Aug. 14, 2015, 26 pages.
Notice of Allowance for U.S. Appl. No. 13/830,129 dated Sep. 22, 2015, 9 pages.
Final Office Action for U.S. Appl. No. 13/770,961 dated Aug. 31, 2015, 28 pages.
Non-Final Office Action for U.S. Appl. No. 13/764,560 dated Oct. 6, 2015, 18 pages.
Non-Final Office Action for U.S. Appl. No. 14/621,098 dated Oct. 15, 2015, 21 pages.
Notice of Allowance for U.S. Appl. No. 14/692,674 dated Oct. 15, 2015, 10 pages.
Notice of Allowance for U.S. Appl. No. 14/037,171 dated Oct. 15, 2015, 14 pages.
"Oracle Complex Event Processing Exalogic Performance Study" an Oracle White Paper, Sep. 2011, 16 pages.
"Data stream management system", Wikipedia, downloaded from en.wikipedia.org/wiki/Data_stream_management_system on Sep. 23, 2015, pp. 1-5.
Josifovsky, Vanja, et al., "Querying XML Streams", the VLDB Journal, vol. 14, © 2005, pp. 197-210.
Purvee, Edwin Ralph, "Optimizing SPARQLeR Using Short Circuit Evaluation of Filter Clauses", Master of Science Thesis, Univ. Of Georgia, Athens, GA, © 2009, 66 pages.
Weidong, Yang, et al., "LeoXSS: An Efficient XML Stream System for Processing Complex XPaths", CIT 2006, Seoul, Korea, © 2006, 6 pages.
China Patent Office office actions for patent application CN201180053021.4 (Oct. 28, 2015).

\* cited by examiner

EXTENSIBLE INDEXING FRAMEWORK USING DATA CARTRIDGES

CROSS-REFERENCES TO RELATED APPLICATIONS

The present application claims benefit under 35 USC 119 (e) of the following provisional applications, the entire contents of which are incorporated herein by reference for all purposes:

(1) U.S. Provisional Application No. 61/327,903 filed Apr. 26, 2010, titled EXTENSIBLE INDEXING FRAMEWORK USING DATA CARTRIDGES;

(2) U.S. Provisional Application No. 61/290,460 filed Dec. 28, 2009, titled EXTENSIBILITY PLATFORM USING DATA CARTRIDGES; and (3) U.S. Provisional Application No. 61/311,175 filed Mar. 5, 2010, titled EXTENSIBILITY PLATFORM USING DATA CARTRIDGES.

BACKGROUND

Embodiments of the present invention relate to data processing and more particularly to techniques for extending indexing capabilities using a data cartridge.

Databases have traditionally been used in applications that require storage of data and querying capability on the stored data. Existing databases are thus best equipped to run queries over a finite stored data set. The traditional database model is however not well suited for a growing number of modern applications in which data is received as a stream of data events instead of being stored as a bounded data set. A data stream, also referred to as an event stream, is characterized by a real-time, potentially continuous, sequence of events. A data or event stream thus represents a potentially unbounded stream of data. Examples of sources of events may include various sensors and probes (e.g., RFID sensors, temperature sensors, etc.) configured to send a sequence of sensor readings, financial tickers sending out pricing information, network monitoring and traffic management applications sending network status updates, events from click stream analysis tools, global positioning systems (GPSs) sending GPS data, and others.

Oracle Corporation™ provides a system (referred to as Complex Event Processing (CEP) system) for processing such event streams. A CEP system is quite different from a relational database management system (RDBMS) in which data is stored in a database and then processed using one or more queries. In a CEP system, a query is run continuously and query processing performed in real-time as events in a stream are received by the system.

A CEP system can receive data events from various different sources for various different applications. Accordingly, the data that is received may not follow a fixed format or schema but may be more heterogeneous in nature (e.g., binary data, XML data without an associated schema). For example, the data that is received may include streams of image data for an image processing application, streams of audio data for an audio processing application, streams of spatial or geographic or location data for a GPS application, streams of stock data for a financial application, and the like. As a result of the different data types and sources and their different data manipulation requirements, specialized functions or methods are usually needed to process the streaming data. While a CEP system provides support for some native data types and/or methods/functions for the native data types, these native data types or functions are many times not sufficient to cover the diverse types of processing needed by applications that use a CEP system. This in turn reduces the usefulness of the CEP system.

As a result, processing platforms, such as CEP systems, constantly have to be extended by application developers and service providers to support heterogeneous data formats and their data manipulation mechanisms in order to interact/interoperate with diverse sources of events and data. For example, consider a CEP system that processes localization events emitted by GPS devices. Such a CEP system would need to understand spatial data formats and functions related to the spatial data format.

In the past, the capabilities of a CEP system were extended exclusively through user defined functions (UDFs) or special code (e.g., customized Java beans). To achieve extensibility, an application developer for a specific application had to define customized user defined functions (UDFs) to interact with the specialized application. The application developer had to design one function at a time and define the function's interface based upon predefined data types provided by the CEP system. This process however has several drawbacks and inefficiencies. The UDFs that are designed are very application-scoped and are thus hard to re-use amongst other applications of the CEP system. The UDFs cannot be reused since they are closely coupled or tied to the application defining the UDF. For example, a UDF defined for a video-processing application cannot be used in another application. Further, the UDFs are individually defined and cannot be grouped into domains (e.g., spatial), therefore making their management difficult. Additionally, UDFs provide a poor programming experience, as the usage of the extension in the form of a UDF is not transparent to the user.

BRIEF SUMMARY

Embodiments of the present invention provide a framework or infrastructure (extensibility framework/infrastructure) for extending the indexing capabilities of an event processing system. The capabilities of an event processing system may be extended to support indexing schemes, including related data types and operations, which are not natively supported by the event processing system. The extensibility is enabled by one or more plug-in extension components called data cartridges. Indexing schemes defined by a data cartridge can be integrated with the event processing system to extend the indexing capabilities of the event processing system.

In one embodiment, a query may be compiled using information provided by a data cartridge to generate executable code. The executable code that is generated as a result of the compilation may comprise an index instance generated using information provided by the data cartridge, where the index instance is generated for evaluation of a first function occurring in the query. The executable code may then be executed, where the execution causes execution of a function provided by the data cartridge related to the index instance. In one embodiment, the executable code may be executed upon receiving an event via an event stream, the event comprising data and a time stamp.

In one embodiment, the query may be parsed to determine an occurrence of a link definition in the query, where the link definition identifies the first function and the data cartridge. A list of input arguments to the first function may be determined, wherein the list of input arguments comprises a collection. A determination may then be made whether the data cartridge provides an index for evaluation of the first function with the set of input arguments.

In one embodiment, information may be communicated to the data cartridge identifying the first function. A position of the collection in the list of input arguments may also be communicated to the data cartridge. In response, metadata information may be received from the data cartridge, the metadata information identifying an index type to be used for evaluating the first function for the collection. The index instance may then be generated based upon the index type. The metadata information may comprise context information. In one embodiment, the context information comprises information identifying the function provided by the data cartridge. The information identifying the function may be communicated to the data cartridge during execution of the executable code.

In one embodiment, the first function occurring in the query may be categorized into one of a first category, a second category, or a third category. Categorization of the first function into the first category indicates that the system provides an index for evaluation of the first function. Categorization of the first function into the second category indicates that a data cartridge provides an index for evaluation of the first function. Categorization of the first function into the third category indicates that no index is provided for evaluation of the first function.

In one embodiment, the index instance generated for evaluation of the first function is also used to evaluate a second function. For example, a collection may be provided as an input argument for both the first function and the second function and the index instance is generated for the collection.

In one embodiment, a collection comprising a plurality of elements may be provided as an input argument to the first function. The function provided by the data cartridge may be an index scan function using the index instance. A result set may be received from execution of the function provided by the data cartridge, the result set resulting from evaluation of the first function and comprising a set of items from the collection.

In one embodiment, the result set may comprise a set of items from the collection resulting from evaluation of the first function and also additional one or more items from the collection. The exact result set resulting from evaluation of the first function may then be determined from the result set.

The foregoing, together with other features and embodiments will become more apparent when referring to the following specification, claims, and accompanying drawings.

DETAILED DESCRIPTION

In the following description, for the purposes of explanation, specific details are set forth in order to provide a thorough understanding of embodiments of the invention. However, it will be apparent that the invention may be practiced without these specific details.

Embodiments of the present invention provide a framework or infrastructure (extensibility framework/infrastructure) for extending the indexing capabilities of an event processing system. In one embodiment, the capabilities of an event processing system are extended to support indexing schemes, including related data types and operations, which are not natively supported by the event processing system. The extensibility is enabled by one or more plug-in extension components called data cartridges.

A data cartridge is a self-contained manageable unit that provides information for extending the capabilities of an event processing system. In one embodiment, a data cartridge comprises indexing-related information used for extending the indexing capabilities of the event processing system. Using such a data cartridge enables indexing schemes defined by the data cartridge to be integrated with the event processing system to extend the indexing capabilities of the event processing system.

In addition to indexing, data cartridges may also be used to extend other capabilities of an event processing system that is configured to process a stream of events. In one embodiment, data cartridges may be used in conjunction with an event processing system such as a Complex Event Processing (CEP) system provided by Oracle Corporation™. A data cartridge is a manageable unit that comprises information that is used to extend the functionality of an event processing system. In one embodiment, a data cartridge comprises information for a set of extensible objects that extend the capabilities of an event processing system. Examples of capabilities that may be extended include providing support for extensible data types, functions, indexing options, different sources of data, and others.

Figure 1:
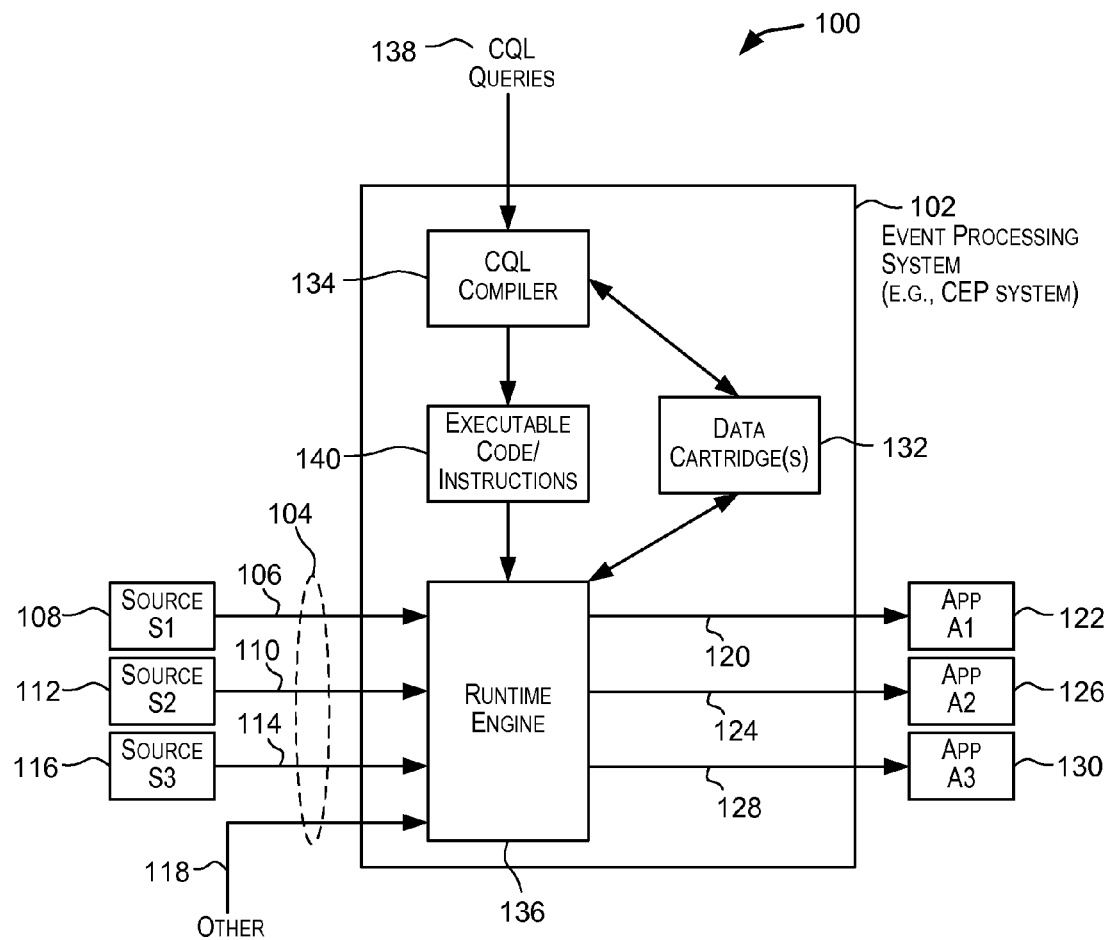
FIG. 1 is a simplified block diagram of a system that may incorporate an embodiment of the present invention.

FIG. 1 is a simplified block diagram of a system 100 that may incorporate an embodiment of the present invention. As depicted in FIG. 1, system 100 comprises an event processing system 102 that is configured to process event streams. Event processing system 102 may be a CEP system provided by Oracle Corporation™. Other event processing systems provided by other vendors may be used in alternative embodiments. The embodiment depicted in FIG. 1 is not intended to limit the scope of embodiments of the invention. Variations having more or less components than shown in FIG. 1 are possible in alternative embodiments.

Event processing system 102 may receive one or more inputs 104. Inputs 104 may include one or more event streams received from one or more sources. For example, as depicted in FIG. 1, event processing system 102 receives an event stream 106 from a source S1 108, an event stream 110 from a source S2 112, and another event stream 114 from a source S3 116. The sources may be diverse, for example, source S1 may be an RFID sensor providing a stream of sensor readings, source S2 may be a GPS device providing a stream of spatial coordinates, and source S3 may be a financial server providing a stream of stock prices. Accordingly, the type of events received on one stream may be different from events received on another stream. Event processing system 102 may receive the streams via a push-based mechanism or a pull-based mechanism or other mechanisms.

In one embodiment, an event stream is a real-time sequence of events. In one embodiment, an event stream may be considered as a sequence of <tuple, timestamp> pairs, with each tuple referring to the data portion of a stream. Multiple tuples may be received via a stream, each with its associated timestamp. The timestamps associated with the tuples define a chronological order over the tuples in an event stream. The timestamps associated with events received in an event stream may reflect an application's notion of time. For example, the timestamp may be set by an application on event processing system 102 receiving or processing the event stream. The receiving system may timestamp an event on receipt as configured by the application, for example, if specified in the CREATE STREAM DDL that is used to define a structure of the events stream and the mechanism used to use application time or system time as the timestamp. In other embodiments, the timestamp associated with a tuple may correspond to the time of the application sending the data event. The timestamp is part of the schema of a stream. There could be one or multiple tuples with the same timestamp in a stream. An event stream can thus be considered to comprise a series of events, each with an associated timestamp. For purposes of this application, the terms "tuple" and "event" are being used interchangeably.

Inputs 104 may also include other inputs 118 such as collections of elements (e.g., a Relation). These other inputs 118 may be received from various sources including applications executing on external systems or even on event processing system 102. For example, other inputs 118 may comprise datasets (e.g., Relations) configured by applications executing on systems external to event processing system 102 or on event processing system 102. The contents of a dataset may vary over time. For example, the contents of a Relation may be changed over time by adding one or more elements to the Relation, deleting one or more elements from the Relation, or updating the Relation.

Event processing system 102 is configured to process the received inputs and generate one or more outbound streams of events from the processing. Events processing system 102 may be configured to process inputs 104 based upon rules configured for the event processing system that determine the runtime behavior of the system. In one embodiment, these rules are expressed as queries using a query language. An example of such a query language is Oracle Continuous Query Language (Oracle CQL) (referred to as CQL). CQL is a query language based upon SQL with added constructs that support streaming data. A query written using CQL may be referred to as a CQL query. The queries are used for processing the inputs and generating the outbound streams. Queries typically perform filtering and aggregation functions to discover and extract one or more events from the input streams. The CQL queries thus determine the runtime behavior of event processing system 102. The queries may represent the runtime conditions that are to be monitored over the streams.

The queries executed by an event processing system, such as event processing system 102 depicted in FIG. 1, are different from queries that are executed in a typical relational database management system (RDBMS). In an RDBMS, the data is stored in a database and a query is executed over the stored data. The lifetime of the query thus ends upon its execution. In event processing system 102, due to the streaming nature of the inputs, queries are run over a continuing period of time over time-varying data received over inputs such as input streams. Accordingly, these queries are referred to as continuous queries.

The outbound streams generated by event processing system 102 from the processing of the input streams may be provided to one or more applications. For example, as depicted in FIG. 1, an outbound stream 120 is provided to application A1 122, a second outbound stream 124 is provided to application A2 126, and a third outbound stream 128 is provided to application A3 130. An application receiving an outbound stream may perform further processing on the stream. The applications receiving the outbound stream may be executing on event processing system 102 or some other system.

Event processing system 102 may natively support a fixed set of data types and operations on those data types (referred to as native data types and operations). For purposes of this application, the terms operation and function are used synonymously. These native data types and operations are not sufficient to support heterogeneous data formats received via the input streams and functions (e.g., data manipulation functions) related to the data formats. According to an embodiment of the present invention, the capabilities of event processing system 102 may be extended through the use of one or more data cartridges 132. For example, in one embodiment, one or more data cartridges may be used to extend the indexing capabilities of event processing system 102 by enabling support for indexing schemes, including related data types and operations, which are not natively supported by event processing system 102. A data cartridge may define indexing-related information (e.g., domain-specific operators and indexing operations) that is used for extending the indexing capabilities of event processing system 102. The indexing-related information stored by a data cartridge may enable support for data types, related operations, and indexing schemes which are not natively provided by event processing system 102. The data cartridge framework thus enables these extended capabilities provided by a data cartridge to be integrated with event processing system 102.

For example, event processing system 102 may natively support only a limited rudimentary set of indexing schemes and related data types and operations. For instance, event processing system 102 may natively only support indexing schemes based upon a hash index or a balanced tree and support simple operations such as (=, >, <, >=, <=) over these data types. However, these indexing schemes are not sufficient to support the different types of data (such as spatial, audio, video, etc.) that may be received by event processing system 102 for processing over one or more event streams. The native operations supported by event processing system 102 cannot efficiently support operations over these non-natively supported data types. For example, for spatial data, specialized indexing schemes such as those based upon R-Trees may be needed to support various operations over the spatial data. Such data types, indexing schemes for these data types, or operations that these schemes enable efficient implementations for may not be supported natively by event processing system 102. Data cartridges provide a framework for extending the indexing capabilities of event processing system 102 by enabling the ability to support non-natively supported indexing schemes including related data types and operations.

In one embodiment, the framework for extending the indexing capabilities of event processing system 102 using a data cartridge relies upon cooperative indexing between the data cartridge and event processing system 102. For example, a data cartridge configured for extending the indexing capabilities of event processing system 102 may provide information that is used by event processing system 102 to build and maintain indexes for different functions and associated data types that are not natively supported by event processing system 102. In one embodiment, the data cartridge is responsible for defining the non-natively supported index structures, maintaining the index content during insert/update/delete operations, and enabling operations to be performed using the index structures (e.g., searching the index during query processing) by event processing system 102. The extended indexing-related operations and data types are thus not native to event processing system 102 but rather are owned and provided for by the data cartridge.

With a framework supporting data cartridges, CQL queries specified for event processing system 102 may not only reference capabilities provided natively by event processing system 102 but also reference extended capabilities enabled by one or more data cartridges 132. For example, a CQL query may refer to objects (e.g., data types, functions, indexes, sources) that are not natively supported by event processing system 102. In this manner, data cartridges 132 enable the capabilities of event processing system 102 to be extended to include support for objects not natively supported by event processing system 102. Information for these extensible objects is provided by data cartridges 132. In this manner, extensible objects provided by data cartridges 132 may be integrated with native objects and capabilities provided by event processing system 102.

From a CQL query designer's perspective, it enables a CQL query to be written that refers to, not only data types and operations natively supported by event processing system 102, but also data types and operations that are not natively supported by event processing system 102 but instead are provided by a data cartridge. In this manner, references to data types and operations that are not supported natively by event processing system 102 can be seamlessly integrated with data types and operations that are natively supported by event processing system 102 into the same query. The processing to support such queries is automatically taken care of by interactions between event processing system 102 and the data cartridge providing support for the non-native data types and operations.

Figure 2:
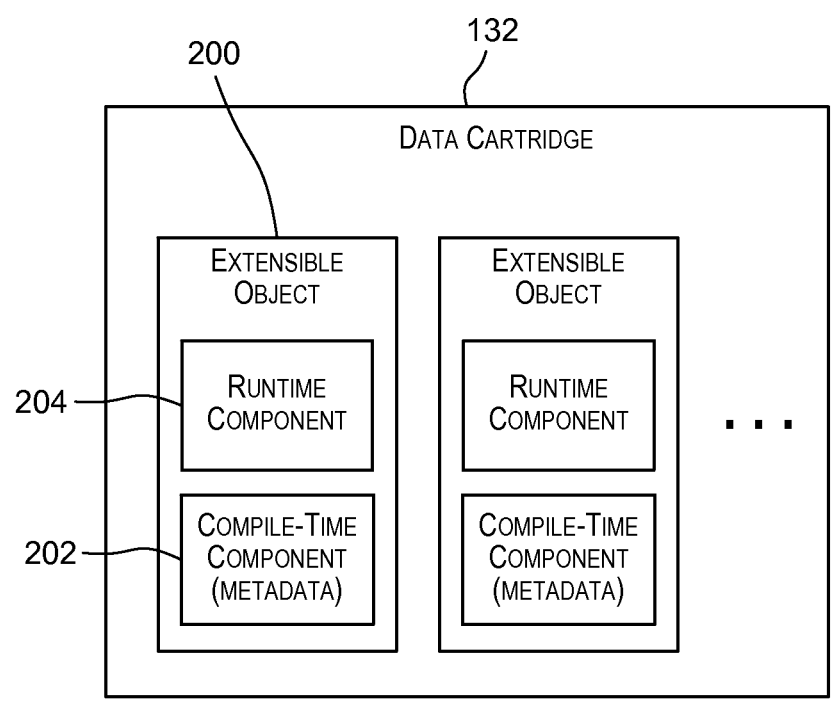
FIG. 2 depicts a simplified block diagram of contents of a data cartridge according to an embodiment of the present invention.

FIG. 2 depicts a simplified block diagram of a data cartridge 132 according to an embodiment of the present invention. As depicted in FIG. 2, data cartridge 132 stores information for one or more extensible objects 200. Examples of extensible objects for which information may be stored by data cartridge 132 include data types, functions, indexes, sources, and others. In one embodiment, the information stored for each extensible object 200 comprises two components or portions: (1) a compile-time (or metadata) component 202 that describes the extensible object in enough details that enables the extensible object to be compiled including performing compilation-related tasks such as necessary type checking, and the like; and (2) a runtime component 204 that is invoked at execution time or runtime.

In one embodiment, compile-time component 202 is used for compilation of queries. The compile-time component of an extensible object comprises information (referred to generically as metadata) that describes the extensible object in enough detail so that the compilation of queries referencing the extensible object by the event processing system is able to proceed and perform all the necessary syntactic and semantic analysis and generate execution instructions that are executable at runtime. The extensible objects may be of different classes. The different classes of extensible objects may define different sets of metadata. In one embodiment, the extensible data type metadata includes the signature of an extensible object's methods, fields, and constructors.

In one embodiment, all metadata provided by a data cartridge is managed by the cartridge itself and not by the event processing system. This strategy avoids the need to keep data in-sync between the data cartridge and the event processing system or to pollute the event processing system with external data definitions. More details on how these components or portions of a data cartridge are used are provided below.

Referring back to FIG. 1, event processing system 102 comprises a compiler 134 and a runtime engine 136. Compiler 134 is configured to compile one or more queries 138 (e.g., CQL queries) and generate executable code/instructions 140. In one embodiment, the compile-time component 202 stored by a data cartridge for an extensible object is used by compiler 134 during the compilation process. The code/instructions 140 generated as a result of the compilation may be executed during runtime to process incoming events. Code/instructions 140 may comprise call-outs to functions that are implemented by the runtime component 204 stored by data cartridge 132 for the extensible object. In this manner, a data cartridge provides both compile-time support and runtime implementations for an extensible object. The outbound data streams generated by the execution of the code/instructions may then be forwarded to one or more applications 122, 126, and 130.

In the embodiment depicted in FIG. 1, compiler 134 and runtime engine 136 are shown to be part of the same event processing system 102. In alternative embodiment, these components may be on different systems. For example, in one embodiment, the compilation-related processing may be performed by one system while runtime processing may be performed by another system, both having access to the requisite data cartridges.

Several interactions may take place between event processing system 102 and a data cartridge 132 both during the compilation phase and during the runtime phase. During the query compilation phase, compiler 134 may interact with a data cartridge to receive from and send to the data cartridge information that facilitates compilation of the query and generation of executable code. During the runtime processing or execution phase, execution of the code generated during the compilation phase may cause interactions and exchange of information between runtime engine 136 and data cartridge 132. For example, whenever a callout is encountered in the executable code and the implementation of the callout is provided by the data cartridge, the event processing system may interact with the data cartridge.

Figure 3:
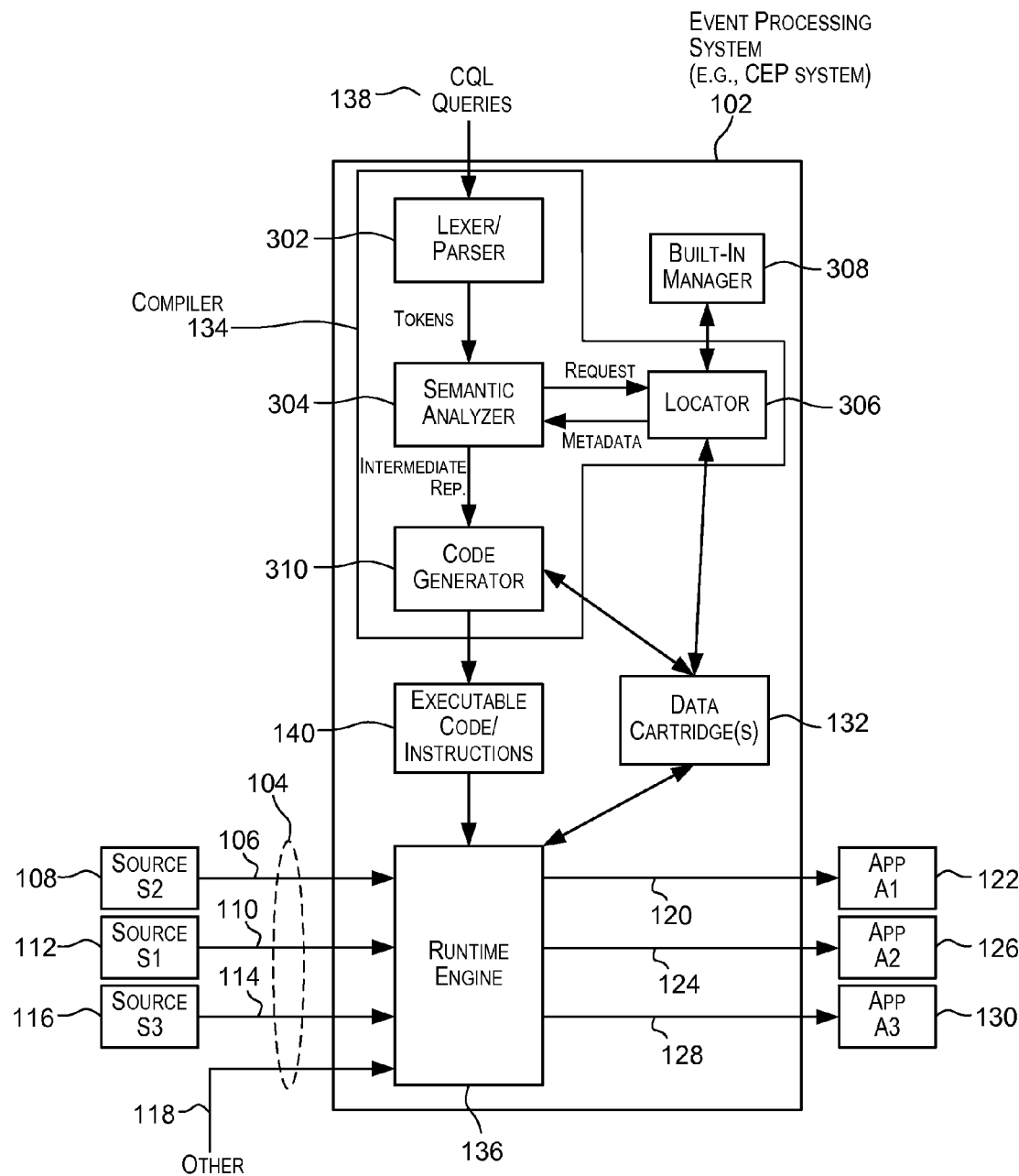
FIG. 3 depicts another simplified block diagram of an event processing system according to an embodiment of the present invention.

FIG. 3 depicts another simplified block diagram of event processing system 102 according to an embodiment of the present invention. As in FIG. 1, event processing system 102 comprises a compiler 134 and a runtime engine 136. Further, as depicted in FIG. 3, compiler 134 may comprise a lexer/parser 302, a semantic analyzer 304, a locator module 306, and a code generator module 310. The components of compiler 134 may be implemented in software (code or instructions executed by a processor) or hardware, or combinations thereof. The software may be stored on a non-transitory computer-readable storage medium. The embodiment of event processing system 102 depicted in FIG. 3 is not intended to limit the scope of embodiments of the invention. Variations having more or less components than shown in FIG. 3 are possible in alternative embodiments.

At a conceptual level, the processing performed by event processing system 102 may be divided into design-time (or compile-time) processing and runtime processing. During design-time processing, compiler 134 is configured to receive one or more continuous queries configured for the event processing system and to compile the queries. The compilation results in generation of executable code/instructions 140. One or more CQL queries may be compiled as a set to generate executable code/instructions 140. During runtime processing, runtime engine 136 executes executable code/instructions 140 to process the incoming event streams.

Accordingly, at design-time, one or more queries (e.g., CQL queries) 138 may be provided as inputs to compiler 134. Parser 302 of compiler 134 is configured to parse the input queries based upon a grammar. For example, a CQL query may be parsed according to a CQL grammar. The tokens generated by parser 302 from parsing the query are then passed to semantic analyzer 304 for further processing.

In one embodiment, the association between an extensible object and a repository (e.g., a data cartridge) storing metadata for the object is done though a link name or definition, which is specified in the query using the query language. In one embodiment, a CQL query programmer may use the following CQL code syntax to define a link definition in a query:

object@source

In this embodiment, the @ symbol signals to the compiler that a link definition is present. The string immediately before the @ symbol refers to an object or component (e.g., an extensible object) that is to be compiled and the string immediately after the @ symbol identifies the source or repository of the metadata to be used for compiling the object. The two strings are tokenized by parser 302 and provided to semantic analyzer 304 for semantic analysis. In this manner, a link definition is provided at the query language level that enables compiler 134 of event processing system 102 to identify the component to be compiled and the source of the metadata (e.g., a data cartridge) to be used for compiling that query component. In one embodiment, a default data cartridge may be used if no specific data cartridge is identified.

Usage examples include:

(1) foo@java.

where "foo" identifies an object or component (e.g., an extensible function) that is to be compiled using a "java" data cartridge, which stores metadata to be used for compiling the identified "foo" object. The object may be an extensible object such as an extensible data type, an extensible index, etc. For example, "foo" may refer to a function that uses extensible indexing and is to be compiled using the "java" data cartridge.

(2) foo@scala.

Here, the component "foo" is to be compiled using a data cartridge named "scala" (different from the "java" data cartridge) that provides the metadata to be used for compiling component "foo."

(3) CONTAINS@SPATIAL(R1.polygon, R2.point)

Here, "CONTAINS" identifies the function and "SPATIAL" identifies the data cartridge. As part of the parsing, arguments, if any, defined for a function may also be determined and tokenized. In this example, the arguments of function CONTAINS include "R1.polygon" and "R2.point".

In one embodiment, before a data cartridge can be used by an event processing system, the data cartridge has to be registered with the event processing system. Various data cartridges may be registered with event processing system 102. The registration information stored for a data cartridge may identify the name of the data cartridge, e.g., "scala", "java", etc. The registration information may be stored in a registry of event processing system 102 and used during the compilation phase. For example, when a particular data cartridge is identified by a link definition in a query, information for the data cartridge may be fetched from the registration repository.

As described above, as part of the compilation process, parser 302 of event processing system 102 may parse CQL query 138 to identify occurrences of link definitions in the query. In one embodiment, the processing comprises parsing the CQL query to look for occurrences of the @ symbol, and for each occurrence, determining the object to be compiled, the source of metadata for compiling the object, and arguments, if any, to the object. The tokens generated by parser 302 are then passed to semantic analyzer 304 for semantic analysis.

Semantic analyzer 304 is configured to perform semantic analysis on the query including performing type checking In one embodiment, for a set of tokens received from parser 302, semantic analyzer uses a locator 306 to retrieve metadata to be used for performing the semantic analysis related to the tokens. For example, based upon the tokens received from parser 302, semantic analyzer 304 may send a request to locator 306 to locate the metadata source or repository (e.g., a data cartridge) identified by a token. In response, locator 306 may be configured to provide semantic analyzer 304 a handle to the requested metadata source or repository.

The repository may be a system that is internal to event processing system 102. For example, for natively supported data types and/or operations, the metadata may be provided by a built-in manager 308 of event processing system 102. For extensible objects that are not natively supported by event processing system 102, the repository may be a data cartridge 132 that is registered with event processing system 102.

Semantic analyzer 304 may then access or retrieve the requisite metadata stored by the metadata source using the handle provided by locator 306. Semantic analyzer 304 may use this retrieved information to perform semantic analysis. In one embodiment, using the handle, semantic analyzer 304 can interact with the metadata source using well-known interfaces provided by the developer of the repository. For example, if the metadata source is a data cartridge 132, the data cartridge provides well known interfaces developed by the data cartridge developer to enable semantic analyzer 304 to interact with the data cartridge. These well-known interfaces may be developed by a data cartridge developer according to interface standards required of a data cartridge to make it compatible with a data cartridge infrastructure provided by event processing system 102.

From the perspective of semantic analyzer 304, it does not matter whether the handle returned by locator 306 is a handle to a data cartridge or some other source; both handles are treated and interacted with in a similar manner. Locator 306 thus provides the interface between compiler 134 and the source of the metadata that enables the source of the metadata to be decoupled from compiler 134. This enables the metadata to be provided from any source, including a source within event processing system 102 or a data cartridge 132. Additionally, the source of the metadata may be distributed, for example, made available in a cloud, etc.

For instance, in examples (1), (2), and (3) shown above, semantic analyzer 304 may request locator 306 to get handles to data cartridges "java," "scala," and "SPATIAL". These data cartridges may be pre-registered with event processing system 102 and information related to the registered data cartridges, including the names of the data cartridges and handles to the data cartridges, may be stored in a registry. Locator 306 may perform a lookup in this registry to get a handle to the requested data cartridge and provide the handle to semantic analyzer 304.

Upon receiving a handle to a metadata source such as a data cartridge, semantic analyzer 304 may interact with the data cartridge using published interfaces. For example, semantic analyzer 304 may use the interfaces to retrieve metadata from the data cartridge and use the retrieved metadata to perform semantic analysis of the query, including performing type checking for extensible objects included in the query. The result of the semantic analysis performed by semantic analyzer 304 is an intermediate representation that is provided to code generator 310 for further analysis.

In one embodiment, for an extensible object, the metadata provided to semantic analyzer 304 by a data cartridge for compilation of the extensible object includes information identifying one or more factories to be used for creating one or more instances of the extensible object. The metadata provided to compiler 134 may also include application context information that is used during runtime processing. For example, when performing spatial data analysis, a specific coordinate system usually has to be specified for performing the analysis. Different spatial data applications may use different coordinate systems. The application context information may be used to specify during runtime the coordinate system to be used for an application. This context information may be provided by data cartridge 132 to semantic analyzer 304 (or in general to compiler 134 of event processing system 102). In this manner, a data cartridge provides information to event processing system 102 during the compilation that is to be used during runtime analysis. This context information may be configured by a developer of the data cartridge. Using the context information, the data cartridge developer can set parameters to be used for runtime processing.

Code generator 310 is configured to generate an execution plan for the query being compiled and generate execution structures (executable code/instructions 140) based upon the execution plan. The execution structures that are generated may include instances of extensible objects referenced in the query. The extensible object instances may be created using one or more factories identified in the metadata retrieved from the data cartridge during compilation.

Executable instructions 140 generated by compiler 134 may then be executed at runtime by runtime engine 136 such as for processing events received via an event stream. The instructions may comprise one or more call-out instructions whose implementations are provided by the runtime component stored by the data cartridge for the extensible object. A call-out instruction executes an invocable component that is part of the runtime component stored by the data cartridge for the extensible object. In one embodiment, a call-out invokes an 'execute' call-back (i.e., function), whose implementation is provided by the data cartridge. This 'function' in the data cartridge can be implemented using different programming languages, such as a Java type, a Hadoop function, a Scala class, etc. The call-out instruction thus provides a handoff between runtime engine 136 and data cartridge 132.

The runtime implementation for a call-out function may be implemented using different languages such as Java, Scala, etc. The binding of a call-out function to its implementation happens at runtime based upon the provided data cartridge. For example, in a Java data cartridge, the implementation for the callout function may be provided in the Java language. In a Scala data cartridge, the implementation for the same function call may be provided in Scala. In an RDBMS data cartridge, the implementation for the same function may be provided in PL-SQL. Accordingly, different implementations may be provided for an extensible function (or extensible object in general) in a query using different data cartridges.

In the above example, the queries were provided in CQL language. In such an embodiment, compiler 134 and runtime engine 136 may be together referred to as the CQL engine of event processing system 102. In an alternative embodiment, other languages that provide features for streams-based processing may also be used for configuring queries executed by event processing system 102.

The use of data cartridges thus enables an event processing system to handle complex data types and related functions that are not natively supported by the event processing system. For example, object-oriented data types that may not be natively supported by an event processing system may now be supported by the event processing system using data cartridges. For example, using a Java data cartridge may enable an event processing system to support object-oriented programming.

Figure 4:
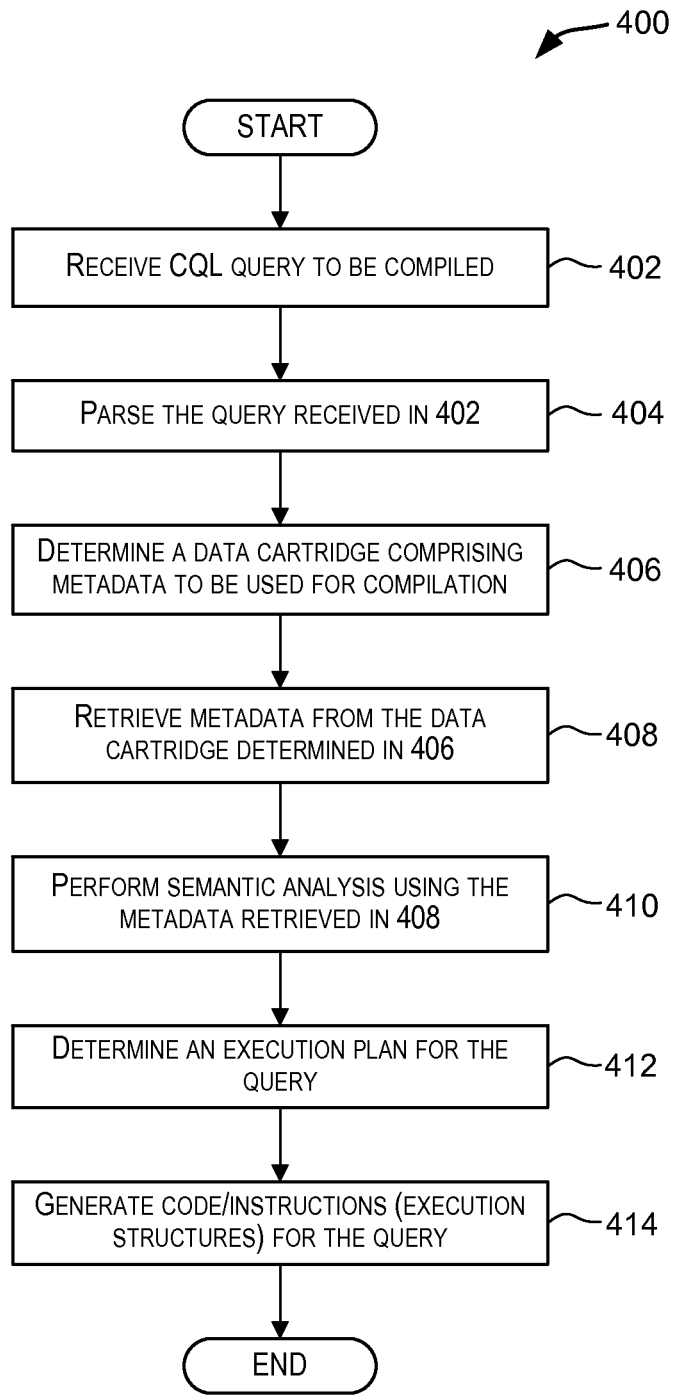
FIG. 4 depicts a simplified high-level flowchart depicting a method of compiling a query in an event processing system using a data cartridge according to an embodiment of the present invention.

FIG. 4 depicts a simplified high-level flowchart 400 depicting a method of compiling a query in an event processing system using a data cartridge according to an embodiment of the present invention. The processing depicted in FIG. 4 may be performed by software (e.g., program, code, instructions) executed by a processor, or hardware, or combinations thereof. The software may be stored on a non-transitory computer-readable storage medium. In one embodiment, the processing depicted in FIG. 4 may be performed by compiler 134 depicted in FIGS. 1 and 3.

As depicted in FIG. 4, processing is initiated upon receiving a query to be compiled (step 402). In alternative embodiments, multiple queries may be received and compiled together as a set. However, for the sake of simplicity, it is assumed that one query is received in FIG. 4. The query received in 402 may be, for example, a CQL query. The query may be received from various sources.

The query received in 402 is then parsed by a compiler into tokens (step 404). One or more data cartridges to be used for compiling extensible objects occurring in the query may then be determined based upon the set of tokens generated in 404 (step 406). For example, as part of 406, link definitions occurring in the query may be identified. These link definitions may identify the extensible objects and the data cartridges (or any other metadata sources) to be used for compiling the query.

Metadata is then retrieved from a data cartridge determined in 406 (step 408). In one embodiment, the compiler obtains a handle to each data cartridge determined in 406. Using the handle for a data cartridge, interfaces provided by the data cartridge may then be used to retrieve the metadata from the data cartridge in 408.

Semantic analysis, including type checking, is then performed using the metadata retrieved in 408 (step 410). The processing performed in 410 may include type checking.

An execution plan is then determined for the query (step 412). Code/instructions are then generated for the query based upon the execution plan determined in 412 (step 414). In one embodiment, the processing in 414 may comprise instantiating execution structures for the query. The code/instructions generated in 414 including the execution structures may be stored on a non-transitory computer-readable storage medium. The execution structures may be generated using one or more factories identified by the metadata retrieved in 408. The code/instructions generated in 414 may then be executed during runtime for processing event streams received by event processing system 102.

As previously described, in one embodiment, as part of the compilation process, the metadata retrieved from a data cartridge may include context information that is to be used during runtime processing. This context information may be received in 408 and incorporated into the code/instructions generated in 414.

Figure 5:
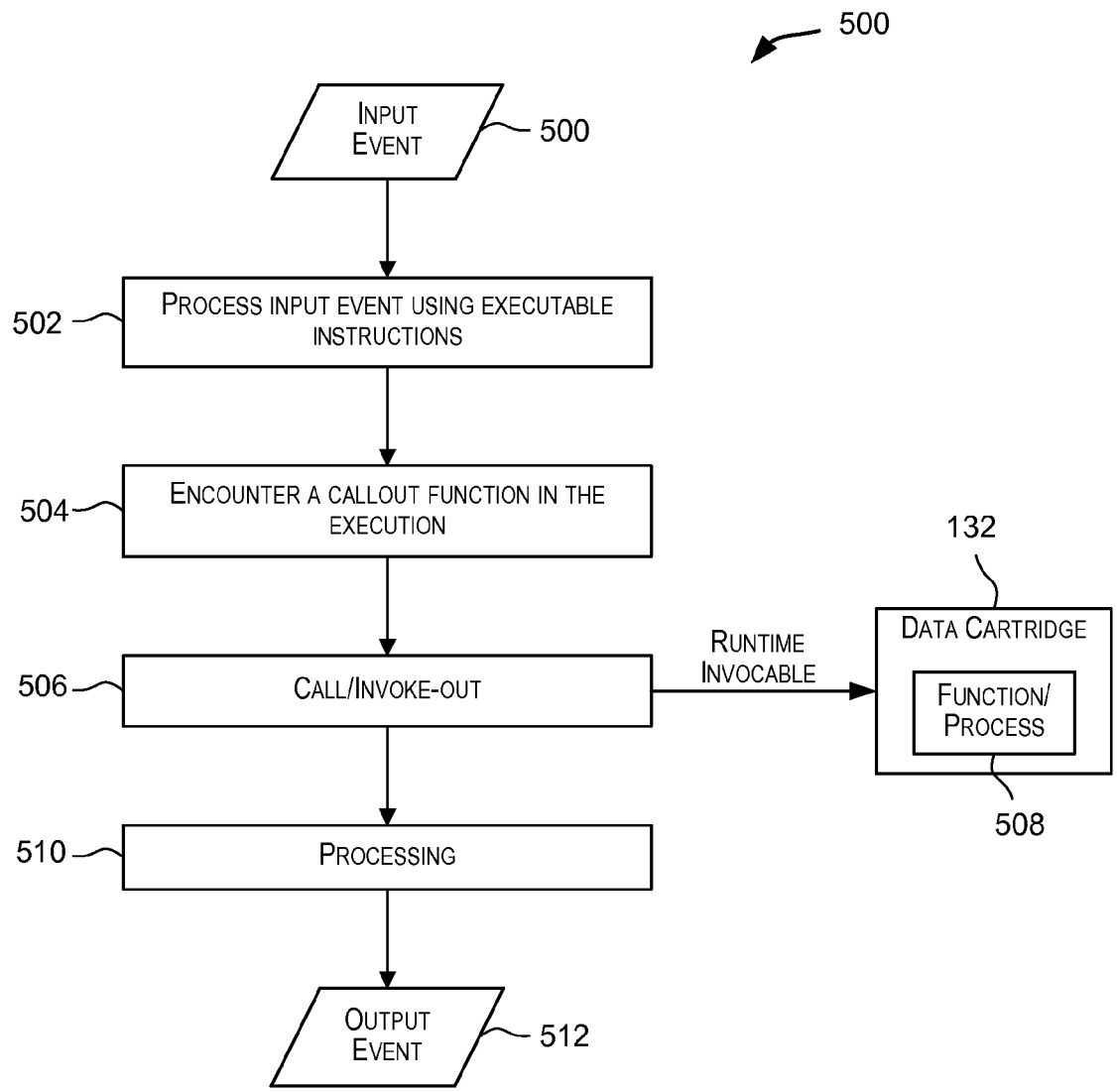
FIG. 5 depicts a simplified high-level flowchart depicting runtime processing performed by an event processing system using a data cartridge according to an embodiment of the present invention.

FIG. 5 depicts a simplified high-level flowchart 500 depicting runtime processing performed by an event processing system using a data cartridge according to an embodiment of the present invention. The processing depicted in FIG. 5 may be the result of execution by a processor of the executable code/instructions generated as a result of the compilation phase. In one embodiment, the processing depicted in FIG. 4 may be performed by runtime engine 136 depicted in FIGS. 1 and 3.

Since queries for an event processing system are executed in a continuous manner, execution of the query may be initiated and input events may be processed according to the query as they are received over the event stream. As depicted in FIG. 5, an input event 500 may be received via an event stream received by event processing system 102. The input event may be processed by executing the executable instructions generated as a result of compiling one or more queries (step 502). During execution of the executable instructions, a callout function may be encountered in the instructions (step 504) whose implementation 508 is provided by data cartridge 132. The callout function is then invoked during runtime from data cartridge 132 (step 506). The input event may be processed using the callout function provided by data cartridge 132 (step 510). An output event 512 may be generated based upon the runtime processing. The output event may be provided to one or more applications for processing such as via an outbound stream depicted in FIGS. 1 and 3.

As described above, during runtime processing, a callout function in the executable code causes runtime engine 136 to interact with data cartridge 132 and use function(s)/process(es) provided by the data cartridge for execution and processing of the input event. As part of the callout function, context information received from the data cartridge during the compilation phase may be passed to data cartridge 132. This context information may be used during runtime execution of functions provided by the data cartridge.

As described above, event processing system 102 interacts with a data cartridge during query compilation time during which metadata provided by the data cartridge is used for compiling the query. The data cartridge stores and provides metadata for an extensible object that is used by event processing system 102 during compilation of a query referencing the extensible object. Since the metadata for the extensible object is self-contained within the data cartridge, the event processing system itself does not need to store the metadata.

Event processing system 102 interacts with a data cartridge during runtime when a callout function is encountered during execution of code/instructions and the implementation for function referred to by the callout function is provided by the data cartridge. The callout function may refer to a function related to an extensible object. Since the implementation of the function is self-contained by the data cartridge within its runtime component, the event processing system again does not need to store any implementations for the function.

Accordingly, a data cartridge stores both compile-time and runtime data related to an extensible object that is not natively supported by the event processing system. A data cartridge thus provides a self-contained modular unit that enables extensible objects to be integrated with an event processing system. Since all the data that is needed to support an extensible object is self-contained within the data cartridge, the event processing system does not have to be polluted by the data. All the metadata and runtime data for an extensible object is managed by the cartridge itself and not by the event processing system. This is very different from the use of a UDF (mentioned in the background) where the UDF-related data has to be stored in the memory of the event processing system. A data cartridge thus increases the scalability and usability of an event processing system. The usage of an event processing system can be scaled without having to increase memory and storage resources of the event processing system. This strategy also avoids the need to keep data in-sync or to pollute the event processing system with external data definitions. A data cartridge thus provides a manageable unit of extensibility that is scalable.

Several of the inefficiencies of prior art systems such as those using UDFs are minimized or eliminated by the data cartridge infrastructure. For example, data cartridges can be re-used by different applications and even by different event processing systems. Further, data cartridges can assemble several domain-specific extensible objects into a single manageable unit. Data cartridges also provide a deeper integration with the native event processing system and its programming language, thus providing a simpler programming experience.

The extensible infrastructure provided by data cartridges enables the rapid integration of an event processing system with other technologies, such as the Java language, spatial manipulation services, Oracle RDBMS, data mining, and the like that may not be otherwise supported by the event processing system. Integration efficiency is provided as the data cartridges can provide tailored indexing and optimize generated compilation code. Further, data cartridges provide for increased scalability, as the external systems are responsible for managing their own metadata, therefore avoiding a central repository of metadata that has to be managed by the event processing system. The use of data cartridges allows the blending of native capabilities provided by the event processing system with the extended capabilities provided by the data cartridge.

Extensible Indexing

An index is typically used to perform lookups, iterations, or searches efficiently over a collection. For example, in a database table storing a collection of rows, one or more indexes may be used to perform quick lookups of data in a column or columns of the table. For example, if the table comprises three columns, an index may be defined for each of the columns or for a combination of the columns. An index typically improves the speed of data retrieval from a collection. The improvement in speed is possible because an index enables the data retrieval typically without having to check every member of the collection. Various different types of indexes may be created depending upon the nature of the collection for which the index is to be created and based upon the manner in which the index is to be used.

In a traditional database table storing a finite data set, the user has to specifically identify which columns of the table are to be indexed. An index is then created for each of the identified columns at compile time. However, due to the continuous nature of event streams and the continuous nature of queries that are executed by event processing system 102 over the event streams, the traditional database indexing mechanism is not practical for event processing systems.

In one embodiment, for an event processing system that is configured to process event streams, an index may be created for collections identified in continuous queries configured for processing the event streams. In one embodiment, such indexes may be created without the user having to specifically identify which columns are to be indexed. For example, in one embodiment, event processing system 102 may be configured to identify a predicate in a CQL query that comprises joins (or variants thereof) involving collections and determine one or more indexing schemes that may be used to efficiently evaluate the predicate.

An event processing system may natively provide only a limited number of indexing schemes for a limited number of operations. These indexing schemes that are natively provided by the event processing system may not be sufficient to evaluate several operations specified in a continuous query for processing events. In one embodiment, a data cartridge may provide one or more indexing schemes for efficient evaluation of operations specified in a query beyond the natively provided indexing options. In this manner, a data cartridge may extend the indexing options that are available for evaluation of queries processed by an event processing system beyond those natively supported by the event processing system. The indexing capabilities of the event processing system are thus extended by the data cartridge.

For example, for a CQL query comprising a join operation involving a collection, a data cartridge may provide indexing schemes to facilitate efficient evaluation of one or more collection-related operations specified by the query predicate. Event processing system 102 may interact with the data cartridge to determine whether the data cartridge provides any indexing schemes that can be used to efficiently evaluate a query predicate. As part of this processing, compiler 134 of event processing system 102 may access metadata from the data cartridge and based upon the metadata determine if the data cartridge provides an efficient indexing scheme to evaluate one or more operations specified in the query predicate. Compiler 134 may then use the metadata provided by the data cartridge to generate execution structures including one or more index data structure instances. These index instances may then be populated during runtime processing as events are received by event processing system 102 and used to facilitate evaluation of the query predicate.

As indicated above, indexes are typically used to perform lookups, iterations, or searches efficiently over collections. Accordingly, in one embodiment, the use of indexing schemes is considered only where a collection is involved. In one embodiment, indexing is thus used when there are joins in a query involving at least one collection such as when a parameter of the join function is a collection, the query has a function that returns a collection, and the like. The collection may be a Relation. Examples of joins in a query where an index may be used include but are not restricted to a join involving two Relations (R×R), a join involving a Relation and a steam (R×S), a join involving a stream and a Relation (S×R), and the like. For example, suppose a Relation (collection) comprises 100 polygons and the requirement is to determine those polygons from this collection that contain an input point received via a stream, instead of using a brute-force method of checking each polygon one by one to see if it contains the input point, an index may instead be created on the collection of polygons and used to very quickly determine a subset of those polygons which contain the point. Using the index typically causes the evaluation of the predicate to be performed in a faster time than if the index was not used since the operation can generally be performed without having to check each element of the collection as done by the brute-force method. Accordingly, indexes are used when there is a collection and where some kind of integration is needed and which can be performed efficiently using an index.

Given a predicate in a CQL query comprising a function to be performed involving a collection, there are two different ways in which the function can be executed: (1) using a functional implementation (brute-force way), or (2) using an indexing implementation (sometimes referred to as an index scan), where the indexing implementation is provided natively by the event processing system or provided by a data cartridge. Functions that do not have an index-based implementation are executed through the corresponding "functional implementation". The functional implementation may be implemented using an implementation class provided for the function that will be invoked by the CQL runtime engine at runtime processing. Functions that do have an associated index type could either be executed through their functional implementation or may be executed using the indexing scheme, for example by scanning the instance of the associated index type.

A functional implementation is typically always provided for a query function regardless of whether the function can be implemented using an index. For a query to be compiled, event processing system 102 is configured to determine whether a function specified in the query predicate is to be implemented using a functional implementation or whether an indexing scheme exists, either natively provided or provided by a data cartridge, that can be used for efficiently evaluating the predicate function.

In one embodiment, various rules may be configured for event processing system 102, and more specifically for compiler 134 of event processing system 102, that enable compiler 134 to determine whether a functional implementation or an index implementation is to be used for evaluating a query predicate. In one embodiment, the rules are configured such that the index scan execution is used only when the operation occurs in the WHERE clause of a JOIN (and its variants like STREAM JOIN). When the function is encountered in other contexts (such as SELECT list etc.) in the CQL query, it will be executed only through its functional implementation. In some instances, the functional implementation may be used even if the function occurs in a JOIN predicate.

For example, consider the following query:

```
SELECT
    CONTAINS@SPATIAL(R.polygon, S.point)
FROM
    S[now], R
```

In this example, the function CONTAINS@SPATIAL will be executed through its functional implementation since it does not occur in a WHERE clause of a JOIN.

Another Example:

```
SELECT
    *
FROM
    S[now], R
WHERE
    CONTAINS@SPATIAL(R.polygon, S.point)
```

In the example above, the function CONTAIN@SPATIAL occurs in the WHERE clause and may be executed using either its functional implementation or using an index provided by data cartridge SPATIAL. The type of index to be used for evaluating this operation may be provided by the metadata stored by data cartridge SPATIAL.

An index type (sometimes referred to as IndexType) identifies a particular type of index. Various different types of indexes may be configured for efficiently implementing different functions in a query. For example, an Rtree index type may be provided that is an indexing scheme that is suitable for implementing a CONTAINS (and other) function(s) on spatial data types. Another type of index such as a BalancedTree index type may be provided that is more suitable for performing =, >, and < functions. In one embodiment, an index type that is suitable for efficiently evaluating a function is determined by compiler 134 and an index of the index type is instantiated.

An index type may be suitable for one or more functions. For example, an Rtree index type may be suitable for the CONTAINS function, and also for the INSIDE function, and others. A BalancedTree index type is suitable for =, >, and < functions. A function may be efficiently implemented using indexes of multiple index types, which may be provided by a data cartridge. For example, a "=" function may be implemented efficiently using a BalancedTree index type as well as a Hash index type.

In one embodiment, each index type is associated with a factory (IndexType Factory) that is responsible for implementing methods used to create an index instance of that type and to destroy an index instance of that type. Using the interfaces (APIs) provided by a data cartridge, compiler 134 may use locator 306 to determine the appropriate IndexType factory for a particular extensible operation/function specified in a query. In one embodiment, a class implementing an index is responsible for implementing the APIs corresponding to the index maintenance operations (insert, update, delete) and also the index scan operations. These operations may be invoked during runtime processing of events when the instantiated index is used for evaluation of the query.

In one embodiment, a data cartridge may provide the following interfaces or APIs that may be invoked by event processing system 102 during compile time and/or runtime processing. The interfaces described here are not intended to limit the scope of the invention as recited in the claims. Other interfaces may be provided in alternative embodiments.

ICartridge—Provided by a Data Cartridge.

```
public interface ICartridge {
  Returns: type Locator -- Returns locator for non-native types provided
  by the cartridge.
    ITypeLocator getTypeLocator( );
    Returns: function locator -- Returns locator for functions provided
    by this cartridge.
    IUserFunctionMetadataLocator getFunctionMetadataLocator( );
    Returns: index type factory locator -- Returns locator for index type
  factories provided by the cartridge.
    IIndexTypeFactoryLocator getIndexTypeFactoryLocator( );
}
```

IIndexTypeFactoryLocator—Compiler may use this API to inquire whether a data cartridge provides an index implementation for a function. The input parameters to the API include the function for which the inquiry is made and the position of a collection in the function's input parameter list. For example, the compiler may use this API to query a data cartridge whether the data cartridge supports any index implementations for function CONTAINS with a collection in the $0^{th}$ parameter position and if so what are the indexing options (since the data cartridge may provide multiple indexing options).

```
public interface IIndexTypeFactoryLocator {
    public IIndexInfo[ ] getIndexTypeFactory(IUserFunctionMetadata
                          operation, int paramPosition)
Input Parms: Function/operation, position of a collection in the parameter
list.
Returns: An array of index type factory, which represent the index types
provided by the data cartridge that are appropriate for the function
specified by the input parameter having a collection in the specified
position.
}
```

IIndexInfo—As indicated above, the getIndexTypeFactory function of interface IIndexTypeFactoryLocator returns an array of type IIndexInfo. IIndexInfo includes information identifying the index type to be used and the factory to be used for creating an index instance of that type.

```
public interface IIndexInfo
{
Returns: Index Type Factory
    public IIndexTypeFactory getIndexTypeFactory( );
    public Object getIndexCallbackContext( );
Returns: The callback context to be passed to the index during the
scan The index callback context is the additional context information
or note that is passed to the compiler and which is passed back to
the data cartridge during runtime processing when the index is being
actually used.
}
```

IIndexTypeFactory—The IIndex object is what is created as the last step of the compilation process using the index factory returned by the data cartridge.

```
public interface IIndexTypeFactory{
    -- Index Definition Operations
    public IIndex create(Object[ ] args);
    Creates a new index instance (represented by IIndex object) of
this index type.
    Inputs: args - Optional index instance specific parameters
    Returns: Returns an index of this index type
    public void drop(IIndex index);
    Destroys / reclaims the specified index instance.
}
```

IIndex—Used to create a new instance of an index.

```
public interface IIndex {
-- Index Maintenance Operations performed during runtime processing.
  public void insert(Object newkey, Object val)
  Used to insert a new record into an index instance during runtime processing. For example,
when a new polygon is received for a Relation (collection), the new polygon is added to the
index instantiated for the Relation using this API.
    Inputs: newkey - the key - the "actual" type of this will typically be a domain-specific type
         val - the value to be associated with this key. The index will treat this as opaque
satellite data that is associated with the key. Typically, this would be the tuple identifier of the
tuple that contains the key.
    public void delete(Object oldkey, Object val);
    Deletes an existing record from an index. For example, when a polygon is removed from a
Relation, the polygon is also deleted from the index instantiated for the Relation using this API.
```

-continued

```
    Inputs: oldkey - The key to be deleted - the "actual" type of this will typically be a domain-
specific type
            val - The value associated with this key. The index will treat this as opaque satellite
data that is associated with the key. Typically, this would be the tuple identifier of the tuple that
contains the key.
    public void update(Object oldkey, Object newkey, Object val);
    Updates an existing record in the index
    Inputs: oldkey - the key to be deleted - the "actual" type of this will typically be a domain-
specific type
            newkey - the key to be inserted
            val - the value associated with this key. The index will treat this as opaque satellite
data that is associated with the key. Typically, this would be the tuple identifier of the tuple that
contains the key.
    -- Index Scan Operations (performed during runtime processing)
    public void startScan(Object indexCallbackContext, Object[ ] args);
    Starts an index scan
    Inputs: args - These correspond (in number and type) to the arguments of the operation that is
being executed through this index scan.
            indexCallbackContext - This is the callback context info returned as part of the index
information returned by the IndexTypeFactoryLocator
    public Object getNext( );
    Returns: The satellite data associated with the next matching key. If no more matches, return
null
    public void releaseScan( );
    Releases the index scan
}
```

For example, an API on the ICartridge interface takes as input the function to be performed and returns the appropriate IndexType factory to be used for creating an instance of the index for the function. In one embodiment, the IndexTypeFactoryLocator is located on the ICartridge interface as opposed to the IUserFunctionMetadata interface to be able to support scenarios where a new indexing scheme may be defined by a data cartridge that efficiently implements a subset of existing functions of another data cartridge. This is to support scenarios where a data cartridge has no new data types or operations of its own but provides a different type of indexing scheme to efficiently support operations that are specified by a different data cartridge. For instance, consider a SPATIAL cartridge supporting spatial geometry data types, a CONTAINS operation and an RTree based indexing scheme. An ISV could build a QUADTREE data cartridge that supports no types or operations of its own. All it does is that it supports a new indexing scheme based on Quad Trees to efficiently implement the spatial cartridge's CONTAINS operation. In this manner, a vendor may come up with a new indexing scheme for a subset of the spatial functions that are provided by a SPATIAL data cartridge. It is desired that this new indexing scheme should be picked up without having to rewrite the existing queries. This means that the function names and link definitions cannot be changed. As previously indicated, data cartridges may be registered with event processing system 102. The registration data for a data cartridge may indicate the association between a function and an index type. Compiler 134 of event processing system 102 may consult this registry to identify the cartridges that have an efficient index implementation for the function in question.

As indicated above, a data cartridge may provide multiple index types with each index type suitable for performing a particular function. In one embodiment, a data cartridge may define associations between functions and one or more index types. Given a function, the associations may be used to determine an index type for efficiently implementing that function. This association information may be stored by the data cartridge and used by compiler 134 during compilation to determine an appropriate index type for a particular function encountered in the CQL query. In one embodiment, during the compilation phase, the data cartridge provides all the supported index types given a function and position of the collection in the function's parameter list. From among these, the compiler then selects at-most one index type for evaluation of that function in that specific context.

An index data structure has methods or operations associated with it that are configured to efficiently implement the one or more functions associated with that index. In one embodiment, the operations provided by an index (which are to be differentiated from operations/functions specified in the query) can be partitioned into two sets:
(1) Operations related to data manipulation (like insert, delete, update) that alter/modify the data that is managed by the index data structure, and
(2) Search/query/lookup operations, each of which typically takes a key as input and performs a lookup or query on the data (collection) that is managed by the index data structure.

For example, the query predicate
  CONTAINS @SPATIAL(polygon, point)
specifies a CONTAINS query operation and a SPATIAL data cartridge. This is an example of a single element function since it takes one instance of a "polygon" and one instance of a "point" as input and returns a Boolean TRUE if the "point" (the second argument to the function) lies within the "polygon" (the first argument of the function). This function may be associated with an indexing scheme defined by the SPATIAL data cartridge that efficiently implements the function. For example, in the spatial context, the data cartridge may provide an RTree index data structure that is designed to hold a collection of geometries (say polygons) and supports multiple lookups or query operations efficiently on the geometry collection. A lookup/search operation may be provided by the SPATIAL data cartridge for the CONTAINS function that, given a geometry (like a point), quickly identifies all the polygons that contain the point. The data cartridge may also provide an implementation for an INSIDE lookup/search operation that, given a geometry (like a polygon), quickly identifies all the points that lie inside the given polygon. The Rtree index data structure provided by a data cartridge may thus support efficient implementations for the CONTAINS (Collection<polygon>, point) and INSIDE (Collection<point>, polygon) functions.

For example, consider the following query (EXAMPLE #1):

```
SELECT
    *
FROM
    S[now], R
WHERE
    CONTAINS@SPATIAL(R.polygon, S.point)
```

Here the query function CONTAINS takes as input a Relation (collection) R of polygons and a stream S of points received by event processing system 102. The objective of the continuous query function is to output, for an incoming point in the stream S, one tuple for each polygon in R that contains the point. For this function with the particular inputs, an Rtree index provided by the SPATIAL data cartridge may be determined to be an appropriate index data structure to evaluate this query predicate since it supports an efficient implementation of a CONTAINS operation of a point on a collection of polygons. Accordingly, the IndexType Rtree may be associated with the data cartridge provided function with the signature CONTAINS@SPATIAL(JGeometry polygon, JGeometry point). Further, it may be specified that the index association is for the first input parameter (the collection of polygons) of the function, implying that the Rtree index type supports an efficient batched version of the CONTAINS operation for a single point over a collection of polygons.

Now consider another query example where the roles are reversed—here the inputs to the function are a polygon from a stream and points in a relation, as follows (EXAMPLE #2):

```
SELECT
    *
FROM
    S[now], R
WHERE
    CONTAINS@SPATIAL(S.polygon, R.point)
```

Here the inputs are a stream S of polygons and a relation (a collection) R of points and the objective of the continuous query is to output one tuple for each point in R that is inside (contained by) the incoming polygon in the stream S received by event processing system 102. Here, the CONTAINS operation implementation of the Rtree index data structure does not fit the function signature since the "point" argument contains the collection (as opposed to a collection of polygons). However, as indicated above, the Rtree index implementation provided by the data cartridge may provide implementation for another operation—INSIDE (Collection<point>, polygon)—which can be used to efficiently evaluate the CONTAINS query function. The INSIDE implementation provided by the data cartridge may thus be used instead of the CONTAINS Rtree implementation (from the previous example) provided by the data cartridge. Accordingly, the Rtree index type can be associated with the CONTAINS@SPATIAL function if the input is a collection of polygons or a collection of points.

Accordingly, for a given query function, in order to determine which one of the possibly multiple index types provided by a data cartridge is appropriate for efficiently evaluating the query function, information is needed about the query function and its digital signature including information identifying which of the query function's input operands or arguments is a collection. From the point of view of the data cartridge developer, the association to a (function, collection_argument) pair is really the pair (index type, logical index operation). In the previous example, for the function CONTAINS(polygon, point), the association with the pair (CONTAINS, 0) corresponding to CONTAINS over collection of polygons (collection is in the $0^{th}$ position) and a single point as key is (RTreeIndexType, INDEX_LOGICAL_CONTAINS_OP) (i.e., the CONTAINS operation provided by the data cartridge) while the association with the pair (CONTAINS, 1) corresponding to CONTAINS over collection of points (collection in the $1^{st}$ position) and a single polygon as key is (RTreeIndexType, INDEX_LOGICAL_INSIDE_OP) (i.e., the INSIDE operation provided by the data cartridge).

From the point of view of the data cartridge developer, one way to think about an index type is as a class that encapsulates the following: (1) the data collection over which an operation is to be performed; and (2) one or more operations that this index type can help execute efficiently. The "internal" (logical) operations provided by the data cartridge are to be distinguished from the operation/function that a CQL query writer specifies. For example, in the case of RTree index type, INDEX_LOGICAL_CONTAINS_OP and INDEX_LOGICAL_INSIDE_OP would be logical internal operations with the semantics:
INDEX_LOGICAL_CONTAINS_OP(point) takes a single point as input and returns all those polygons from a collection (that in this case comprise the data collection encapsulated by the index) that contain this input point
INDEX_LOGICAL_INSIDE_OP(polygon) on the other hand takes a single polygon as input and returns all those points from a collection (that in this case comprise the data collection encapsulated by the index) that are inside this input polygon.

Now consider the queries in EXAMPLE #1 and EXAMPLE #2. It is to be noted that in both cases the CQL query writer specifies the CONTAINS operation. However, in EXAMPLE #1, the collection argument is the 0th argument and is a collection of polygons. Thus, the CONTAINS in EXAMPLE #1 maps to the INDEX_LOGICAL CONTAINS_OP internal operation provided by the data cartridge. On the other hand, in EXAMPLE #2, the collection argument is the 1st argument and is a collection of points. The CQL writer wants to determine which of the points in the collection are inside the polygon that corresponds to the current stream input. Note that this is exactly what the INDEX_LOGICAL_INSIDE_OP(polygon) internal operation will return and thus in this context, the CONTAINS operation with the 1st argument as a collection maps to the INDEX_LOGICAL_INSIDE_OP internal/logical operation provided by the data cartridge.

With respect to indexing, as part of the compilation process, CQL compiler 134 tries to determine a predicate in the query comprising a join and involving at least one collection, and an indexing strategy to be used for evaluating the predicate. The indexing options for a predicate may comprise one or more of the following: (1) extensible indexing options provided by a data cartridge, (2) native indexing options provided by event processing system 102, or (3) no indexing options at all for evaluating the predicate (in which the functional implementation is used for the evaluation). Once the appropriate indexing options have been determined for a predicate, code generator 310 is configured to generate code or instructions for the query being compiled that includes appropriate index execution structures for the predicate. The generated code is then executed at runtime processing, wherein execution of the code causes the appropriate index instances to be populated and used.

A CQL query may comprise a predicate and the predicate can comprise one or more terms, where the predicate is a conjunction of the terms. Each term may specify an operation or function to be performed. A term may also specify the data cartridge to be used for evaluating the function specified by the query. For example, the following query

```
SELECT
    *
FROM
    S[now], R
WHERE
    CONTAINS@SPATIAL(R.polygon, S.point) AND
    INSIDE@SPATIAL(R.polygon, S.boundaryPolygon)
``` comprises a predicate "CONTAINS@SPATIAL(R.polygon, S.point) AND INSIDE@SPATIAL(R.polygon, S.boundaryPolygon)" with two terms CONTAINS@SPATIAL(R.polygon, S.point) and "INSIDE@SPATIAL(R.polygon, S.boundaryPolygon)".

As part of compiling the query, compiler 134 is configured to determine for each function in the predicate whether the function is to be evaluated using a functional implementation or an indexing scheme, where the indexing scheme may be natively provided by the event processing system or provided by a data cartridge. In one embodiment, compiler 134 uses the following algorithm to determine for each function identified in a predicate whether the function is going to be executed using an index, including the type of index to be used, or using a functional implementation.

1) Compiler 134 determines the return type of the function. If the return type that is determined is not a Boolean, then the functional implementation is to be used to evaluate the function.
2) If the return type of the function is Boolean, then compiler 134 determines if the function is part of a WHERE clause of a JOIN (or variant such as STREAM JOIN). If not, then the functional implementation is to be used to evaluate the function.
3) If the return type of the function is Boolean and the function is part of a WHERE clause of a JOIN (or variant such as STREAM JOIN), then the predicate instance specifying the function is identified as a candidate for using indexing.

In one embodiment, a Relation in CQL can be of two kinds: (1) Base, or (2) Derived. A Base relation is one that is created using the CREATE RELATION DDL. A derived relation can further be of two kinds: (a) an explicit view or (b) an inline view. For instance if S is a stream, a window on S, such as S[rows 10] evaluates to a Relation. Thus, CREATE VIEW V AS SELECT * FROM S[rows 10] is an example where V is a derived relation that is defined as an explicit view. On the other hand, in a query CREATE QUERY Q AS SELECT * FROM S[rows 10], the sub-expression "S[rows 10]" is a derived and inline view.

For example, consider the following example (EXAMPLE #3):

```
SELECT
    *
FROM
    R1, R2
WHERE
    CONTAINS@SPATIAL(R1.polygon, R2.point)
```

Here there is a join of two Relations R1 (a collection of polygons) and R2 (a collection of points). The contents of both the collections can change over time and inputs may be received during runtime on R1 and/or R2. The objective of the query is to output a tuple for each (polygon, point) pair from the cross product of R1×R2 such that polygon contains the point. In this example, R1 and R2 are relations (collections). The Relations may be derived or based or even an inline view (as S[rows 10])) that are the outer and inner inputs to the JOIN operator.

As part of compiling the CQL query in EXAMPLE #3, compiler 134 determines that the arguments to the CONTAINS query function are both collections that can change over time (fields of its input and belong to different inputs). In this example there is a JOIN between R1 and R2, which are inputs to the JOIN. The predicate comprises a single term specifying the CONTAINS functions, where one of the arguments of the CONTAINS function refers to a field ("R1.polygon") from one of the inputs to the JOIN namely R1 (of which "polygon" is a field or attribute) and the other argument refers to a field from the other input namely R2 (here "point" is a field or attribute of the relation R2). The query also specifies that a SPATIAL cartridge is to be used.

As part of compiling the query, compiler 134 receives a handle to the appropriate ICartridge instance corresponding to data cartridge SPATIAL and obtains the metadata for the CONTAINS query function from the data cartridge. It then determines through a lookup on the IIndexTypeFactoryLocator by passing the function metadata as input and based upon data stored by the data cartridge whether there are any index types provided by the SPATIAL data cartridge that support an efficient implementation of a collection version of this function. In this case, the return response from the SPATIAL data cartridge may indicate that the "RTreeIndexType" supports an efficient implementation for the CONTAINS query function with a collection as the first argument and a collection as the second argument. The lookup on the IIndexTypeFactoryLocator also returns information identifying the index type factory to be used for generating an index instance of the index type. Compiler 134 may then decide during the code generation phase of the compilation process to instantiate two indexes using the appropriate IndexTypeFactory factory instances returned by the IIndexTypeFactoryLocator: (1) a first index instance for storing polygons belonging to relation R1, and (2) a second index instance for storing points in relation R2.

The code generated by compiler 134 may then be executed at runtime processing. The contents of R1 and R2 may change over time during runtime processing. When a new polygon is received, it is added to the index instance created for Relation R1. Likewise, when a new point is received, it is added to the index instance created for Relation R2.

At runtime, when a new point is received by event processing system 102 on R2, what is reported is all polygons in R1 (at the time the new point is received) that contain the new point. This involves performing a lookup using the index on R1 to determine which polygons contain the new point in R2. The index on R1 will be looked up to obtain all those tuples in R1 with polygons that contain the newly received point in R2 (i.e., the current input point on R2). This will translate to an index scan call on R1's index. In terms of logical/internal data structure operations provided by the data cartridge, this actually maps to the logical/internal "CONTAINS" operation provided by the SPATIAL data cartridge. In one embodiment, when the index on R1 index is instantiated during the compilation phase, information regarding the logical/internal CONTAINS operation is provided to the compiler through its IndexInfo This is the context information to be used at runtime for implementing the query function. The contract between the compiler and the data cartridge is that this context information will be passed as is to the data cartridge at runtime when the index scan operation is invoked by the CQL runtime so that the data cartridge knows which internal operation to invoke.

It is equally possible that instead of getting a new point in R2, a new polygon is received in R1. Now the lookup operation determines all the points in R2 that lie in this newly received polygon in R1. This is the reverse of the operation performed upon receiving a new point in R2. In this scenario, given a key polygon, a lookup is to be performed to determine which points in R2 lie inside the key polygon (i.e., the newly received polygon). This is different from the scenario where a new point is received wherein, given a key point, a lookup is performed to determine which polygons in R1 contain the key point. In the present case, the index on R2 will be looked up to obtain all those tuples in R2 with points that lie inside the newly received polygon on R1. This will translate to an index scan call on R2's index. In terms of logical/internal data structure operations provided by the data cartridge, this maps to the logical "INSIDE" operation provided by the RTreeIndexType index type. In one embodiment, when the index on R2 is instantiated during the compilation phase, information regarding the INSIDE operation is provided to the compiler through its IndexInfo. This is the context information to be used at runtime for implementing the query function. The contract between the compiler and the data cartridge is that this context information will be passed as is to the data cartridge at runtime when the index scan operation is invoked by the CQL runtime so that the data cartridge knows which internal operation to invoke.

Accordingly, in EXAMPLE #3 described above: (1) when a new point is received in R2, the question asked is which polygons in the collection of polygons in R1 contain the key new point, (2) when a new polygon is received in R1, the question asked is which points in the collection of points in R2 are inside the key polygon. It is to be noted here that the CONTAINS operation is identified in the predicate itself, however the INSIDE logical operation provided by the data cartridge is not. But the extensible indexing framework is smart enough that the data cartridge can convey what internal/logical operation is to be performed for the CONTAINS in the query depending upon whether a point or a polygon event is received. In one embodiment, this is performed based upon interaction between compiler 134 and the data cartridge during the compilation stage. In one embodiment, compiler 134 asks the data cartridge (via APIs provided by the data cartridge) two questions: (1) if the first argument is a collection and the rest are keys and not collections, does the data cartridge support an efficient way of handling this function; (2) if the second argument is a collection and the rest are keys and not collections does the data cartridge provide an efficient way of supporting the operation. This is done only for collections, not for non-collections in the parameter list. The metadata information received by compiler 134 in response from the data cartridge identifies the specific internal/logical operation to be used in each case and this information is then compiled.

In general, if a parameter list for a query function comprises multiple arguments, one or more of which may be collections, a question is asked for each collection in the parameter list: if the $n^{th}$ argument (where "n" is the position of the collection in the parameter list) is a collection and the rest are keys and not collections, does the data cartridge support an index type for efficiently evaluating the query function.

The information received from the data cartridge in response to each question may specify the index type to be used and also the internal/logical operation provided by the data cartridge that is to be used at runtime for evaluating the query function. This information is then compiled and used during runtime processing.

In one embodiment, when the data cartridge responds, it indicates whether or not the function in the query is supported and also, if supported, the index type to be used and also additional information. The additional information may, for example, indicate the data cartridge's internal function to be used at runtime for evaluating the query function. This additional information is communicated to the compiler by the data cartridge during the compilation phase with the goal that the compiler will compile this information to generate code/instructions. When these code/instructions are executed during runtime processing, the additional information received from the data cartridge during the compilation phase is provided to the data cartridge by the runtime engine. The data cartridge uses this information for its runtime processing. For example, the additional information may indicate a specific internal/logical function provided by the data cartridge that is to be invoked to perform the processing using the index. The additional information is thus like a note provided by the data cartridge during the compilation phase and that is passed to the data cartridge during runtime and used by the data cartridge to determine which specific internal/logical operation to perform. From the perspective of a user of an event processing system, the correct operation will be performed during runtime processing.

As indicated above, a query predicate can comprise one or more terms, each term may specify a function. A query predicate may thus specify multiple functions and one or more indexes may be created and used to implement the functions. Accordingly, multiple index instances may be created for a query predicate. In one embodiment, two or more of the indexes may be grouped together and a single index may be used for the group instead of the multiple indexes. This can be done when multiple functions defined in a predicate of a query being compiled use the same index type or index instance. For example, consider the following example (EXAMPLE #4):

```
SELECT
    *
FROM
    S[now], R
WHERE
    CONTAINS@SPATIAL(R.polygon, S.point) AND
    INSIDE@SPATIAL(R.polygon, S.boundaryPolygon)
```

In the above example, for each stream element received in the stream S, the above query returns one tuple for each polygon in the relation R that contains the point S.point and is also itself inside the boundaryPolygon specified by the stream element.

For EXAMPLE #4, CQL compiler 134 may interact with the SPATIAL cartridge and determine that there are index types that support efficient execution of both (CONTAINS, 0) (i.e., a CONTAINS query function with a collection in the first position) and (INSIDE, 0) (i.e., an INSIDE query function with a collection in the first position) query functions. Compiler 134 then determines the number of index instances to be instantiated. In one embodiment, compiler 134 may instantiate two indexes (of type RTreeIndexType) one for the CONTAINS query function (over R.polygon) and the other for the INSIDE query function (over R.polygon). In this case, both index instances actually manage an identical data collection, namely all the polygons in the R.polygon of the relation R. The index data is thus duplicated in the two index instances. This is a waste of memory resources since memory is needed for storing the two index instances containing identical data. It would be much more efficient in terms of memory consumption to use just one index instance (instead of two) and probe the same index instance first for the CONTAINS query function and then for the INSIDE query function (or vice-versa).

In one embodiment, compiler 134 is configured to detect such situations where data in two or more indexes is duplicated and use a single instance of an index for executing multiple functions where appropriate. In one embodiment, to handle such scenarios, compiler 134 examines the IIndexInfo information returned by the IIndexTypeFactoryLocator interface for all the functions specified in the query. Compiler 134 then groups all those functions that need to operate on the same data collection and for which the same index type provides a supporting operation. In one embodiment, this is determined by performing an identity (.equals) check on the instance of the IindexTypeFactory returned. Compiler 134 then instantiates only one index instance per function group of identical factory instances.

In one embodiment, for EXAMPLE #4 provided above, compiler 134 may group the (CONTAINS, 0) and (INSIDE, 0) query functions in the same function group since both operate on the same data collection (R.polygon) and both are supported by the same index type (RTreeIndexType) and instantiate a single index instance for the function group. At the time of index scan invocation during runtime, the scan method is invoked on the same instantiated index instance for both query functions and would provide for each function the associated index callback that the compiler obtained from the IIndexTypeFactoryLocator as part of the IIndexInfo In one embodiment, the invocation may be done serially. Thus, the cartridge and the index implementation ensures that an appropriate callback context is returned by the IIndexTypeFactoryLocator that contains all the information that the index implementation would require at runtime to determine which of its logical "lookup/search/query" operations it needs to perform and which argument corresponds to the key.

As indicated above, the input parameters to a function may be one or more collections (e.g., Relations) and/or one or more streams. A function may also have other input parameters. For example, a function can have another function as its input parameter. In this case, an index may be created on the result of the function parameter.

Figure 6:
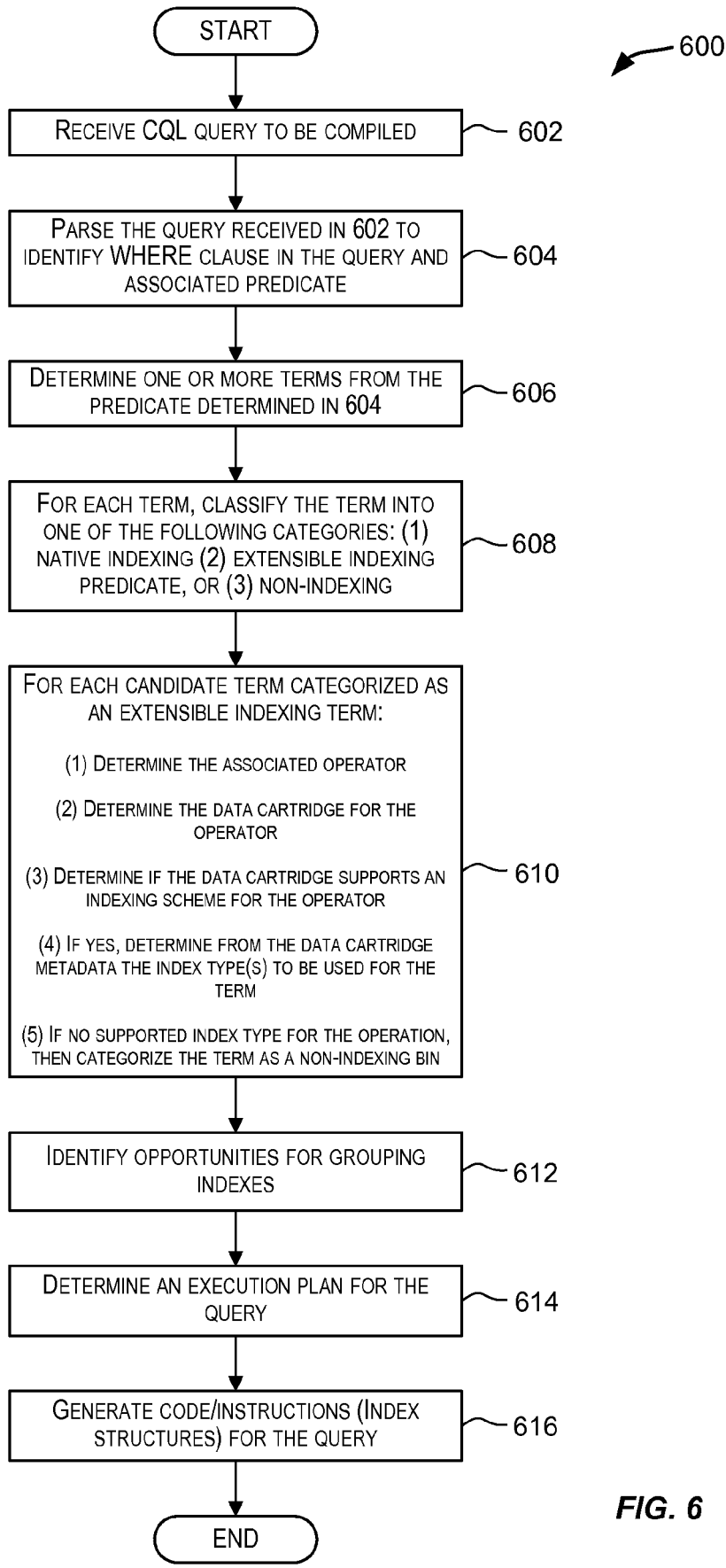
FIG. 6 depicts a simplified high-level flowchart depicting a method of compiling a query using a data cartridge in the context of extensible indexing according to an embodiment of the present invention.

FIG. 6 depicts a simplified high-level flowchart 600 depicting a method of compiling a query using a data cartridge in the context of extensible indexing according to an embodiment of the present invention. The processing depicted in FIG. 6 may be performed by software (e.g., program, code, instructions) executed by a processor, or hardware, or combinations thereof. The software may be stored on a non-transitory computer-readable storage medium. In one embodiment, the processing depicted in FIG. 6 may be performed by compiler 134 depicted in FIGS. 1 and 3.

As depicted in FIG. 6, processing is initiated upon receiving a query to be compiled (step 602). The query received in 602 may be, for example, a CQL query. For example, the query may be (EXAMPLE #5):

```
SELECT
    *
FROM
    S[now], R
```

```
WHERE
    CONTAINS@SPATIAL(R.polygon1, S.point) AND
    CONTAINS@SPATIAL(R.polygon2, S.point) AND
    S.c1 = R.c2
```

The query received in 602 is then parsed to identify the WHERE clause in the query and the associated predicate (step 604). A WHERE clause of a CQL query has one associated predicate. For EXAMPLE #5, the predicate associated with the WHERE clause is:

```
CONTAINS@SPATIAL(R.polygon1, S.point) AND
    CONTAINS@SPATIAL(R.polygon2, S.point) AND
    S.c1 = R.c2
```

A predicate can be decomposed into a number of terms, where the predicate is the CONJUNCTION (AND) of these terms. Accordingly, the predicate determined in 604 is parsed to determine one or more terms in the predicate (step 606). For example, the predicate in EXAMPLE #5 may be parsed to identify the following three terms:

(1) CONTAINS@SPATIAL(R.polygon1, S.point)
(2) CONTAINS@SPATIAL(R.polygon2, S.point)
(3) S.c1=R.c2

The predicate is the CONJUNCTION of these three terms.

Each term determined in 606 is then categorized into one of the following three categories: (1) native indexing term, (2) extensible indexing term, or (3) non-indexing term (step 608). In one embodiment, each term identified in 606 is checked against certain conditions and then classified into one of the three categories based upon whether or not the conditions are met. The conditions may be encoded in the form of rules that are evaluated by the compiler.

In one embodiment, as part of the processing in 608, each term is examined to determine an operator or function (e.g., CONTAINS function, EQUAL TO (=) function, less than (<) function, greater than (>) function, less than or equal to (<=), etc.) associated with the term. The term is then categorized into one of the three categories based upon the determined operator. In one embodiment, upon determining an operator, a determination is made whether the event processing system provides a native indexing scheme or an extensible indexing scheme that provides for efficient evaluation of the operator. If it is determined that the event processing system provides a native indexing scheme for efficient evaluation of the operator, then the term is categorized as a native indexing term. If it is determined that efficient evaluation of the operator is provided by an extensible indexing scheme, then the term is categorized as extensible indexing term. If there is no native or extensible indexing scheme for efficient evaluation of the operator, then the operator is categorized as a non-indexing term. As a result of the processing, terms that are candidates for native indexing are categorized in the native indexing term category, terms that are candidates for data cartridge provided extensible indexing are categorized in the extensible indexing term category, and terms that are not supported either by native indexing or extensible indexing are categorized in the non-indexing category.

In one embodiment, the compiler may have access to information that maps operators to one of the three indexing categories identified above. Given an operator for a term, the compiler can use the mapping information to decide how the term is to be categorized. For example, in one embodiment, the set of operators that can be efficiently evaluated using a native indexing scheme may include the EQUAL TO (=) operator, less than (<) operator, greater than (>) operator, less than or equal to (<=) operator, and the greater than or equal to (>=) operator. Accordingly, if the operator for a term is one on these operators, the term is categorized as a native indexing term.

For example, the predicate in EXAMPLE #5 comprises three terms: (1) CONTAINS@SPATIAL(R.polygon1, S.point), (2) CONTAINS@SPATIAL(R.polygon2, S.point), (3) S.c1=R.c2. The operator in the first term is CONTAINS whose efficient evaluation may be supported by an extensible index. Accordingly, the first term is categorized in the extensible indexing category. The operator in the second term is CONTAINS whose efficient evaluation may be supported by an extensible index and accordingly, the second term is also categorized in the extensible indexing category. The operator in the third term is "=" whose efficient evaluation may be supported by a natively provided index. Accordingly, the third term is categorized in the native indexing category.

Once the terms have been categorized based upon their operators, further analysis of each term may be performed to determine if a term is to be re-categorized to another category. For example, the terms categorized as extensible indexing terms may be further analyzed to determine if any re-categorization is needed. In one embodiment, for each term categorized as an extensible indexing term, the arguments to the operator in the term may be examined to determine if the term needs to be re-categorized. The arguments to that operator in a term can be any arithmetic expression. The following processing may be performed:

(1) No argument expression in a term should refer to attributes from inputs on both the sides of the join. Else, the term is categorized as a non-indexing term. See term #4 in Table A below.

(2) If condition (1) is satisfied, then (a) a term is considered as a Left Extensible term if and only if there is exactly one argument expression among the function arguments that references attributes only from the left input, and (b) a term is considered as a Right Extensible term if and only if there is exactly one argument expression among the function arguments that references attributes only from the right input. A single term can be both a left extensible term and a right extensible term.

(3) Further, if none of the arguments to an operator of a term refer to attributes of inputs on both sides of the join, then the term is categorized as a non-indexing term. See term #5 in Table A below.

In one embodiment, a term is categorized as a native indexing term if all of following conditions are satisfied by it:
(i) The term is associated with an operator (function) that can be efficiently supported by indexing schemes that are natively supported by the event processing system.
(ii) The expressions on either side of the operator are just attribute references (ATTR REF expression kind) belonging to inputs on different sides of the join.

For a term categorized as a native indexing term, an index is created on both inputs of the join using native indexing capabilities of the event processing system.

In one embodiment, a term is categorized as an extensible indexing term predicate (i.e., one supported by a data cartridge) if all the conditions stated below are satisfied by it:
(i) The predicate is a Basic Boolean Expression with EQUAL TO (=) as the operator.
(ii) One of the sides of the EQUAL TO operator is the Boolean constant TRUE.
(iii) The other side is a Function Expression and the operator/function being referenced is a valid function provided by some cartridge.
(iv) The arguments to that function can be any arithmetic expression. However, no argument expression should refer attributes from inputs on both the sides of the join. If this condition is satisfied, then (a) a predicate is considered as a Left Extensible Predicate if and only if there is exactly one argument expression among the function arguments that references attributes only from the left input, and (b) a predicate is considered as a Right Extensible Predicate if and only if there is exactly one argument expression among the function arguments that references attributes only from the right input. A single predicate can be both a left extensible predicate and a right extensible predicate.

For an extensible indexing term, an index may or may not be created on both sides of the join. Also even if a term is, say identified as a "candidate" left extensible term, then an index also may be created on left input only if the implementation of a cartridge referenced in the operator/function call supports index for that <function, collection argument position> combination. Here the "collection argument" is that single such argument which references attributes only from the left side of the input.

In one embodiment, a predicate that does not fall into any of the above two categories for a side of the join is considered a non-indexing predicate for that side of the join. No index can be created for such a predicate on that side of the join and so the functional implementation of the function is to be invoked during execution.

The manner in which rules for classifying a term into one of the three categories may be used is illustrated using the example terms shown in Table A. In all of the examples shown in Table A, 'f' is a function defined in the cartridge named "exampleCartridge". P and Q are aliases for left and right side inputs of the join respectively.

TABLE A

| No. | Term | Category | Explanation |
| --- | --- | --- | --- |
| 1 | f@exampleCartridge (P.c2 + 3, Q.c1, (Q.c2*5)-4) | Left Extensible term | P.c2 + 3 is the EXACTLY ONE argument that references attributes only from the LEFT side of the input (i.e., input on P). Accordingly, there is an opportunity to create an index on P for this term that is categorized as an extensible indexing term. For right side, there are two such arguments so NOT a right extensible predicate. |

TABLE A-continued

| No. | Term | Category | Explanation |
| --- | --- | --- | --- |
| 2 | f@exampleCartridge (12, f2(Q.c1-7), 15) | Right Extensible term | Here 12(Q.c1-7) is the EXACTLY ONE argument that references attributes only from the RIGHT side of the input. No such argument for left side of input. |
| 3 | f@exampleCartridge(P.c1 + P.c2, Q.c1/4), 15) | Left Extensible term and Right Extensible term | P.c1 + P.c2 is the EXACTLY ONE argument that references attributes only from the left side of the input, so left extensible term. Similarly Q.c1/4 is the EXACTLY ONE argument that refers attributes only from right side of the input so right extensible term as well. |
| 4 | f@exampleCartridge(P.c1 + Q.c2, Q.c1, 15) | Non-indexing term | Here though Q.c1 is the only argument that references attributes only from the right side of the input this cannot be considered as a right extensible term since the argument P.c1 + Q.c2 refers to attributes from inputs on both the sides of the join. This term is thus re-categorized as a non-indexing term. |
| 5 | f@exampleCartridge(14, 34, 15) | Non-indexing term | In this term, no argument refers to attributes from inputs on either side of the join. Accordingly, classified as a non-indexing term. |

The rest of FIG. 6 shows processing steps performed for terms that are categorized as extensible indexing terms. Processing is performed for each term classified as an extensible indexing term (step 610). As part of the processing, for each term, the operator associated with the term is determined. A data cartridge identified by the term and associated with the operator is also identified. Processing is then performed to determine if the data cartridge provides an indexing scheme that supports efficient evaluation of the operator. As part of this processing, a handle is obtained to the data cartridge and APIs provided by the data cartridge are used by the event processing system to access metadata from the data cartridge. In one embodiment, for a typical join operator, evaluation of a predicate and its terms is triggered when an input is received on either of the inputs of the join. Accordingly, in 610, each term categorized as an extensible indexing term is examined to decide if one or more indexes can be created to evaluate the term. This involves separately examining each side of the JOIN of the WHERE clause for the term. The goal of this exercise is to determine what indexes need to be created for each (of the two inputs) input of the JOIN for the term. In one embodiment, the CQL compiler may ask the data cartridge if it supports an indexing scheme for a term for the operator associated with the term. For example, for the term CONTAINS@SPATIAL(R.polygon, S.point), the compiler may ask the SPATIAL data cartridge if it supports an operator/function CONTAINS with a first argument that is a geometry in a Relation and a second argument that is a geometry. The response from the SPATIAL data cartridge may then specify whether or not the data cartridge supports an indexing implementation for such an operator/function for the term. If supported, the index type and factories to be used for creating an instance of the index type may also be provided by the data cartridge in its response. If not supported, then the term may be re-categorized as a non-indexing term.

As part of 610, for a term, the data cartridge may also send additional index information to compiler 134. The additional index information may include information that is to be passed back to the data cartridge during a runtime scan operation for the term. This additional information (also referred to as context information) may, for example, indicate which specific internal/logical operation provided by the data cartridge is to be used to implement the operator associated with the term. For example, as described above, for the CONTAINS@SPATIAL(R1.polygon, R2.point), depending upon whether the lookup is to be performed using the index instantiated for R1 or the index instantiated for R2, either the CONTAINS or INSIDE internal/logical operation provided by the data cartridge is used. The additional information returned by the data cartridge in 610 may indicate which of the two operations to use.

The compiler may then determine opportunities for grouping indexes (step 612). As described above, multiple indexes may be created for different terms of a predicate. However, if the two or more of the indexes are created for duplicated data, then a single index rather than the multiple indexes can be used. Accordingly, in 612, compiler 134 may detect and tag a predicate where data in two or more indexes for the predicate are duplicated and use of a single instance of an index is appropriate for the predicate. In one embodiment, to handle such scenarios, compiler 134 examines the IIndexInfo information returned by the IIndexTypeFactoryLocator interface for all the operators/functions specified in the predicate. Compiler 134 then groups all those operators/functions that need to operate on the same data collection and for which the same index type provides a supporting operation. In one embodiment, this is determined by performing an identity (.equals) check on the instance of the IindexTypeFactory returned. Compiler 134 then instantiates only one index instance per function group in step 616.

An execution plan is then generated based upon the processing performed in 610 and 612 (step 614). Executable code or instructions are then generated based upon the execution plan determined in 614 (step 616). Processing in 616 comprises generating index structures for the various terms of the predicate. These index structures may include native index structures and extensible index structures. In the case of extensible indexing structures, index factories returned by a data cartridge during 610 may be used to create instances of the extensible indexes. These instances are initially empty and are populated and used during runtime processing.

As described above, in step 612, indexes may be grouped together to optimize the memory used for indexing. For example, two or more indexes may be grouped into one index.

In one embodiment, the two indexes may be grouped into one provided:
(1) The two indexes operate on the same data collection (index on input on the same side of the join); AND
(2) Have same index types (same factories used for creating instances of the indexes); AND
(3) Have identical collection argument expression.

When these conditions are satisfied then it may not be necessary to create separate indexes for the terms in the predicate, a single index may instead be used thereby avoiding duplication of the same data and the memory needed for the index.

For example, consider the following WHERE clause of a query (EXAMPLE #6): WHERE f1@exampleCartridge (P.c1*P.c2, Q.c2+3) AND f2@exampleCartridge(Q.c1, P.c1*P.c2)

Here P and Q are aliases for inputs on the left and right side of the join. Assuming that the exampleCartridge data cartridge implementation supports indexes of the same type for every combination of operator/function and collection argument expression positions(<f1, 0>, <f1, 1>, <f2, 0>, <f2, 1>) that arise in this example, one index instance will be created on the left side input and two index instances would be created on the right side input. This is because, for the left side (i.e., for P), both the terms can share a single index since it is of same index type and the collection argument expression (P.c1*P.c2) is also exactly identical. However, this is not the case for right side, since the collection argument expressions in the terms Q.c2+3 and Q.c1 are different and so two indexes will need to be created on input Q.

In one embodiment, in the case of grouping, the behavior of insertions and deletions on indexes does not need special changes. This is done by calling the respective methods on the index. These methods have been described above. However when an index scan is invoked on an index instance associated with multiple terms in a predicate, it translates internally into multiple scans on the index, one for every associated term. The results from these multiple scans are then combined together to obtain the final result (the resultSet) as described below.

Figure 9:
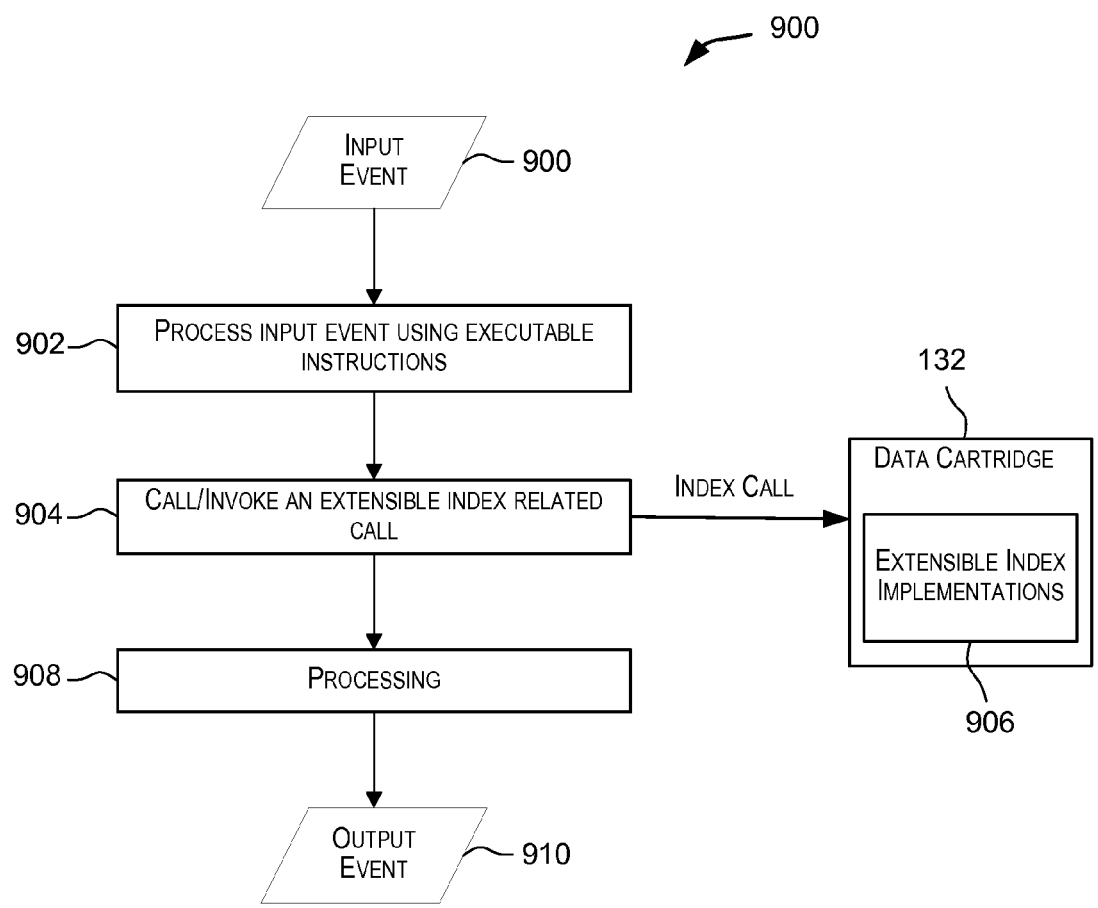
FIG. 9 depicts a simplified high-level flowchart depicting runtime processing using extensible indexes provided by a data cartridge according to an embodiment of the present invention.

The execution code generated as a result of the compilation may then be executed at runtime to process events received by event processing system 102. The execution code includes index structures that are instantiated during the compilation stage. FIG. 9 depicts a simplified high-level flowchart 900 depicting runtime processing using extensible indexes provided by a data cartridge according to an embodiment of the present invention. The processing depicted in FIG. 9 may be performed by software (e.g., program, code, instructions) executed by a processor, or hardware, or combinations thereof. The software may be stored on a non-transitory computer-readable storage medium. In one embodiment, the processing depicted in FIG. 9 may be performed by runtime engine 136 depicted in FIGS. 1 and 3.

As depicted in FIG. 9, input events 900 may be received via an event stream received by event processing system 102 and processed by executing the executable instructions generated as a result of compiling a query (step 902). A received input event may cause an extensible index-related function to be called (step 904). The index-related call may be for updating the index as membership of the collection changes. The index-related call may involve invoking an index scan operation on the extensible index. A call in 904 may be invoked using APIs provided by the data cartridge. The implementation 906 for the call may be provided by the data cartridge. As part of 904, context information received from the data cartridge during the compilation phase for an index may be passed to data cartridge 132. This context information may indicate the internal/logical function provided by the data cartridge that is to be executed for implementing the call. The data cartridge may invoke an internal/logical function based upon the information provided in the context information. Results from execution of the index-related call may be provided to the runtime processing. These results may be used for further runtime processing (step 908) to generate one or more output events 910.

Runtime processing using extensible indexes may be explained using the following query:
For example, consider the following query (same as EXAMPLE #1 described earlier):

```
SELECT
    *
FROM
    S[now], R
WHERE
    CONTAINS@SPATIAL(R.polygon, S.point)
```

As indicated above while describing EXAMPLE #1, the objective of the continuous query function is to output one tuple for each polygon in R that contains a newly received point in the stream S. An Rtree index type provided by the SPATIAL data cartridge may be associated with the CONTAINS query function and an index of RTree type instantiated during the compilation phase on the polygon attribute of Relation R.

When runtime processing of events is initiated, the index instance created for the polygon attribute of Relation R is initially empty since Relation R is empty. Relation R may be populated during runtime by one or more sources. For example, an external application may provide polygon inputs to Relation R. The elements of R may also be updated or deleted over time. Accordingly, the membership of R varies over time. When polygons start flowing into Relation R during runtime, index maintenance operations associated with the index on Relation R are performed. The implementations for these operations are provided by data cartridge SPATIAL and invoked using APIs provided by the SPATIAL data cartridge. In one embodiment, when a polygon is received in Relation R, runtime engine 136 of event processing system 102 uses APIs provided by the SPATIAL data cartridge to indicate to the data cartridge that a polygon has been received in Relation R and is to be added to the associated index structure (index). The corresponding implementation provided by the data cartridge is then invoked to perform the maintenance operation. In this manner, the contents of the index are updated during runtime.

During runtime, when a point S is received on a stream received by event processing system 102, a lookup or scan operation is performed on the current contents of the index on Relation R. For example, let's assume that there are 10 polygons in Relation R when a first point is received on a stream. When the point is received, a lookup or index scan operation on the index is performed to determine if the newly received point is contained in any of the 10 polygons. If a polygon contains the point, then that polygon is output (or sent in an output stream) as a tuple. APIs provided by the data cartridge may be used to perform the lookup operation. In one embodiment, additional information or context information provided to the compiler by the data cartridge during compilation is passed to the data cartridge during runtime when a scan is invoked on the index. This information then enables the cartridge's index implementation to execute the appropriate index internal operation. For example, the information passed to the data cartridge may indicate that the internal INDEX_LOGICAL_CONTAINS_OP needs to be invoked. The appropriate internal CONTAINS operation is then invoked by the data cartridge.

A second point may come over the stream after the first point. The contents of Relation R may however have changed (and accordingly the index on Relation R has changed) between when the first point was received and when the second point is received. For example, when the second point is received, Relation R may now comprise only seven polygons. Accordingly, when the second point is received, the index on Relation R is used to determine which of the seven polygons comprises the newly received second point.

In the manner described, the extensible index created on Relation R as a result of the compilation is updated during runtime as the membership of Relation R changes during runtime. Scan lookup operations are then performed on the index as points are received via a stream received by event processing system 102.

Combining Results from Multiple Index Scans

Consider the example in EXAMPLE #6 above, when a new input is received on P, the predicate is f1@exampleCartridge (P.c1*P.c2, Q.c2+3) AND f2 @exampleCartridge(Q.c1, P.c1*P.c2). It has 2 terms:

term1—f 1@exampleCartridge(P.c1*P.c2, Q.c2+3) and
term2—f2@exampleCartridge(Q.c1, P.c1*P.c2)

Index1 may be created on input Q to efficiently evaluate term1 while a separate index index2 may be created and used to efficiently evaluate term2. Now, to evaluate the entire predicate, which is a conjunction of term1 and term2, the results obtained from the scans of index1 and index2 need to be combined.

For all predicates supported by indexing schemes that are natively supported by the event processing system, a single native index may be created on the input. But in the case of extensible indexes (i.e., indexes based upon indexing schemes provided by a data cartridge), a predicate can have multiple extensible indexes associated with it. So, in general a predicate can have a list of indexes associated with it which may belong to the same or different types (could be native or extensible indexes). All these indexes are updated/maintained when the underlying inputs are updated and while performing a scan the results returned by these indexes are combined.

Further, when indexes are grouped to optimize memory usage, a single index representing the group can actually be associated with multiple terms of a predicate. So while performing a scan on such an index, the results returned by the multiple scans of the index are combined, each corresponding to one among the associated terms. In one embodiment, if there are multiple indexes involved then a separate scan is started on each of these associated indexes. By repeatedly calling getNext( ) on the index scan till it returns NULL, all the tuples returned by that index scan are collected into a resultSet. Accordingly, the number of resultSets is the same as the number of associated index scans. These resultSets are passed to an instance of Iterator that combines these resultSets to form a final resultSet. Since each resultSet represents the set of tuples returned by a particular index scan, the resultSet essentially represents the set of tuples for which the term corresponding to the index scan holds true. Since all these terms are joined by an AND operator in the WHERE clause, the final resultSet is the intersection of all these resultSets. So the iterator computes the final resultSet by computing an intersection operation on these sets. Accordingly, when multiple indexes are used to evaluate a predicate, each index is being used to evaluate one or more terms of the predicate. Since the entire predicate is a conjunction of its constituent terms, the final result is obtained by computing the intersection of the results of the index scans.

In one embodiment, a predicate of a query may have multiple terms with multiple indexes being created for the predicate. For example, consider the query:

```
SELECT
    *
FROM
    S[now], R
WHERE
    CONTAINS@SPATIAL(R.polygon1, S.point) AND
    CONTAINS@SPATIAL(R.polygon2, S.point) AND
    S.c1 = R.c2
```

Here, different indexes may be instantiated for the different terms identified in the predicate. For example, a first extensible index may be created on R.polygon1, a second extensible index may be created for R.polygon2, and a third native index may be created for R.c2. The final result set is the intersection of the sets returned by the scans performed on the three indexes.

Non-Exact Results

In one embodiment, the result of an index scan may yield non-exact results instead of exact results. For example, consider a collection of 1000 polygons and, given a key point, a lookup is to be performed using the index on the polygons collection to determine which polygons contain the point. In one embodiment, the data cartridge may efficiently return back a set of 75 polygons, where the returned set includes polygons that contain the point and also those that do not comprise the point. The returned set is thus an inexact result set. The data cartridge is guaranteeing that if a polygon contains the point then it is guaranteed to be in the returned inexact set of polygons, but additionally there might be false positives. Accordingly, in this scenario, just because a polygon is in the returned inexact set, it does not necessarily mean that it contains the point. The data cartridge returns a subset of the collection with the guarantee that the subset contains the exact result set, where the exact result set is the set of polygons that contain the point. The data cartridge thus performs a first pruning of the search space (i.e., the entire collection of polygons) and guarantees that what it returns contains the exact result set. The runtime engine may then perform further processing on the inexact result set returned by the data cartridge to determine the exact result set. The runtime engine may, for each polygon in the returned inexact set, determine if the polygon contains the point. This may be implemented using a functional implementation or some other technique. The functional implementation is thus performed on a subset of elements of the full collection. The time taken for the full operation may still be less than if the functional implementation had been performed on the full collection.

Information regarding whether a data cartridge returns exact or non-exact results may be stored by the data cartridge and conveyed to compiler 134 during the compilation stage. This information may then be encoded in the code/instructions generated by the compiler. For example, in one embodiment, when compiler 134 sends a query to the data cartridge asking if the data cartridge has an efficient way of performing a particular query operator, the cartridge's response may indicate an index type for supporting the query operator and also whether the index type returns an exact or inexact result set. For an inexact indication, the runtime engine may be configured to perform further processing of the inexact set returned by an index scan to find the exact result set. The runtime processing of the inexact scan set may be performed using a functional implementation.

For example, using the above example, at runtime, the extensible index scan prunes down from search space of 1000 polygons to an inexact result set of 75 polygons. Then, since at compile time the cartridge had specified that results would be inexact (i.e., there could be false positives), the runtime may invoke a functional version of CONTAINS(polygon, point) for each of the 75 polygons returned by the index scan for the current input point to exactly determine which of the polygons contain the current input point. If on the other hand, the cartridge had indicated during compilation that results from the index scan would be exact, this processing step following the index scan by invoking the functional form of the operation/function would not be performed by the runtime.

Figure 7:
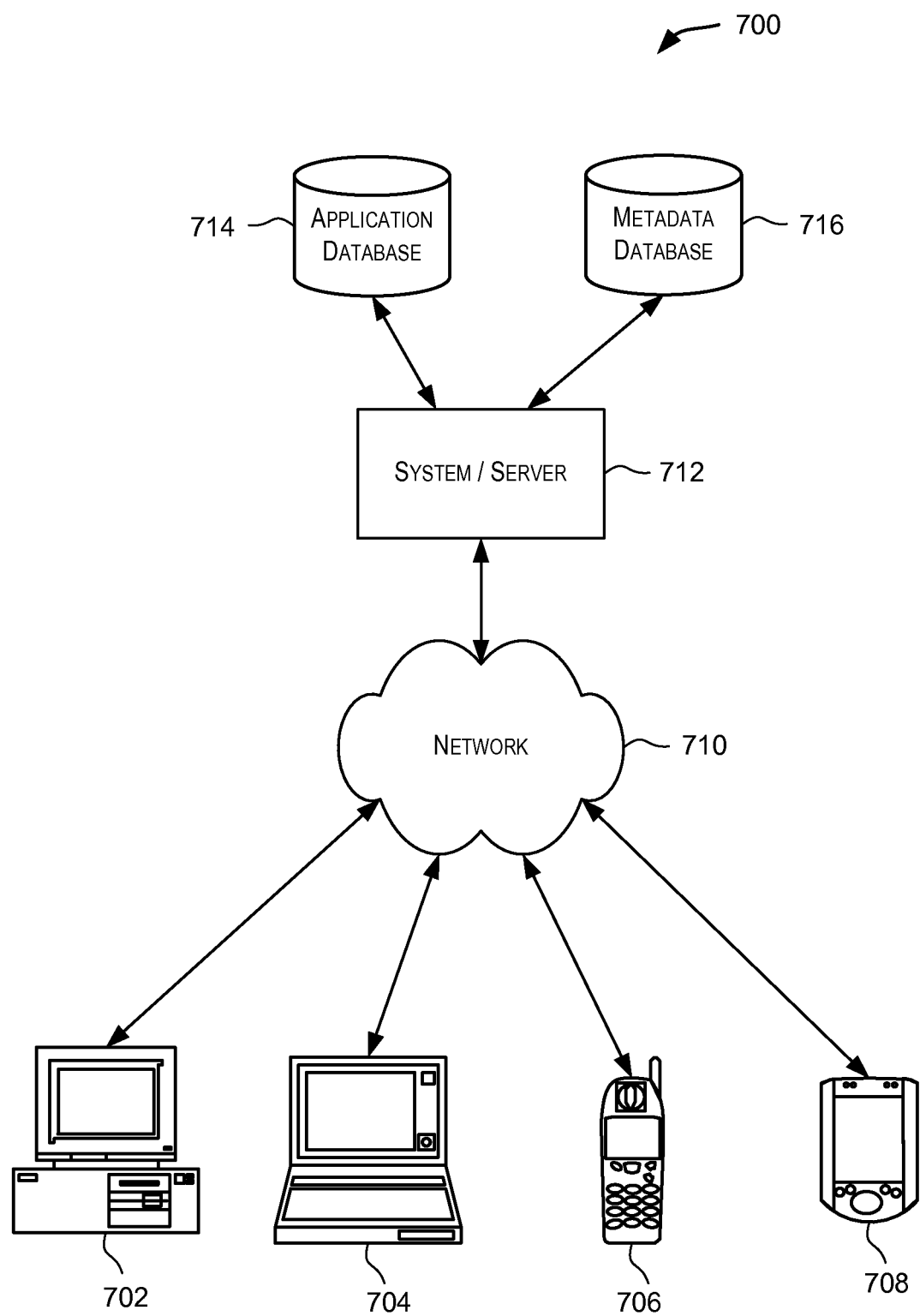
FIG. 7 is a simplified block diagram illustrating components of a system environment that may be used in accordance with an embodiment of the present invention.

FIG. 7 is a simplified block diagram illustrating components of a system environment 700 that may be used in accordance with an embodiment of the present invention. As shown, system environment 700 includes one or more client computing devices 702, 704, 706, 708, which are configured to operate a client application such as a web browser, proprietary client (e.g., Oracle Forms), or the like. In various embodiments, client computing devices 702, 704, 706, and 708 may interact with system 712, which may perform functions of an event processing system.

Client computing devices 702, 704, 706, 708 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 702, 704, 706, and 708 may be any other electronic device, such as a thin-client computer, Internet-enabled gaming system, and/or personal messaging device, capable of communicating over a network (e.g., network 710 described below). Although exemplary system environment 700 is shown with four client computing devices, any number of client computing devices may be supported. Other devices such as devices with sensors, etc. may interact with system 712.

System environment 700 may include a network 710. Network 710 may be any type of network familiar to those skilled in the art that can support data communications using any of a variety of commercially-available protocols, including without limitation TCP/IP, SNA, IPX, AppleTalk, and the like. Merely by way of example, network 710 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System 712 may comprise one or more server computers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, system 712 may be adapted to run one or more services or software applications described in the foregoing disclosure.

System 712 may run an operating system including any of those discussed above, as well as any commercially available server operating system. System 712 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 700 may also include one or more databases 714 and 716. Databases 714 and 716 may reside in a variety of locations. By way of example, one or more of databases 714 and 716 may reside on a storage medium local to (and/or resident in) system 712. Alternatively, databases 714 and 716 may be remote from system 712, and in communication with system 712 via a network-based or dedicated connection. In one set of embodiments, databases 714 and 716 may reside in a storage-area network (SAN) familiar to those skilled in the art. Similarly, any necessary files for performing the functions attributed to system 712 may be stored locally on system 712 and/or remotely, as appropriate. In one set of embodiments, databases 714 and 716 may include relational databases, such as Oracle 10g, which are adapted to store, update, and retrieve data in response to SQL-formatted commands.

Figure 8:
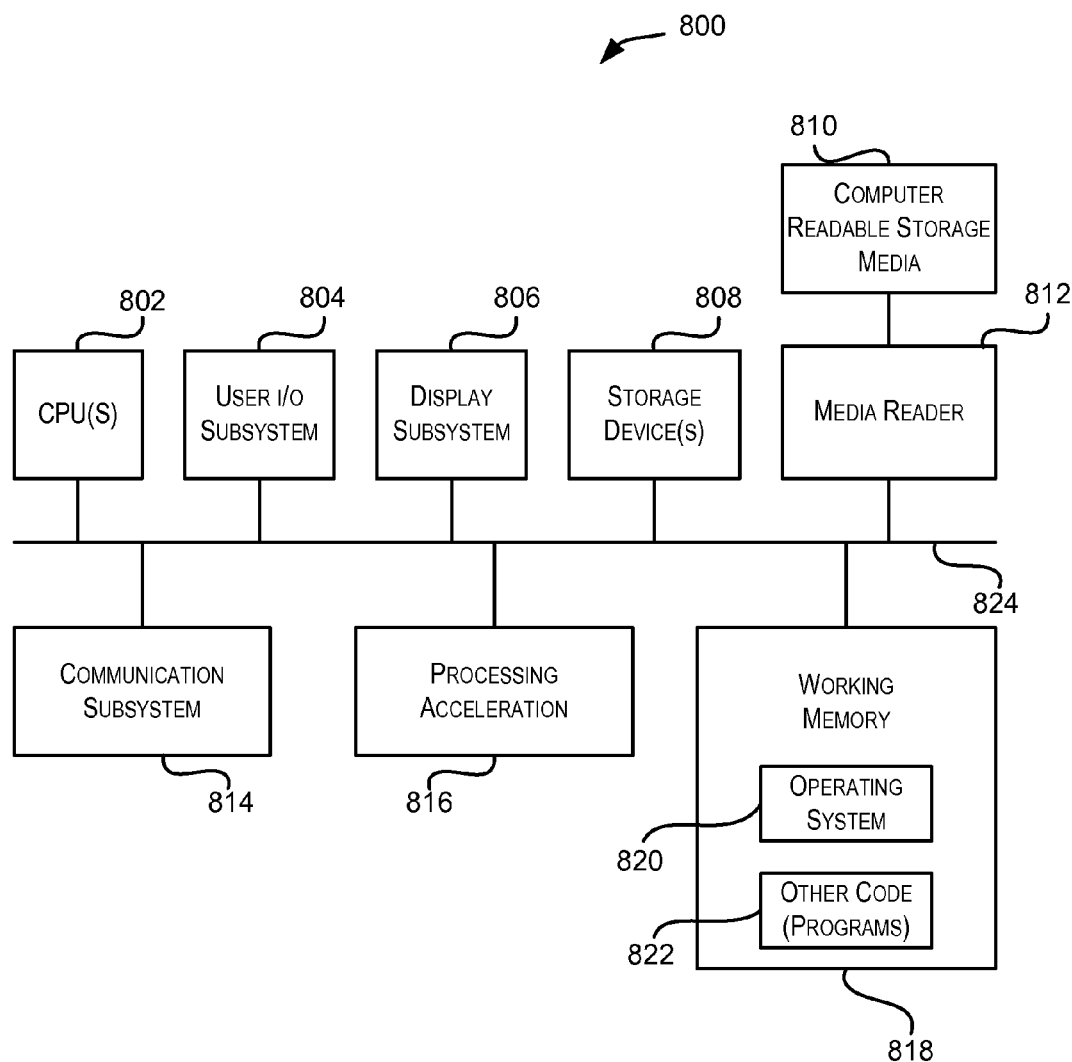
FIG. 8 is a simplified block diagram of a computer system that may be used in accordance with embodiments of the present invention.

FIG. 8 is a simplified block diagram of a computer system 800 that may be used in accordance with embodiments of the present invention. For example, system 800 may be used to implement event processing system 102 depicted in FIGS. 1 and 3. Computer system 800 is shown comprising hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). Computer system 800 may also include one or more storage devices 808. By way of example, storage device(s) 808 may include devices such as disk drives, optical storage devices, and solid-state storage devices such as a random access memory (RAM) and/or a read-only memory (ROM), which can be programmable, flash-updateable and/or the like.

Computer system 800 may additionally include a computer-readable storage media reader 812, a communications subsystem 814 (e.g., a modem, a network card (wireless or wired), an infra-red communication device, etc.), and working memory 818, which may include RAM and ROM devices as described above. In some embodiments, computer system 800 may also include a processing acceleration unit 816, which can include a digital signal processor (DSP), a special-purpose processor, and/or the like.

Computer-readable storage media reader 812 can further be connected to a computer-readable storage medium 810, together (and, optionally, in combination with storage device(s) 808) comprehensively representing remote, local, fixed, and/or removable storage devices plus storage media for temporarily and/or more permanently containing computer-readable information. Communications subsystem 814 may permit data to be exchanged with network 710 and/or any other computer described above with respect to system environment 700.

Computer system 800 may also comprise software elements, shown as being currently located within working memory 818, including an operating system 820 and/or other code 822, such as an application program (which may be a client application, Web browser, mid-tier application, RDBMS, etc.). In an exemplary embodiment, working memory 818 may include executable code and associated data structures (such as caches) used for processing events and performing data cartridge-related processing as described above. It should be appreciated that alternative embodiments of computer system 800 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A system comprising:
    a memory; and
    a processor coupled to the memory, the processor configured to:
        determine that a query includes a first function for whose evaluation an index is not natively provided by an event processing system that is to compile the query;
        provide a data cartridge to the event processing system, the data cartridge providing an indexing scheme for evaluating the first function of the query; and
        use, by the event processing system, the indexing scheme provided by the data cartridge to evaluate the first function of the query, wherein the processor is further configured to:
            determine an occurrence of a link definition in the query, the link definition identifying the first function and the data cartridge;
            determine a list of input arguments to the first function, wherein the list of input arguments comprises a collection;
            determine whether the data cartridge provides an index for evaluation of the first function with the set of input arguments;
            compile the query using information provided by the data cartridge to generate executable code, the executable code comprising an index instance generated using the information provided by the data cartridge, the index instance being generated for evaluation of the first function; and
        execute the executable code, wherein the execution causes execution of the first function provided by the data cartridge related to the index instance.

2. The system of claim 1 wherein the processor is configured to:
    communicate, to the data cartridge, information identifying the first function;
    communicate, to the data cartridge, a position of the collection in the list of input arguments;
    receive metadata information from the data cartridge, the metadata information identifying an index type to be used for evaluating the first function for the collection; and
    generate the index instance based upon the index type.

3. The system of claim 2 wherein:
    the metadata information comprises context information, the context information comprising information identifying the first function provided by the data cartridge; and
    the processor is configured to communicate the information identifying the function to the data cartridge during execution of the executable code.

4. The system of claim 1 wherein the processor is configured to:
    categorize, based on mappings that map various functions to various categories, the first function into one of a first category, a second category, or a third category, wherein categorization of the first function into the first category indicates that the system provides an index for evaluation of the first function, wherein categorization of the first function into the second category indicates that the data cartridge provides an index for evaluation of the first function, and wherein categorization of the first function into the third category indicates that no index is provided for evaluation of the first function;
    wherein the data cartridge manages all metadata for the index instance;
    wherein metadata for the index instance is not stored in memory of the event processing system.

5. The system of claim 1 wherein the processor is configured to:
    use the index instance to evaluate a second function, wherein the collection is provided as an input argument for both the first function and the second function and the index instance is generated for the collection.

6. The system of claim 1 wherein:
the collection comprising a plurality of elements is provided as an input argument to the first function;
the first function provided by the data cartridge is an index scan function using the index instance; and
the processor is configured to receive a result set from execution of the first function provided by the data cartridge, the result set resulting from evaluation of the first function and comprising a set of items from the collection.

7. The system of claim 1 wherein:
the collection comprising a plurality of elements is provided as an input argument to the first function;
the first function provided by the data cartridge is an index scan function using the index instance;
the processor is configured to:
receive a result set from execution of the first function provided by the data cartridge, the result set comprising a set of items from the collection resulting from evaluation of the first function and also additional one or more items from the collection; and
determine the set of items resulting from evaluation of the first function from the result set.

8. The system of claim 1 wherein the processor is configured to:
execute the executable code upon receiving an event via an event stream, the event comprising data and a time stamp;
wherein the processor is configured to compile the query using the information provided by the data cartridge without using a user-defined function designed to interact specifically with a particular application that consumes results of execution of the executable code.

9. A non-transitory computer-readable storage medium storing a plurality of instructions for controlling a computer system, the plurality of instructions comprising:
instructions that cause the computer system to determine that a query includes a first function for whose evaluation an index is not natively provided by an event processing system that is to compile the query;
instructions that cause the computer system to provide a data cartridge to the event processing system, the data cartridge providing an indexing scheme for evaluating the first function of the query; and
instructions that cause the computer system to use the indexing scheme provided by the data cartridge to evaluate the first function of the query, wherein the instructions further comprise:
instructions that cause the computer system to determine an occurrence of a link definition in the query, the link definition identifying the first function and the data cartridge;
instructions that cause the computer system to determine a list of input arguments to the first function, wherein the list of input arguments comprises a collection;
instructions that cause the computer system to determine whether the data cartridge provides an index for evaluation of the first function with the set of input arguments;
instructions that cause the computer system to compile the query using information provided by the data cartridge to generate executable code, the executable code comprising an index instance generated using the information provided by the data cartridge, the index instance being generated for evaluation of the first function; and
instructions that cause the computer system to execute the executable code, wherein the execution causes execution of the first function provided by the data cartridge related to the index instance.

10. The non-transitory computer-readable storage medium of claim 9 wherein the instructions that cause the computer system to compile the query comprise:
instructions that cause the computer system to communicate information to the data cartridge identifying the first function;
instructions that cause the computer system to communicate to the data cartridge a position of the collection in the list of input arguments;
instructions that cause the computer system to receive metadata information from the data cartridge, the metadata information identifying an index type to be used for evaluating the first function for the collection; and
instructions that cause the computer system to generate the index instance based upon the index type.

11. The non-transitory computer-readable storage medium of claim 10 wherein:
the metadata information comprises context information, the context information comprising information identifying the first function provided by the data cartridge; and
instructions that cause the computer system to execute the execute code comprise instructions that cause the computer system to communicate the information identifying the first function provided by the data cartridge to the data cartridge during execution of the executable code.

12. The non-transitory computer-readable storage medium of claim 9 wherein the instructions that cause the computer system to compile the query comprise:
instructions that cause the computer system to categorize, based on mappings that map various functions to various categories, the first function into one of a first category, a second category, or a third category, wherein categorization of the first function into the first category indicates that the system provides an index for evaluation of the first function, wherein categorization of the first function into the second category indicates that the data cartridge provides an index for evaluation of the first function, and wherein categorization of the first function into the third category indicates that no index is provided for evaluation of the first function; and
instructions that cause the computer system to categorize, based on the mappings, a second function of the query into a different one of the first, second, and third categories than a category into which the first function was categorized.

13. The non-transitory computer-readable storage medium of claim 9 wherein the instructions that cause the computer system to execute the executable code comprise:
instructions that cause the computer system to use the index instance to evaluate a second function, wherein the collection is provided as an input argument for both the first function and the second function and the index instance is generated for the collection.

14. The non-transitory computer-readable storage medium of claim 9 wherein:
the collection comprising a plurality of elements is provided as an input argument to the first function;
the first function provided by the data cartridge is an index scan function using the index instance; and
the instructions that cause the computer system to execute the executable code comprise instructions that cause the computer system to receive a result set from execution of the first function provided by the data cartridge, the result set resulting from evaluation of the first function and comprising a set of items from the collection.

15. The non-transitory computer-readable storage medium of claim 9 wherein:
   the collection comprising a plurality of elements is provided as an input argument to the first function;
   the first function provided by the data cartridge is an index scan function using the index instance;
   the instructions that cause the computer system to execute the executable code comprise instructions that cause the computer system to:
      receive a result set from execution of the first function provided by the data cartridge, the result set comprising a set of items from the collection resulting from evaluation of the first function and also additional one or more items from the collection; and
      determine the set of items resulting from evaluation of the first function from the result set.

16. The non-transitory computer-readable storage medium of claim 9 wherein the instructions that cause the computer system to execute the executable code comprise:
   instructions that cause the computer system to execute the executable code upon receiving an event via an event stream, the event comprising data and a time stamp;
   wherein compiling the query using the information provided by the data cartridge comprises compiling the query without using a user-defined function designed to interact specifically with a particular application that consumes results of execution of the executable code.

17. A method comprising:
   determining that a query includes a first function for whose evaluation an index is not natively provided by an event processing system that is to compile the query;
   providing a data cartridge to the event processing system, the data cartridge providing an indexing scheme for evaluating the first function of the query; and
   using, by the event processing system, the indexing scheme provided by the data cartridge to evaluate the first function of the query, using the indexing scheme provided by the data cartridge further comprising:
      determining an occurrence of a link definition in the query, the link definition identifying the first function and the data cartridge;
      determining a list of input arguments to the first function, wherein the list of input arguments comprises a collection;
      determining whether the data cartridge provides an index for evaluation of the first function with the set of input arguments;
      compiling, by a computer system, the query using information provided by the data cartridge to generate executable code, the executable code comprising an index instance generated using the information provided by the data cartridge, the index instance being generated for evaluation of the first function; and
      executing, by the computer system, the executable code, wherein the execution causes execution of the first function provided by the data cartridge related to the index instance.

18. The method of claim 17 wherein:
compiling the query comprises:
   communicating information to the data cartridge identifying the first function and a position of the collection in a list of input arguments for the first function;
   receiving metadata information from the data cartridge, the metadata information identifying an index type to be used for evaluating the first function for the collection and identifying the first function provided by the data cartridge;
   generating the index instance based upon the index type; and executing the executable code comprises:
   communicating the information identifying the first function provided by the data cartridge to the data cartridge during execution of the executable code; and
executing the executable code upon receiving an event via an event stream, the event comprising data and a time stamp.

* * * * *